(12) United States Patent
Hayashi

(10) Patent No.: US 7,450,280 B2
(45) Date of Patent: Nov. 11, 2008

(54) IMAGE PROCESSING APPARATUS, COMPUTER PRODUCT, AND IMAGE PROCESSING METHOD

(75) Inventor: Koji Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 680 days.

(21) Appl. No.: 11/174,565

(22) Filed: Jul. 6, 2005

(65) Prior Publication Data

US 2006/0007465 A1 Jan. 12, 2006

(30) Foreign Application Priority Data

Jul. 6, 2004 (JP) ............................. 2004-199064
Jun. 16, 2005 (JP) ............................. 2005-176584

(51) Int. Cl.
*G06F 15/00* (2006.01)
(52) U.S. Cl. ...................... 358/521; 358/1.13; 358/2.1; 358/3.27
(58) Field of Classification Search ................ 358/1.13, 358/1.15, 2.1, 474, 505, 519, 521; 382/169; 715/515, 520, 521
See application file for complete search history.

(56) References Cited

U.S. PATENT DOCUMENTS

| | | | |
|---|---|---|---|
| 6,559,972 B1 * | 5/2003 | Takahashi et al. | 358/1.2 |
| 2001/0048530 A1 * | 12/2001 | Hayashi et al. | 358/1.13 |
| 2002/0181024 A1 * | 12/2002 | Morimoto et al. | 358/3.15 |
| 2004/0239996 A1 | 12/2004 | Hayashi | |
| 2007/0013782 A1 * | 1/2007 | Kobayashi | 348/207.99 |

FOREIGN PATENT DOCUMENTS

JP 2002-325179 11/2002

* cited by examiner

*Primary Examiner*—Kimberly A Williams
(74) *Attorney, Agent, or Firm*—Oblon, Spivak, McClelland, Maier & Neustadt, P.C.

(57) ABSTRACT

An image-quality-mode receiving unit receives a selection of an image quality mode for forming an image based on image data. A first gradation converting unit performs a gradation conversion of the image data by setting a gradation conversion parameter based on the image quality mode. A feature extracting unit performs a gradation conversion of a feature-extraction threshold based on the gradation conversion parameter, and extracts, based on the feature-extraction threshold after the gradation conversion, a feature amount from the image data after the gradation conversion. A second gradation converting unit performs a gradation conversion of the image data by setting a gradation conversion parameter based on a result of extracting the feature amount and the image quality mode.

9 Claims, 44 Drawing Sheets

PRIMARY-DIFFERENTIAL
EDGE DETECTION FILTER 1

| 1  | 1  | 1  | 1  | 1  |
|----|----|----|----|----|
| 1  | 1  | 1  | 1  | 1  |
| 0  | 0  | 0  | 0  | 0  |
| -1 | -1 | -1 | -1 | -1 |
| -1 | -1 | -1 | -1 | -1 |

FIG. 5B

PRIMARY-DIFFERENTIAL
EDGE DETECTION FILTER 2

| -1 | -1 | -1 | -1 | -1 |
|----|----|----|----|----|
| -1 | -1 | -1 | -1 | -1 |
| 0  | 0  | 0  | 0  | 0  |
| 1  | 1  | 1  | 1  | 1  |
| 1  | 1  | 1  | 1  | 1  |

FIG. 5C

PRIMARY-DIFFERENTIAL
EDGE DETECTION FILTER 3

| -1 | -1 | 0  | 1  | 1  |
|----|----|----|----|----|
| -1 | -1 | 0  | 1  | 1  |
| -1 | -1 | 0  | 1  | 1  |
| -1 | -1 | 0  | 1  | 1  |
| -1 | -1 | 0  | 1  | 1  |

FIG. 5D

PRIMARY-DIFFERENTIAL
EDGE DETECTION FILTER 4

| 1  | 1  | 1  | 1  | 0  |
|----|----|----|----|----|
| 1  | 1  | 1  | 0  | -1 |
| 1  | 1  | 0  | -1 | -1 |
| 1  | 0  | -1 | -1 | -1 |
| 0  | -1 | -1 | -1 | -1 |

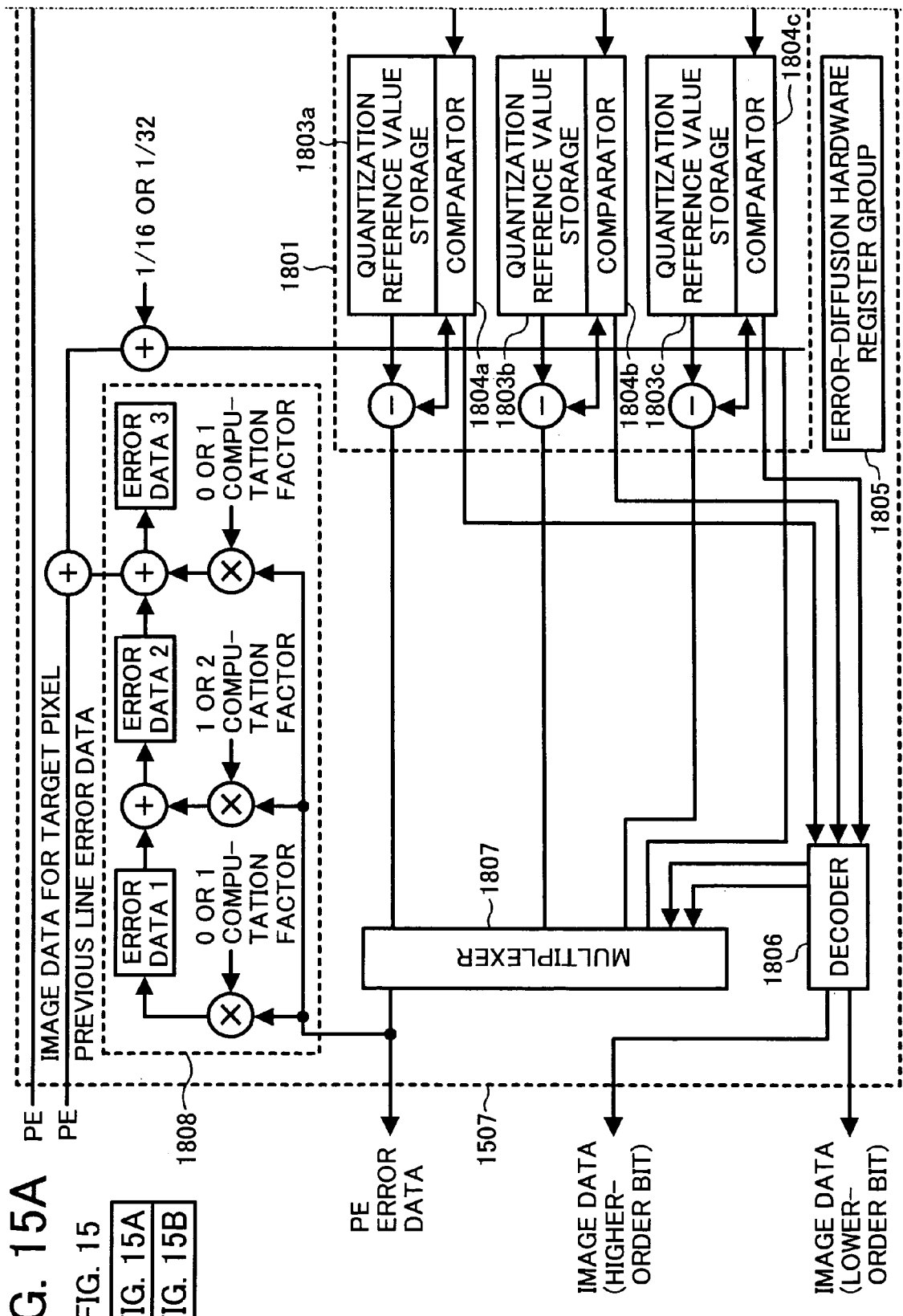

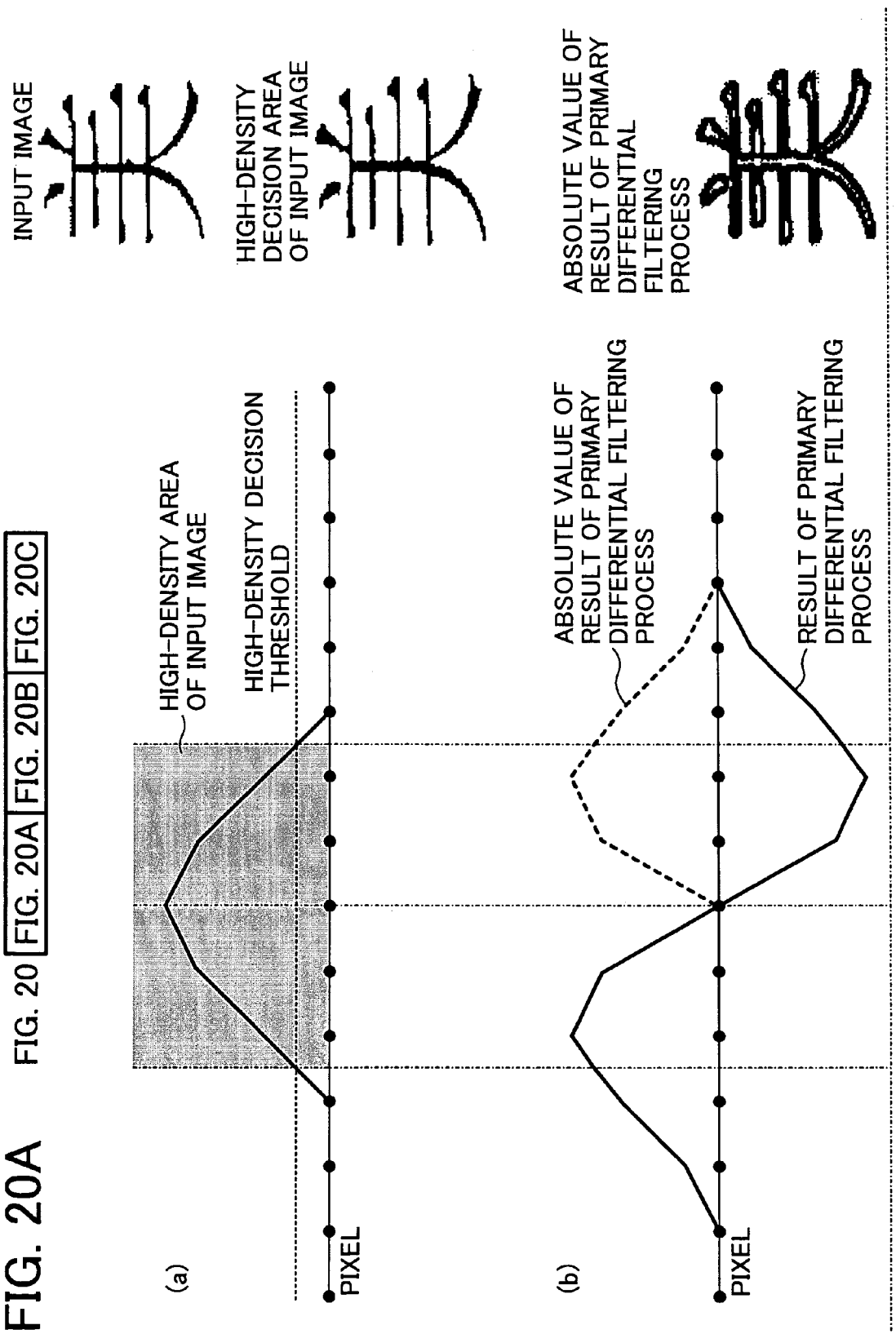

FIG. 21 th1

| 160 | 88 | 40 | 118 | 160 | 88 | 40 | 118 |
|---|---|---|---|---|---|---|---|
| 160 | 10 | 10 | 144 | 160 | 10 | 10 | 144 |
| 88 | 40 | 118 | 160 | 88 | 40 | 118 | 160 |
| 10 | 10 | 144 | 160 | 10 | 10 | 144 | 160 |
| 40 | 118 | 160 | 88 | 40 | 118 | 160 | 88 |
| 10 | 144 | 160 | 10 | 10 | 144 | 160 | 10 |
| 118 | 160 | 88 | 40 | 118 | 160 | 88 | 40 |
| 144 | 160 | 10 | 10 | 144 | 160 | 10 | 10 | th2

| 160 | 112 | 100 | 118 | 160 | 112 | 100 | 118 |
|---|---|---|---|---|---|---|---|
| 160 | 106 | 94 | 144 | 160 | 106 | 94 | 144 |
| 112 | 100 | 118 | 160 | 112 | 100 | 118 | 160 |
| 106 | 94 | 144 | 160 | 106 | 94 | 144 | 160 |
| 100 | 118 | 160 | 112 | 100 | 118 | 160 | 112 |
| 94 | 144 | 160 | 106 | 94 | 144 | 160 | 106 |
| 118 | 160 | 112 | 100 | 118 | 160 | 112 | 100 |
| 144 | 160 | 106 | 94 | 144 | 160 | 106 | 94 | th3

| 240 | 177 | 153 | 208 | 240 | 177 | 153 | 208 |
|---|---|---|---|---|---|---|---|
| 240 | 165 | 153 | 224 | 240 | 165 | 153 | 224 |
| 177 | 153 | 208 | 240 | 177 | 153 | 208 | 240 |
| 165 | 153 | 224 | 240 | 165 | 153 | 224 | 240 |
| 153 | 208 | 240 | 177 | 153 | 208 | 240 | 177 |
| 153 | 224 | 240 | 165 | 153 | 224 | 240 | 165 |
| 208 | 240 | 177 | 153 | 208 | 240 | 177 | 153 |
| 224 | 240 | 165 | 153 | 224 | 240 | 165 | 153 |

→ MAIN SCANNING DIRECTION
↓ SUB-SCANNING DIRECTION

FIG. 22

INPUT VALUE 20h

BLANK : VALUE 0   ○ : VALUE 1
○ : VALUE 2   ● : VALUE 3

FIG. 23

BLANK : VALUE 0   ○ : VALUE 1
○ : VALUE 2   ● : VALUE 3

BLANK : VALUE 0   ○ : VALUE 1
○ : VALUE 2   ● : VALUE 3

→ MAIN SCANNING DIRECTION
↓
SUB-SCANNING
DIRECTION

FIG. 25 th1

| 112 | 144 | 20  | 38  | 112 | 144 | 20  | 38  |
|-----|-----|-----|-----|-----|-----|-----|-----|
| 144 | 36  | 20  | 128 | 144 | 36  | 20  | 128 |
| 20  | 38  | 112 | 144 | 20  | 38  | 112 | 144 |
| 20  | 128 | 144 | 36  | 20  | 128 | 144 | 36  |
| 112 | 144 | 20  | 38  | 112 | 144 | 20  | 38  |
| 144 | 36  | 20  | 128 | 144 | 36  | 20  | 128 |
| 20  | 38  | 112 | 144 | 20  | 38  | 112 | 144 |
| 20  | 128 | 144 | 36  | 20  | 128 | 144 | 36  | th2

| 112 | 144 | 102 | 89  | 112 | 144 | 102 | 89  |
|-----|-----|-----|-----|-----|-----|-----|-----|
| 144 | 92  | 89  | 128 | 144 | 92  | 89  | 128 |
| 102 | 89  | 112 | 144 | 102 | 89  | 112 | 144 |
| 89  | 128 | 144 | 92  | 89  | 128 | 144 | 92  |
| 112 | 144 | 102 | 89  | 112 | 144 | 102 | 89  |
| 144 | 92  | 89  | 128 | 144 | 92  | 89  | 128 |
| 102 | 89  | 112 | 144 | 102 | 89  | 112 | 144 |
| 89  | 128 | 144 | 92  | 89  | 128 | 144 | 92  | th3

| 182 | 208 | 224 | 166 | 182 | 208 | 224 | 166 |
|-----|-----|-----|-----|-----|-----|-----|-----|
| 196 | 224 | 166 | 174 | 196 | 224 | 166 | 174 |
| 224 | 166 | 182 | 208 | 224 | 166 | 182 | 208 |
| 166 | 174 | 196 | 224 | 166 | 174 | 196 | 224 |
| 182 | 208 | 224 | 166 | 182 | 208 | 224 | 166 |
| 196 | 224 | 166 | 174 | 196 | 224 | 166 | 174 |
| 224 | 166 | 182 | 208 | 224 | 166 | 182 | 208 |
| 166 | 174 | 196 | 224 | 166 | 174 | 196 | 224 |

→ MAIN SCANNING DIRECTION

↓ SUB-SCANNING DIRECTION

FIG. 26 th1

| 92 | 144 | 128 | 20 | 92 | 144 | 128 | 20 |
|---|---|---|---|---|---|---|---|
| 144 | 126 | 20 | 94 | 144 | 126 | 20 | 94 |
| 128 | 20 | 92 | 144 | 128 | 20 | 92 | 144 |
| 20 | 94 | 144 | 126 | 20 | 94 | 144 | 126 |
| 92 | 144 | 128 | 20 | 92 | 144 | 128 | 20 |
| 144 | 126 | 20 | 94 | 144 | 126 | 20 | 94 |
| 128 | 20 | 92 | 144 | 128 | 20 | 92 | 144 |
| 20 | 94 | 144 | 126 | 20 | 94 | 144 | 126 | th2

| 92 | 144 | 128 | 20 | 92 | 144 | 128 | 20 |
|---|---|---|---|---|---|---|---|
| 144 | 126 | 20 | 94 | 144 | 126 | 20 | 94 |
| 128 | 20 | 92 | 144 | 128 | 20 | 92 | 144 |
| 20 | 94 | 144 | 126 | 20 | 94 | 144 | 126 |
| 92 | 144 | 128 | 20 | 92 | 144 | 128 | 20 |
| 144 | 126 | 20 | 94 | 144 | 126 | 20 | 94 |
| 128 | 20 | 92 | 144 | 128 | 20 | 92 | 144 |
| 20 | 94 | 144 | 126 | 20 | 94 | 144 | 126 | th3

| 182 | 208 | 224 | 166 | 182 | 208 | 224 | 166 |
|---|---|---|---|---|---|---|---|
| 196 | 224 | 166 | 174 | 196 | 224 | 166 | 174 |
| 224 | 166 | 182 | 208 | 224 | 166 | 182 | 208 |
| 166 | 174 | 196 | 224 | 166 | 174 | 196 | 224 |
| 182 | 208 | 224 | 166 | 182 | 208 | 224 | 166 |
| 196 | 224 | 166 | 174 | 196 | 224 | 166 | 174 |
| 224 | 166 | 182 | 208 | 224 | 166 | 182 | 208 |
| 166 | 174 | 196 | 224 | 166 | 174 | 196 | 224 |

→ MAIN SCANNING DIRECTION
↓ SUB-SCANNING DIRECTION th1

| 64 | 136 | 64 | 136 | 64 | 136 | 64 | 136 |
|---|---|---|---|---|---|---|---|
| 64 | 136 | 64 | 136 | 64 | 136 | 64 | 136 |
| 64 | 136 | 64 | 136 | 64 | 136 | 64 | 136 |
| 64 | 136 | 64 | 136 | 64 | 136 | 64 | 136 |
| 64 | 136 | 64 | 136 | 64 | 136 | 64 | 136 |
| 64 | 136 | 64 | 136 | 64 | 136 | 64 | 136 |
| 64 | 136 | 64 | 136 | 64 | 136 | 64 | 136 |
| 64 | 136 | 64 | 136 | 64 | 136 | 64 | 136 | th2

| 160 | 160 | 160 | 160 | 160 | 160 | 160 | 160 |
|---|---|---|---|---|---|---|---|
| 160 | 160 | 160 | 160 | 160 | 160 | 160 | 160 |
| 160 | 160 | 160 | 160 | 160 | 160 | 160 | 160 |
| 160 | 160 | 160 | 160 | 160 | 160 | 160 | 160 |
| 160 | 160 | 160 | 160 | 160 | 160 | 160 | 160 |
| 160 | 160 | 160 | 160 | 160 | 160 | 160 | 160 |
| 160 | 160 | 160 | 160 | 160 | 160 | 160 | 160 |
| 160 | 160 | 160 | 160 | 160 | 160 | 160 | 160 | th3

| 224 | 224 | 224 | 224 | 224 | 224 | 224 | 224 |
|---|---|---|---|---|---|---|---|
| 224 | 224 | 224 | 224 | 224 | 224 | 224 | 224 |
| 224 | 224 | 224 | 224 | 224 | 224 | 224 | 224 |
| 224 | 224 | 224 | 224 | 224 | 224 | 224 | 224 |
| 224 | 224 | 224 | 224 | 224 | 224 | 224 | 224 |
| 224 | 224 | 224 | 224 | 224 | 224 | 224 | 224 |
| 224 | 224 | 224 | 224 | 224 | 224 | 224 | 224 |
| 224 | 224 | 224 | 224 | 224 | 224 | 224 | 224 |

→ MAIN SCANNING DIRECTION
↓ SUB-SCANNING DIRECTION th3

MAIN SCANNING DIRECTION

SUB-SCANNING DIRECTION

PRINTER γ FOR IMAGE PROCESSING

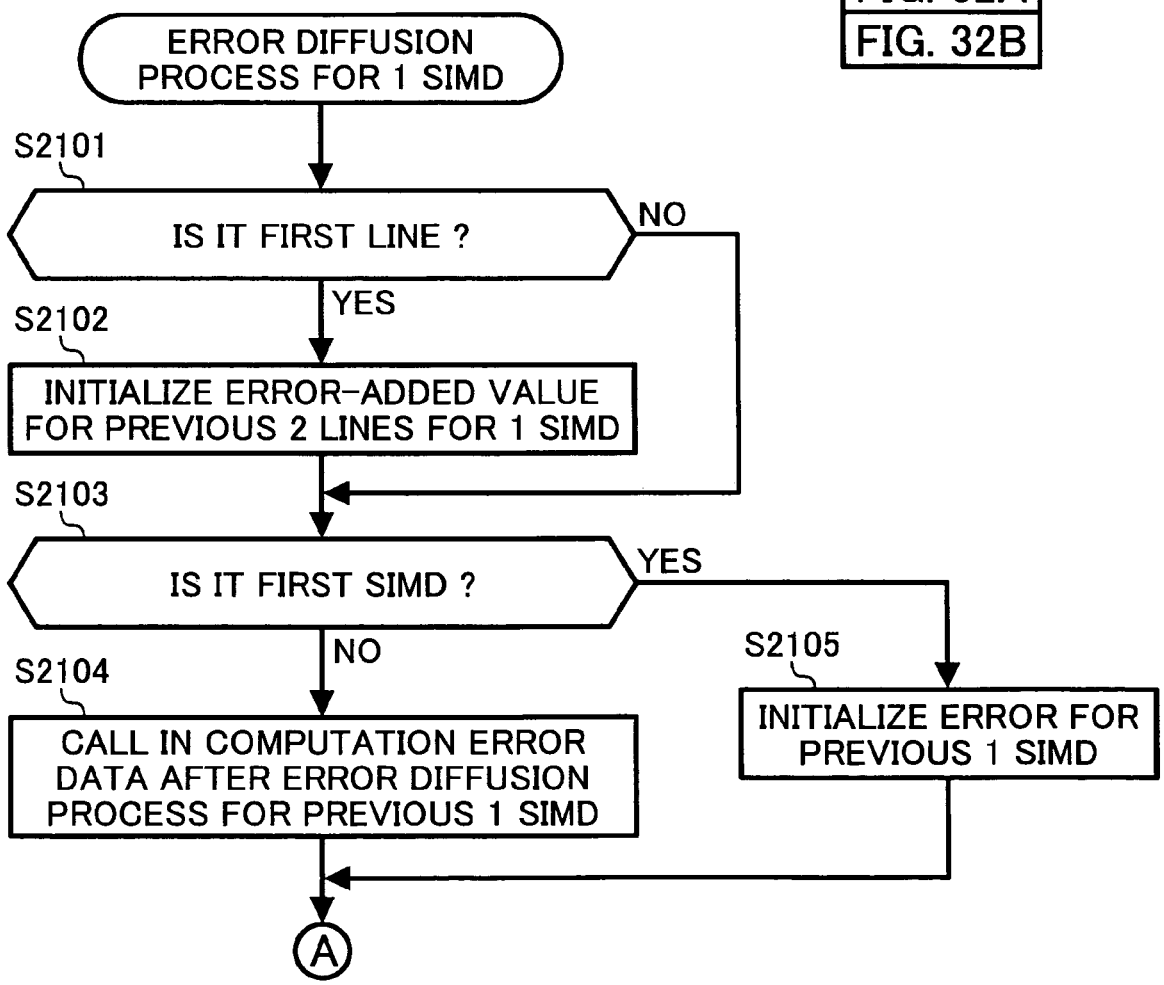

IMAGE PROCESSING APPARATUS, COMPUTER PRODUCT, AND IMAGE PROCESSING METHOD

CROSS-REFERENCE TO RELATED APPLICATIONS

The present document incorporates by reference the entire contents of Japanese priority documents, 2004-199064 filed in Japan on Jul. 6, 2004 and 2005-176584 filed in Japan on Jun. 16, 2005.

BACKGROUND OF THE INVENTION

1. Field of the Invention

The present invention relates to an image processing apparatus, an image forming method, and a computer product.

2. Description of the Related Art

Japanese Patent Application Laid-Open No. 2002-325179 discloses a technology such that an invention has a plurality of γ-conversion tables used to convert density, and that at least one of the γ-conversion tables has characteristics not to cause data, in a low density area that is wider than the other γ-conversion tables, to be reproduced. In the technology, the γ-conversion tables are switched by selecting a table according to information obtained from a feature extraction unit that expresses a feature of image data using multivalue, and also according to threshold values.

A technology for color copiers as follows is also known. The color copier determines whether image data for red, green, and blue (RGB image data) obtained from a scanner is any image of text, halftone dots, photograph, etc. according to a feature amount of the image (first feature amount). The color copier performs first gradation conversion on pixels that are determined as text using a gradation conversion table for text image. The color copier also performs first gradation conversion on pixels that are determined as photograph or halftone dots using a gradation conversion table for a photograph image. In this case, for example, the gradation conversion table for the text image is used for a process where reproduction of text is more preferential to gradation, and has characteristics of high-contrast gradation. The gradation conversion table for the photograph image is used for a process where gradation is more preferential to the reproduction of the text, and has characteristics of low-contrast gradation.

For improvement of image quality, there is another case. In this case, a second feature amount is extracted from image data for yellow, magenta, cyan, and black (YMCK image data), it is determined whether the second feature amount indicates text, halftone dots, or photograph, second gradation conversion is performed thereon according to each of the cases, and error diffusion is performed. For example, fixed threshold values for the error diffusion are used for pixels determined as text from the second feature amount, and quantization threshold values that periodically oscillate are used for image data determined as an area other than the text from the second feature amount, such as photograph and halftone dots. Consequently, it is possible to perform various gradation processes in which reproduction of text, reproduction of halftone dots, and gradation reproduction of a photograph image are preferentially performed, respectively.

In the technology, characteristics of a first gradation converter are switched according to text image, photograph, or halftone dots based on the result of extracting the first feature amount, and the first gradation conversion is performed. Further, it is determined whether data is for text, halftone dots, and photograph from the result of extracting the second feature amount, and then the second gradation conversion is performed. Furthermore, an amplitude of oscillations of the quantization threshold values is switched to perform the process of error diffusion.

However, under the processes, in the photograph mode, toner in the text portion flies off to cause a blurred character to occur, and therefore, there may come up such a defect on the image that a sharp character is not obtained. This is because the character is affected by changes of the gradation conversion tables (printer γ tables) during the first gradation conversion in the process of extracting feature amounts.

SUMMARY OF THE INVENTION

It is an object of the present invention to at least solve the problems in the conventional technology.

An image processing apparatus according to one aspect of the present invention includes an image-quality-mode receiving unit that receives a selection of an image quality mode for forming an image based on image data; a first gradation converting unit that performs a gradation conversion of the image data by setting a gradation conversion parameter based on the image quality mode; a feature extracting unit that performs a gradation conversion of a feature-extraction threshold based on the gradation conversion parameter, and extracts, based on the feature-extraction threshold on which the gradation conversion is performed, a feature amount from the image data on which the gradation conversion is performed; and a second gradation converting unit that performs a gradation conversion of the image data by setting a gradation conversion parameter based on a result of extracting the feature amount and the image quality mode.

An image processing method according to another aspect of the present invention includes receiving a selection of an image quality mode for forming an image based on image data; performing a gradation conversion of the image data by setting a gradation conversion parameter based on the image quality mode; feature extracting including performing a gradation conversion of a feature-extraction threshold based on the gradation conversion parameter, and extracting, based on the feature-extraction threshold on which the gradation conversion is performed, a feature amount from the image data on which the gradation conversion is performed; and performing a gradation conversion of the image data by setting a gradation conversion parameter based on a result of extracting the feature amount and the image quality mode.

A computer-readable recording medium according to still another aspect of the present invention stores an image processing program that causes a computer to execute the above image processing method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A to 5D are diagrams for explaining a primary-differential edge detection filter;

FIG. 21 is a diagram for explaining quantization threshold values;

FIG. 22 is a diagram for explaining an example of low image density;

FIG. 23 is a diagram for explaining an example of intermediate image density;

FIG. 25 is a diagram for explaining quantization threshold values;

FIG. 26 is a diagram for explaining quantization threshold values;

DETAILED DESCRIPTION OF THE PREFERRED EMBODIMENTS

Exemplary embodiments of an image processing apparatus, an image processing method, and a computer product according to the present invention are explained in detail below with reference to the accompanying drawings.

Figure 1:
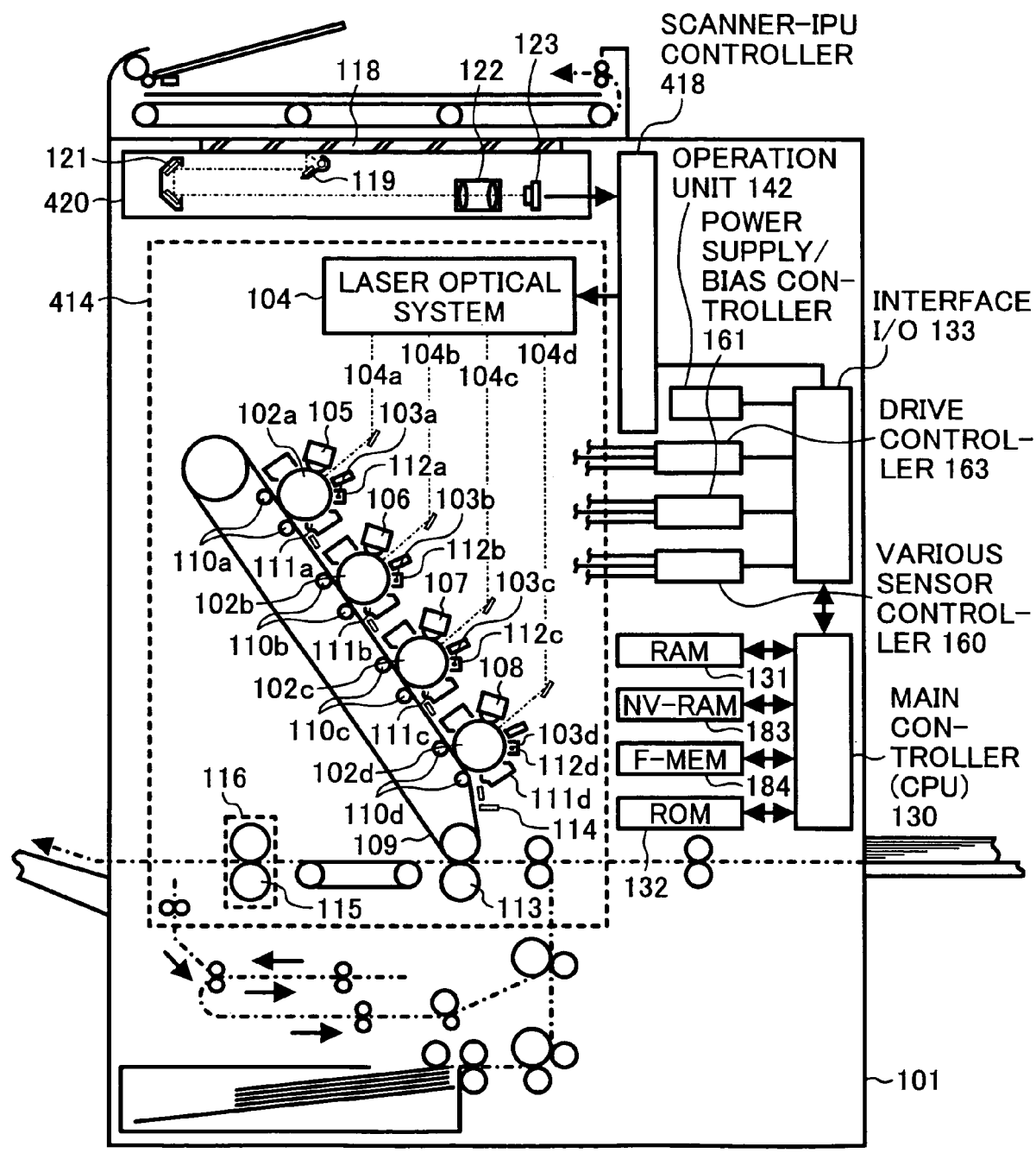
FIG. 1 is a schematic diagram of an overall electrophotographic copier according to one embodiment of the present invention.

FIG. 1 is a schematic diagram of an overall electrophotographic copier according to one embodiment of the present invention. The electrophotographic copier (hereinafter, "copier") implements an image processing apparatus according to one embodiment of the present invention of FIG. 1. Four organic photoconductor (OPC) drums (hereinafter, "photoconductor drums") 102 (102a to 102d) that are image carriers are arranged at the nearly center of a copier body 101. Sequentially arranged around the photoconductor drums 102a to 102d are those as follows. There are chargers 103a to 103d that charge the respective surfaces of the photoconductor drums 102a to 102d, and laser optical systems 104a to 104d that radiate semiconductor laser light onto the surfaces of the photoconductor drums 102a to 102d that are uniformly charged and form electrostatic latent images respectively. There are also a black developing device 105 and three color developing devices 106, 107, and 108 for yellow Y, magenta M, cyan C that supply toners of colors to the electrostatic latent images and develop them to obtain toner images of the colors. There are also an intermediate transfer belt 109 to which the toner images of the colors formed on the respective photoconductor drums 102a to 102d are sequentially transferred, and bias rollers 110a to 110d that apply transfer voltage to the intermediate transfer belt 109. There are also cleaning devices 111a to 111d that remove toner remaining on the respective surfaces of the photoconductor drums 102a to 102d after the toner images are transferred, and dechargers 112a to 112d. Provided for the intermediate transfer belt 109 are a transfer bias roller 113 that applies a voltage for transferring the toner images having been transferred, to a transfer paper, and a belt cleaning device 114 for cleaning remaining toner images from the intermediate transfer belt 109 after the toner images are transferred to the transfer paper.

A fixing device 116 that fixes the toner images on the transfer paper by applying heat and pressure thereto is arranged at an end of a conveying belt 115 on its exit side. The conveying belt 115 conveys the transfer paper separated from the intermediate transfer belt 109. A discharged paper tray 117 is attached to an exit of the fixing device 116.

Arranged above the laser optical systems 104 are a contact glass 118 that serves as a document table provided on the upper side of the copier body 101, an exposure lamp 119 that radiates scanning light to a document on the contact glass 118, a reflective mirror 121 for introducing the light reflected on the document to an imaging lens 122, and an image sensor array 123 into which the light is input, the image sensor array 123 being formed with charge-coupled devices (CCD) that are optoelectronic transducers. Image signals converted to electrical signals in the image sensor array 123 pass through the image processing apparatus (not shown) and controls laser oscillation of a semiconductor laser in the laser optical systems 104.

Figure 2:
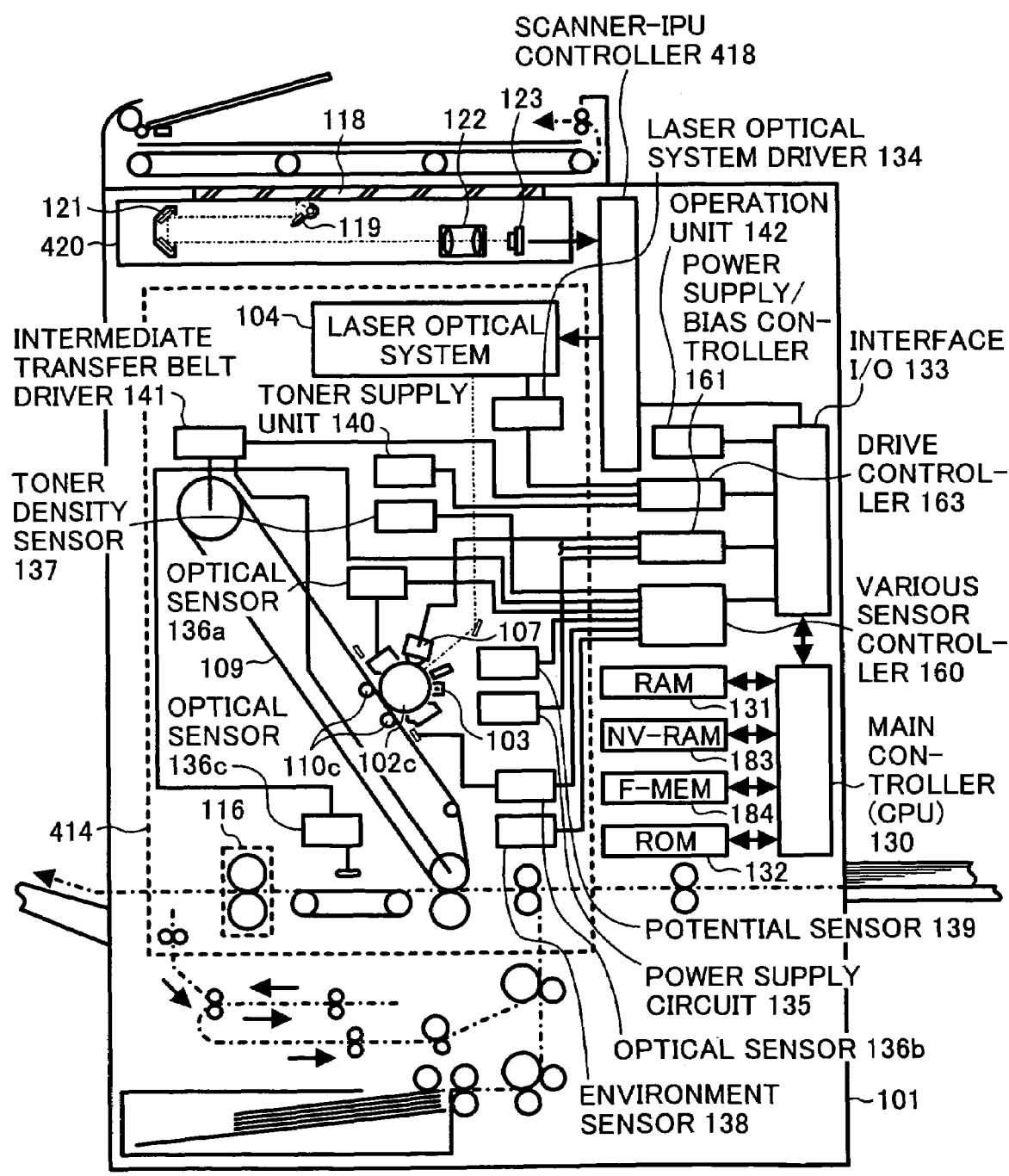
FIG. 2 is a block diagram of a control system of the copier.

A control system in the copier is explained below. As shown in FIG. 2, the control system includes a main controller (Central Processing Unit (CPU)) 130. A Read Only Memory (ROM) 132, a Random Access Memory (RAM) 131, a non-volatile (NV) RAM 183, flash memory 184 are provided for the main controller 130. The NV-RAM 183 stores various parameters, and the flash memory 184 stores a control program. Those as follows are also connected to the main controller 130 through an interface I/O 133. That is, there are a laser optical system driver 134, a power supply circuit 135, an optical sensor 136 provided in each of imaging portions for YMCK, respectively, a toner density sensor 137 installed in each of the developing devices for YMCK, an environment sensor 138, a photoconductor surface potential sensor 139, a toner supply unit 140, an intermediate transfer belt driver 141, an operation unit 142, a various sensor controller 160, a power supply/bias controller 161, and a driver controller 163. The laser optical system driver 134 controls each laser output of the laser optical systems 104. The power supply circuit 135 applies a predetermined discharge voltage for charging to the chargers, supplies developing bias of a predetermined voltage to the developing devices 105, 106, 107, and 108, and applies a predetermined transfer voltage to the bias rollers 110a to 110d and to the transfer bias roller 113.

The optical sensor 136 includes an optical sensor 136a, an optical sensor 136b, and an optical sensor 136c that are shown in the FIG. 2. The optical sensor 136a is provided in each of the photoconductor drums 102a to 102d and is used to detect each amount of toner deposition thereon. The optical sensor 136b is provided opposite to the intermediate transfer belt 109 and detects an amount of toner deposition on the intermediate transfer belt 109. The optical sensor 136c is provided opposite to the conveying belt 115 and detects an amount of toner deposition on the conveying belt 115. In an actual case, however, the amount of toner deposition may be detected by one of the optical sensors 136a, 136b, and 136c.

Each of the optical sensors 136a, 136b, and 136c includes a light emitting element such as a light emitting diode and a light receiving element such as a photosensor that are arranged near a region on the downstream of a location where images are transferred from the respective photoconductor drums 102a to 102d. Each of them detects an amount of toner deposition on a toner image as a latent image as a detection pattern formed on the photoconductor drum 102, detects an amount of toner deposition on a background portion for each of the colors, and detects a so-called residual potential after the photoconductor drum is decharged.

A detection output signal output from each of the optical sensors 136a to 136c is applied to an optical sensor controller (not shown). The optical sensor controller obtains a ratio between the amount of toner deposition on a toner image as a detection pattern and the amount of toner deposition on the background portion, compares the ratio with a reference value to detect fluctuations of the image density, and corrects each control value of the toner density sensor 137 for each of YMCK.

The toner density sensor 137 detects toner density based on changes in a permeability of developer stored in each of the developing devices 105 to 108. The toner density sensor 137 has functions of comparing the toner density value detected with the reference value and applying a toner supply signal to the toner supply unit 140 when the toner density is below a predetermined value which is short of toner. The toner supply signal applied in this case indicates an amount corresponding to the shortage. The potential sensor 139 detects a surface potential of each of the photoconductor drums 102a to 102d, and the intermediate transfer belt driver 141 controls the drive of the intermediate transfer belt 109.

An image processing unit in the copier is explained below with reference to a block diagram of FIG. 3.

Figure 3A:
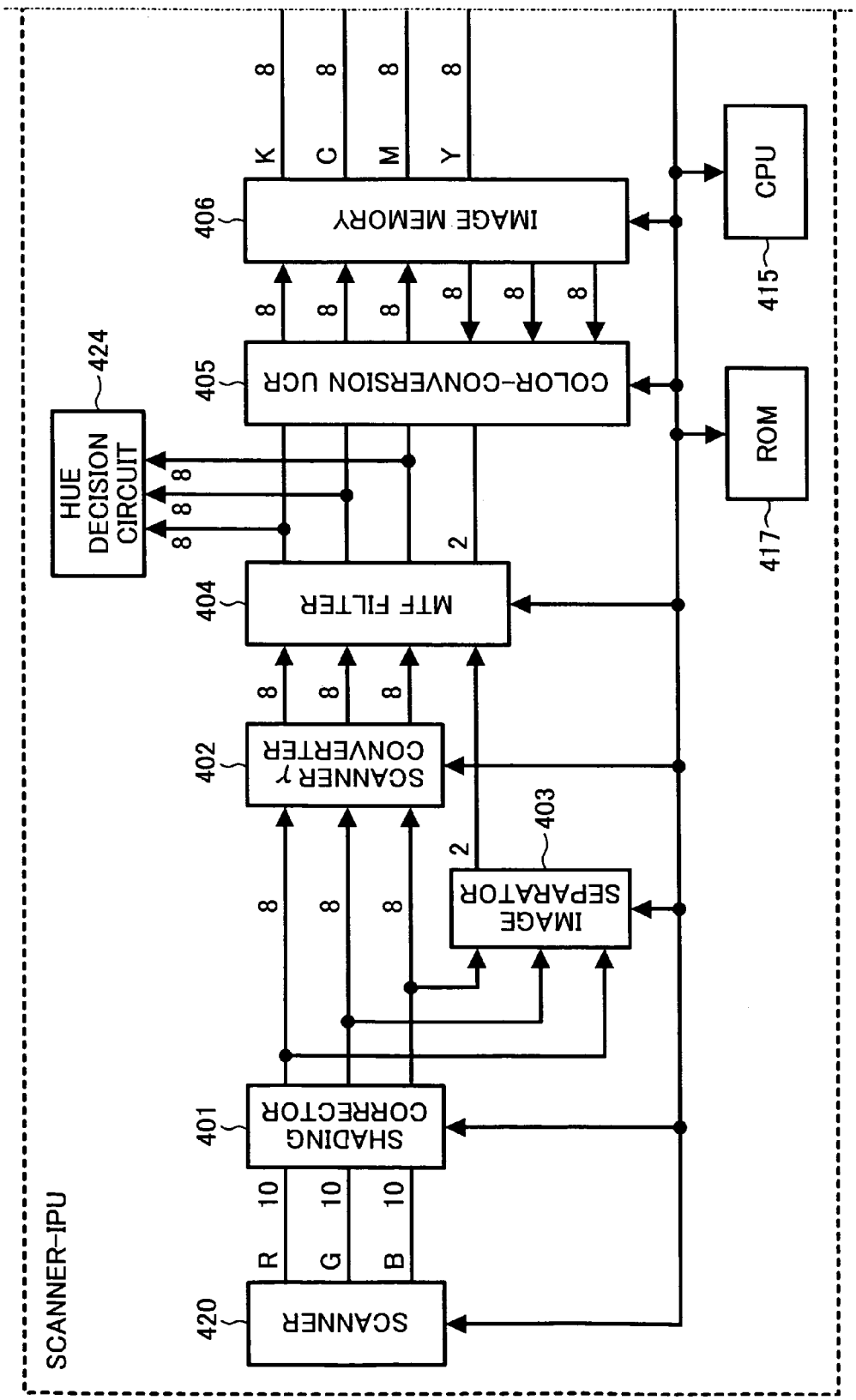
FIG. 3 is a block diagram of an overall configuration of an image processing unit in the copier.
Figure 3B:
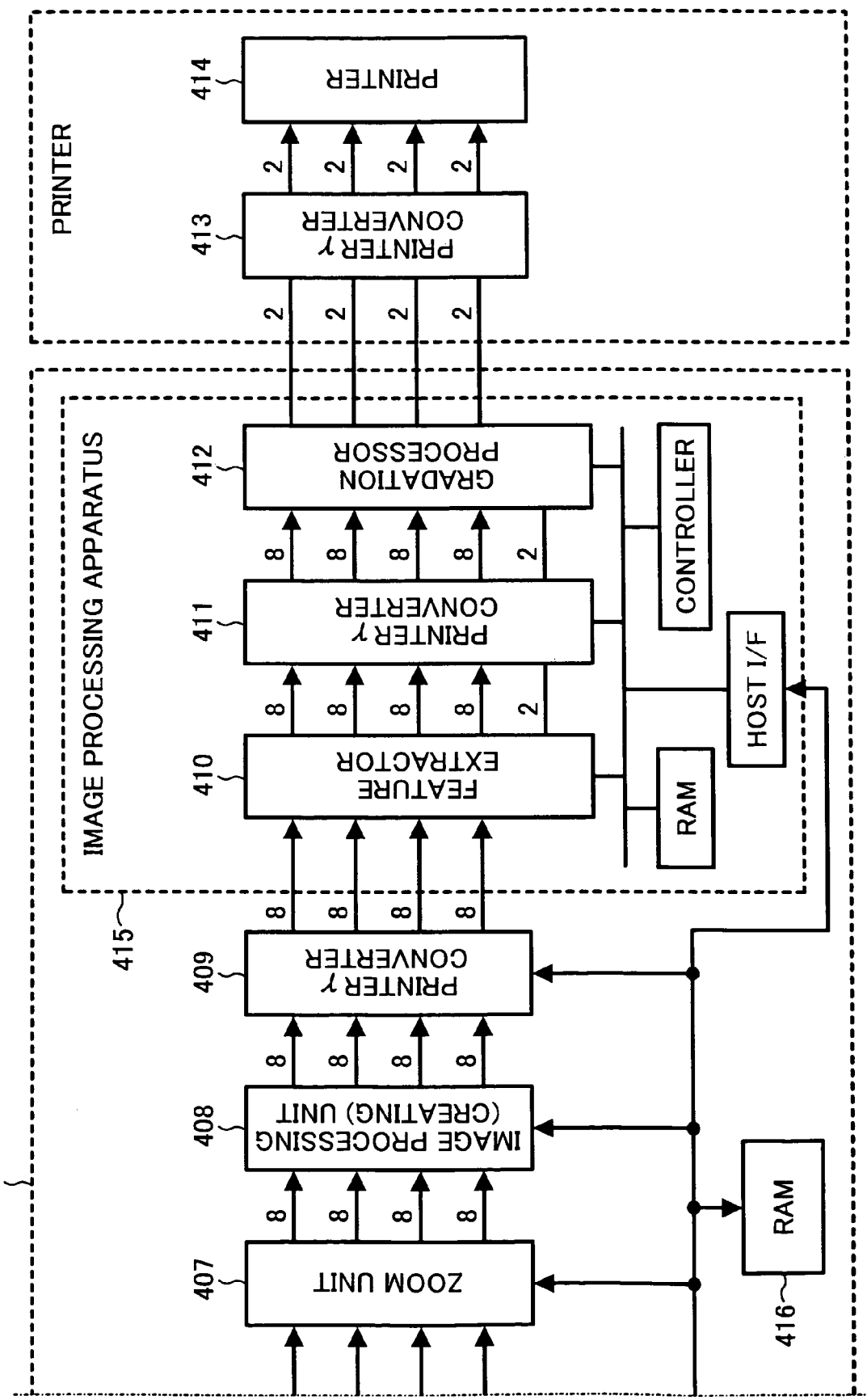

As shown in FIG. 3, reference numeral 420 denotes a scanner, 401 a shading corrector, 402 a scanner γ converter, 403 an image separator, 404 a modulation transfer function (MTF) filter, 405 a color-conversion UnderColor Removal (UCR) processor, 424 a hue decision unit (circuit), 406 an image memory, 407 a zoom unit, 408 an image processing (creating) unit, 409 a first printer γ converter (or printer γ converter 409), 410 to 412 processing blocks in an image processor 1204 in which 410 a feature extractor, 411 a second printer γ converter (or printer γ converter 411), 412 a gradation processor, 413 a third printer γ converter (or printer γ-converter 413), and 414 a printer that is a printer engine. Reference numeral 415 denotes a CPU that controls the image processing apparatus, 417 ROM, and 416 RAM. The components provided on the side of the scanner 420 in the image processing apparatus are included in a scanner-Image Processing Unit (IPU) controller 418.

A document to be copied is scanned by the scanner 420, and color data of the document is divided into R, G, and B, and the color data is read as a 10-bit signal as an example. The shading corrector 401 subjects the image signal read to processing so as to correct non-uniformity thereof in a main scanning direction, and outputs it as an 8-bit signal.

The scanner γ converter 402 converts the signal read from the scanner 420 into luminance data from reflectivity data. The image separator 403 discriminates a text portion from a photograph portion in the image, and also discriminates chromatic color from achromatic color of the image.

The MTF filter 404 performs a process of changing frequency characteristics of the image signal such as edge enhancement and smoothing according to taste of a user who desires a sharp image or a soft image, and performs an edge enhancement process (adaptive edge enhancement process) according to an edge degree of the image signal. For example, edge enhancement is executed to a character edge but not executed to a halftone-dot image. The adaptive edge enhancement is executed to R, G, B signals, respectively.

Figure 4:
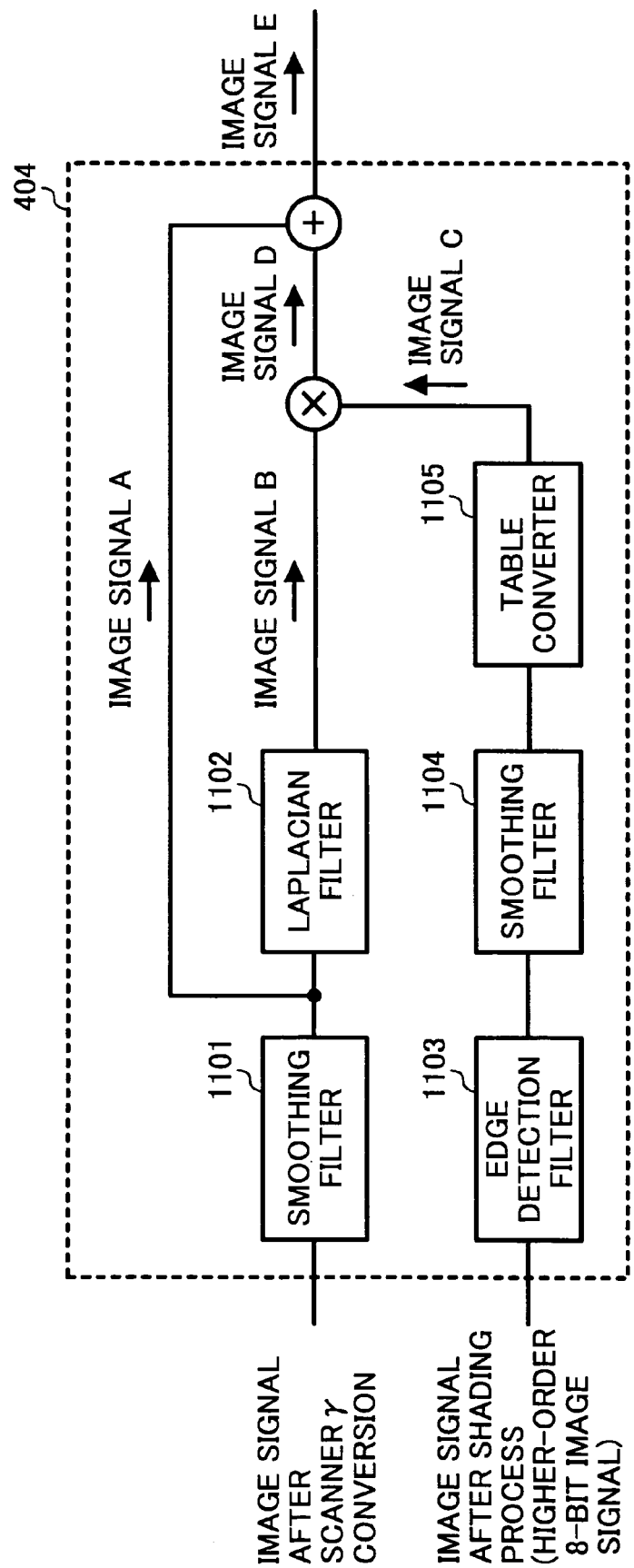
FIG. 4 is a block diagram of an example of an adaptive edge enhancement circuit.

FIG. 4 indicates an example of a circuit that performs adaptive edge enhancement in the MTF filter 404. The image signal converted from a reflectivity linear to a luminance linear by the scanner γ converter 402 is smoothed by a smoothing filter 1101 of FIG. 4. For smoothing, coefficients of table 1 are used as an example.

TABLE 1

| ($\frac{1}{18}$)× | | | | |
|---|---|---|---|---|
| 0 | 1 | 2 | 1 | 0 |
| 1 | 2 | 4 | 2 | 1 |
| 0 | 1 | 2 | 1 | 0 |

A differential component of the image data is extracted by a 3×3 Laplacian filter 1102 that is provided in the next stage. A specific example of the Laplacian filter is as shown in table 2.

TABLE 2

| −1 | 4 | −1 |
|---|---|---|
| 0 | −1 | 0 |

Of the image signal of 10 bits that is not γ-converted by the scanner γ converter, an edge detection filter 1103 detects edge amounts of a higher-order 8-bit (as an example) component. A specific example of the edge detection filter 1103 is shown in FIG. 5A to FIG. 5D.

Of the edge amounts obtained by the edge detection filter 1103, a maximum value is used as the edge degree. More specifically, the edge degree is subjected to smoothing by a smoothing filter 1104 that is provided in the rear stage as necessary. In such a manner as above, influence of a difference in sensitivity of the scanner between even-number pixels and odd-number pixels is reduced.

As an example, coefficients as shown in table 3 are used.

TABLE 3

| (¼)× | | |
|---|---|---|
| 1 | 2 | 1 |

Figure 6:
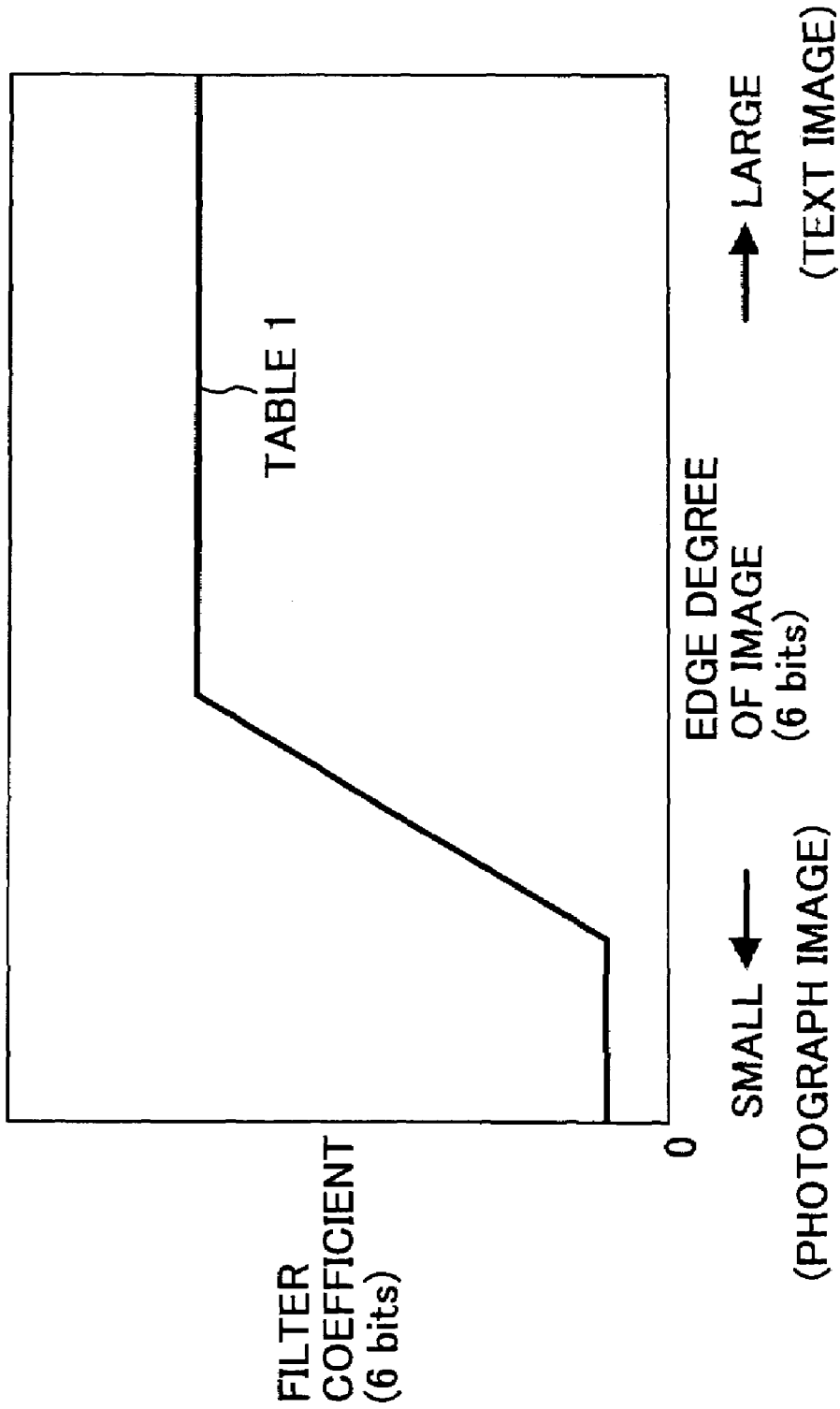
FIG. 6 is a diagram for explaining an adaptive edge enhancement filter table.

A table of the edge degree obtained is converted by the table converter 1105. Shade of a line and a dot (including contrast and density) and smoothness of halftone dots are specified using the values of the table. An example of a relation between the edge degree of an image and a filter coefficient in the table is shown in FIG. 6. A black line or a black dot against a white background causes the edge degree to be the highest. However, there is a case where a boundary between pixels is smooth like printed small halftone dots, a silver salt photograph, and a document by a thermal transfer method. In this case, if the boundary is smoother, the edge degree is made lower.

A product (image signal D) of the edge degree (image signal C) converted by the table converter 1105 of FIG. 4 and the output value (image signal B) of the Laplacian filter 1102 is added to the image signal (image signal D) after being subjected to smoothing, and the image signal obtained through addition is transmitted as an image signal E to a circuit in the rear stage of the MTF filter 404.

The color-conversion UCR processor 405 corrects a difference between color separation characteristics of an input system and spectral characteristics of respective color materials as an output system, performs color correction for calculating amounts of the color materials Y, M, and C required for faithful color reproduction, and performs a UCR process for replacing a portion where three colors of Y, M and C overlap, with Bk (black). The color correction process can be achieved by performing matrix operation of the following equation $$\begin{pmatrix} Y(\text{hue}) \\ M(\text{hue}) \\ C(\text{hue}) \end{pmatrix} = \begin{pmatrix} a11(\text{hue}) & a12(\text{hue}) & a13(\text{hue}) \\ a21(\text{hue}) & a22(\text{hue}) & a23(\text{hue}) \\ a31(\text{hue}) & a32(\text{hue}) & a33(\text{hue}) \end{pmatrix} \begin{pmatrix} s(B) \\ s(G) \\ s(R) \end{pmatrix}$$

where s(R), s(G), s(B) represent R, G, B signals of the scanner 420 after these signals are subjected to scanner γ-conversion, respectively. The "hue" indicates each hue such as White, Black, Yellow, Red, Magenta, Blue, Cyan, and Green. A division of the hues is an example, and therefore, the hues may be divided into further smaller parts. A matrix coefficient aij(hue) is decided for each hue by the spectral characteristics of the input system and the output system (color materials). In this case, the primary masking equation is taken as an example, but the color can be more accurately corrected by using the term of second degree such as s(B)×s(B) and s(B)× s(G), or the term of still higher degree. Alternatively, the Neugebauer equation may also be used. In each case, Y, M, C can be obtained from the values of s(B), s(G), and s(R).

The hue is decided in the following manner as an example.

A relation between values read by the scanner 420 and calorimetric values is expressed by the following equation using a predetermined coefficient bij (i, j=1, 2, 3)

$$\begin{pmatrix} X \\ Y \\ Z \end{pmatrix} = \begin{pmatrix} b11 & b12 & b13 \\ b21 & b22 & b23 \\ b31 & b32 & b33 \end{pmatrix} \begin{pmatrix} B \\ G \\ R \end{pmatrix}$$

From the definition of the colorimetric value, the following correlations can be obtained.

$L^* = 116((Y/Yn)^\wedge(1/3)) - 16$ (If $Y/Yn > 0.008856$)

or, $L^* = 903.3(Y/Yn)$ (If $Y/Yn <= 0.008856$)

$a^* = 500(f(X/Xn) - f(Y/Yn))$ $b^* = 200(f(Y/Yn) - f(Z/Zn))$ where $f(t) = t^\wedge(1/3)$ if $t > 0.008856$, or $f(t) = 7.787*t + 16/116$ if $t <= 0.008856$, and Yn, Xn, Zn are constants.)

$C^* = (a^{*\wedge}2 + b^{*\wedge}2)^\wedge 0.5$ $hab = \arctan(b^*/2)$

Figure 7:
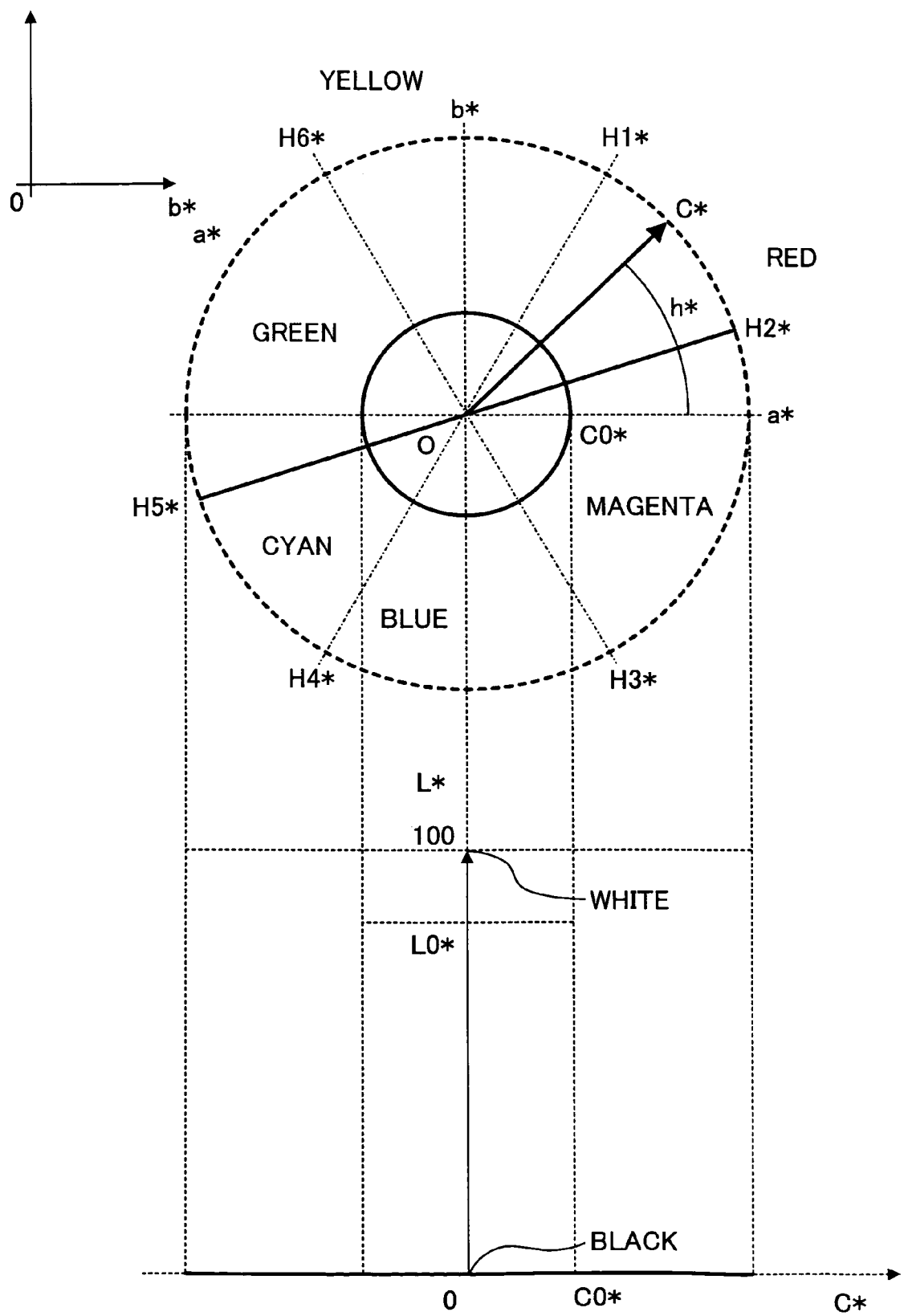
FIG. 7 is a diagram for explaining hues.

Therefore, it is possible to decide to which of the hues a certain pixel of the document read from the R, G, B signals of the scanner 420 corresponds. An example of the hues is shown in FIG. 7. Since the hues of FIG. 7 are well known, only its outline is explained below. A center of concentric circles in the upper side indicates an L*a*b* color system, and a*=b*=0 is an axis of an achromatic color. Each distance from the center of the circle along radiating directions indicates chroma C*, and an angle from a straight line of a*>0 and b*=0 to a certain point is a hue angle h*. Each hue of Yellow, Red, Magenta, Blue, Cyan, and Green has chroma C*≧c0* with respect to a reference value c0* of chroma, and each hue angle is defined as follows (examples):

Yellow: H1*≦h*<H6*
Red: H2*≦h*<H1*
Magenta: H3*≦h*<0 and 0≦h*<H2*
Blue: H4*≦h*<H3*
Cyan: H5*≦h*<H4*
Green: H6*≦h*<H5*

A vertical axis in the lower side of FIG. 7 indicates L* (Luminance), and chroma c* is c*≦c0*, definition is made as follows:

White: L=100
Black: L=0

Alternatively, as a simpler manner, a hue can be decided from a ratio s(B):s(G):s(R) of the signals of s(B), s(G), s(R) and an absolute value.

On the other hand, the UCR process can be performed by calculating using the following equations.

$Y' = Y - a \cdot \min(Y, M, C)$ $M' = M - a \cdot \min(Y, M, C)$ $C' = C - a \cdot \min(Y, M, C)$ $Bk = a \cdot \min(Y, M, C)$ In the above equations, "a" is a coefficient used to decide an amount for UCR, and if a=1, then 100% UCR process is performed. "a" may be a fixed value. For example, by setting a to a value close to 1 in a high density portion and to a value close to 0 in a highlight portion (low image density portion), an image in the highlight portion can be made smoother. The color correction coefficients are different from one another for each of 14 hues obtained by further dividing each of six hues of RGBYMC into two to obtain 12 hues and further adding black and white to the 12 hues.

The hue decision unit 424 of FIG. 3 determines to which of the hues the image data read belongs, and selects a color correction coefficient for each hue based on the result of decision.

The image memory 406 stores YMCK image signals having been subjected to the color-conversion UCR process or stores RGB signals that are not subjected to color-conversion UCR process.

The zoom unit 407 zooms in and out an image vertically and horizontally, and the image processing (creating) unit 408 performs repeat process.

A parameter for gradation conversion to be set in the printer γ converter 409 and in the printer γ converter 411 that is performed in the image processor 1204 is changed according to an image quality mode selected by the user through an operation unit 142 of the copier.

The feature extractor 410 performs a feature extraction process (explained later) and determines whether a document image corresponds to a text portion, a halftone-dot portion, a portion around a character, a state inside a character, and a photograph portion based on the result of feature extraction.

Referring to the four-quadrant chart of FIG. 8, a setting example, in which the parameter for gradation conversion to be set in the printer γ converter 409 and in the printer γ converter 411 of the image processor 1204 is for a text mode, is explained below.

Figure 8:
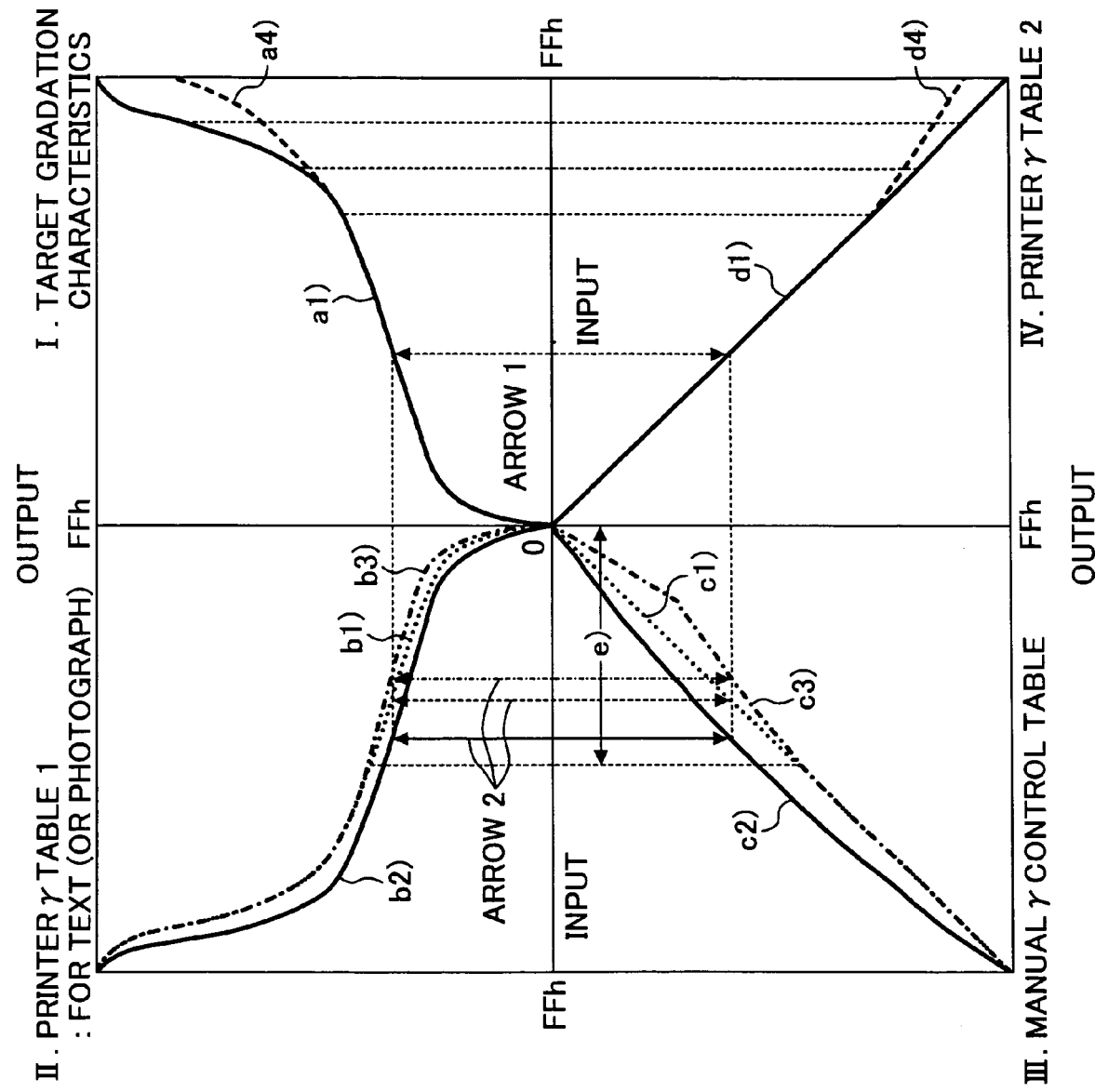
FIG. 8 is a four-quadrant chart of a printer γ table.

The horizontal axis of a first quadrant of FIG. 8 represents a target value after printer γ-conversion and corresponds to the density of a document, and the vertical axis corresponds to an output value or the density of an image to be output. Graph a1) indicates characteristics that are a target of a portion other than the text portion in the text mode in which an appropriate process for a text image is performed. Graph a4) indicates gradation characteristics that are a target of the text portion in the text mode. The target gradation characteristics are decided (explained later) by Automatic Color Calibration (ACC) explained later. In the text mode, the reason that the gradation characteristics targeted in the text portion and the photograph portion other than the text portion are made different as shown in graph a1) and graph a4) is as follows. When a latent image of the text portion or so with a high spatial frequency is formed on the photoconductor drum 102, a toner amount deposited on the text portion unnecessarily increases due to so-called edge effect upon development, which causes the density of a character to increase too highly or the toner deposited on the text portion to fly off around the text. Therefore, in order to suppress occurrence of these trouble, the output value is set to a slightly lower value than the top density FFh.

A second quadrant indicates printer γ table 1 set in the printer γ converter 409 and the horizontal axis thereof is an input to the printer γ table. Graphs b1) to b3) correspond to graphs c1) to c3) of a third quadrant, respectively.

The third quadrant indicates a manual γ control table that the user or a service engineer can select for image density control by an operation through the operation unit 142, and the vertical axis represents an output value after γ-conversion. The graphs c1) to c3) represent a modified example of the characteristics of the manual γ control table.

The relation between the graphs b1) to b3) of the second quadrant and the graphs c1) to c3) of the third quadrant indicates that parameters set in the printer γ converter 409 become parameters as the graphs b1) to b3) when the user or the service engineer selects the characteristics as the graphs c1) to c3). For example, as compared with the graph c1), in the graph c2), the parameter on the whole is such that the density of an image to be output is caused to decrease with respect to the graph a1) as the target density of the first quadrant. On the other hand, referring to the graph c3), parameter b3) is set in the printer γ converter 409 so that the output density of an area e) with low density of the document becomes higher than the target density a1).

A fourth quadrant represents a parameter for gradation conversion set in a second printer γ-conversion table (printer γ table 2). Graphs d1) and d4) corresponds to the graphs a1) and a4) of the first quadrant, respectively.

Figure 9:
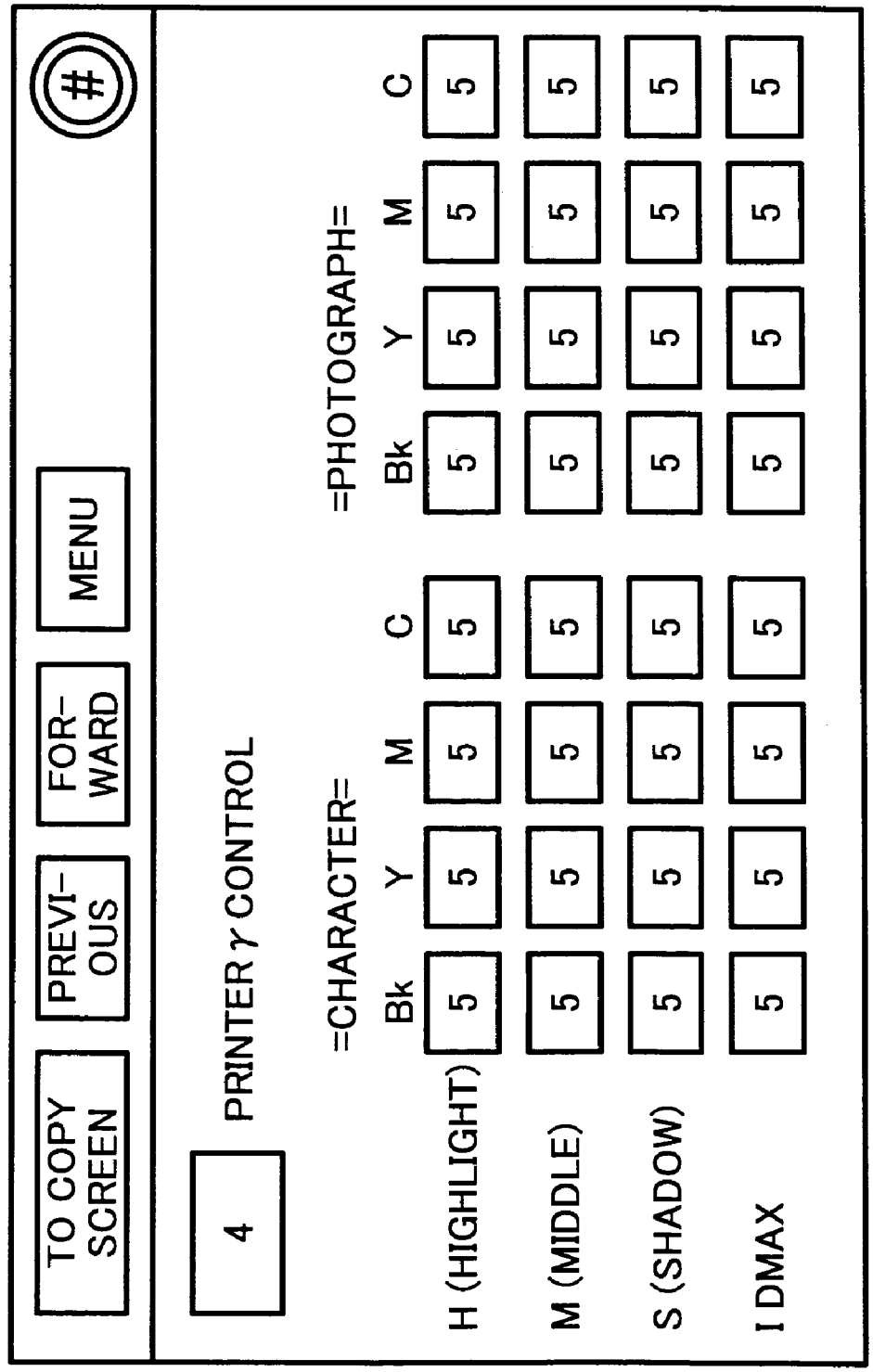
FIG. 9 is a diagram for explaining an example of a selection screen of γ control according to a manual.

FIG. 9 indicates an example of the selection screen (which is displayed on the touch panel of the operation unit 142) for manual γ control shown in the third quadrant.

Referring to the four-quadrant chart of FIG. 8, a setting example, in which the parameter for gradation conversion to be set in the printer γ converter 409 and in the printer γ converter 411 of the image processor 1204 is for a photograph mode, is explained below.

In the photograph mode that is a mode in which an appropriate process for a photograph image is performed, parameters are allocated to the printer γ table 1 and the printer γ table 2 in the same manner as that for the text mode.

The graph a1) of the first quadrant indicates target gradation characteristics of a portion other than the text portion in the photograph mode, and the graph a4) indicates target gradation characteristics of the text portion.

The graphs b1) to b3) of the second quadrant are parameters of the printer γ tables 1 to be set in the printer γ converter 409. The printer γ tables 1 correspond to the manual γ control tables of the graphs c1) to c3) of the third quadrant.

The graphs of the fourth quadrant indicate parameters of the printer γ table 2 to be set in the printer γ converter 411 that is performed in the image processor 1204. The graph d1) indicates a parameter to be set as the printer γ table 2 corresponding to the target gradation characteristics of the portion other than the text portion in the graph a1). The graph d4) indicates a parameter to be set as the printer γ table 2 corresponding to the target gradation characteristics of the text portion in the graph a4) of the first quadrant.

The feature extractor 410 extracts a feature amount from the image data based on predetermined threshold of feature amounts. The printer γ converter (first gradation converter) 409 converts gradation of the image data not based on the feature amount extracted from the image but based on a predetermined gradation conversion table. The printer γ converter (second gradation converter) 411 converts gradation of the image data after the gradation conversion process is performed according to the result of extracting the feature amount extracted in the feature extractor 410. The operation unit 142 that serves as an image-quality-mode receiving unit receives selection of an image quality mode such as the text mode and the photograph mode when an image is to be formed in the printer 414 based on the image data.

As explained with reference to FIG. 8, the CPU 415 selects desired gradation characteristics from a plurality of gradation conversion characteristics and switches according to the selection of the image quality mode accepted by the operation unit 142 whether the gradation characteristics are to be reflected in the printer γ converters 409 and 411 (gradation characteristics selector).

The printer γ converter 409 converts gradation for photograph (or text) not depending on the feature amount of the image in the above manner, and the printer γ converter 411 performs a gradation conversion process according to the result of extracting the feature amount of the image extracted by the feature extractor 410.

Consequently, even if a difference occurs between the result of determination on the text portion that is performed in the image separator 403 before gradation conversion in the printer γ converter 409, and the result of determination on the text portion in the feature extractor 410, it is possible to minimize occurrence of any defect on the image.

An example of the printer γ tables 1 and 2 when a text-photograph mode is selected is explained below with reference to FIG. 10. The text-photograph mode is a most appropriate mode for an image including text and photograph.

Figure 10:
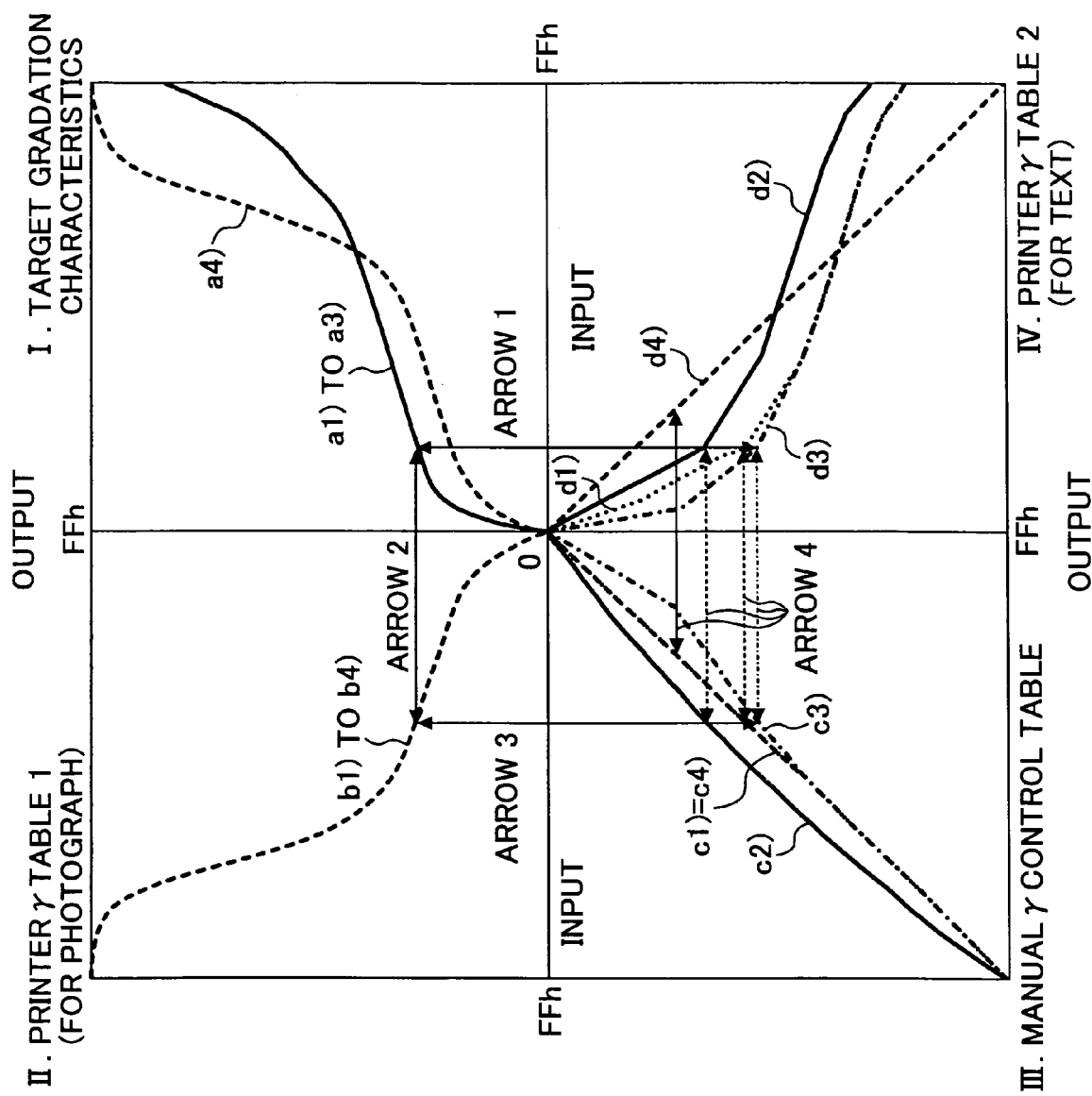
FIG. 10 is a four-quadrant chart of a printer γ table.

Graphs a1)=a2)=a3) of a first quadrant in FIG. 10 indicate target gradation characteristics of text portion in the text-photograph mode, and graph a4) indicates target gradation characteristics of an area (photograph portion) other than the text.

Graphs b1) to b4) of a second quadrant indicate the printer γ table 1 to be set in the printer γ converter 409, and this table has a same conversion curve for the text portion and the photograph portion.

Graphs of a third quadrant indicate a manual γ control table, similarly to FIG. 8, and graph c1) and c4) indicate gradation conversion characteristics that are "through" for the photograph portion or the text portion where no gradation characteristics are changed. Graph c2) indicates an example of a gradation table for the text portion that is controlled so that the whole image density characteristics from a low density area over a high density area are made low. Graph c3) indicates an example for a manual γ control table for the text portion that is set so that the image density in the low image density area is made slightly higher.

Graph d1) of a fourth quadrant indicates a gradation conversion parameter to be set in the printer γ converter 411 that is performed in the image processor 1204. The graph d1) also indicates an example of gradation characteristics when it is the target characteristics of the graph a1) of the first quadrant, when the characteristics of the printer γ table 1 to be set in the printer γ converter 409 are expressed by the graph b1), and when the manual γ control table shown in the third quadrant is "through" in c1). Likewise, graph d2) indicates a gradation conversion parameter to be set in the printer γ converter 411 if the manual γ control table of the third quadrant is the graph c2). Graph d3) indicates a gradation conversion parameter to be set in the printer γ converter 411 if the manual γ control table of the third quadrant is the graph c3). Graph d4) indicates a gradation conversion parameter to be set in the printer γ converter 411. The graph d4) also indicates gradation characteristics when it is the target characteristics of the graph a4) of the first quadrant and the characteristics of the printer γ table 1 to be set in the printer γ converter 409 are expressed by the graph b1) and when the manual γ control table shown in the third quadrant is "through" in c1).

Table 4 shows a relation between the image quality mode and the manual γ control tables which are reflected in either of the printer γ table 1 and the printer γ table 2.

TABLE 4

Relation between manual control table and image quality mode

| | Target to be reflected | |
|---|---|---|
| Image quality mode | Printer γ table 1 (for portion other than text portion) | Printer γ table 2 (for text portion) |
| Text mode | For text | None |
| Text-photograph mode | For photograph | For text |
| Photograph mode | For photograph | None |

As mentioned above, the manual γ control tables are switched according to an image quality mode in such a manner that in the text mode or the photograph mode, the relevant manual γ control table is reflected in the printer γ table 1, while in the text-photograph mode, the manual γ control table for the photograph is reflected in the printer γ table 1, and the manual γ control table for the text is reflected in the printer γ table 2 (image-quality-mode receiving unit).

By switching the manual γ control tables according to the image quality mode through manual operation of the operation unit 142, it is possible to control image density of the text portion and of the photograph portion (that includes a half-tone-dot portion) in the image according to user's taste.

The printer γ converter 411 uses gradation conversion characteristics created based on piecewise linear approximation. Therefore, it is possible to perform the processes in the image processor 1204 without using sequential processes as explained later, and perform sufficient gradation conversion required for the photograph portion.

The image processor 1204 can be achieved by a Single Instruction-stream Multiple Data-stream (SIMD) processor. Therefore, the SIMD processor is explained below.

Figure 11:
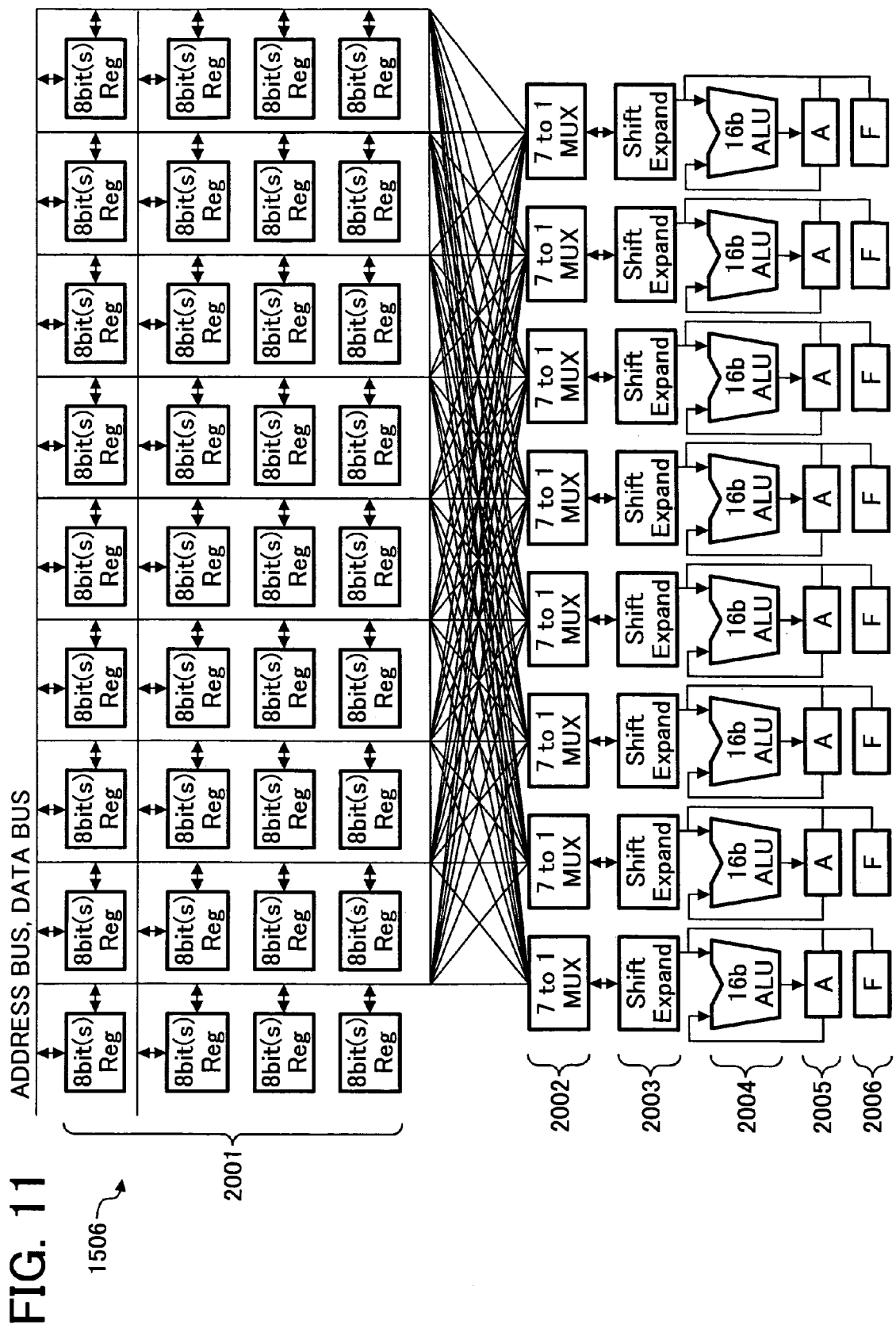
FIG. 11 is a diagram for explaining a configuration of an SIMD processor.

FIG. 11 is a diagram for explaining a schematic configuration of an SIMD processor 1506. The SIMD processor 1506 includes a plurality of processor elements (PEs), and causes them to execute a single instruction to multiple data simultaneously. Each of the PEs includes registers (Reg) 2001 that store data, a multiplexer (MUX) 2002 for accessing a register of another PE, a barrel shifter (ShiftExpand) 2003, an arithmetic logic unit (ALU) 2004, an accumulator (A) 2005 that stores logical results, and a temporary register (F) 2006 that temporarily saves the contents of the accumulator.

Each of the registers 2001 is connected to address bus and data bus (lead wire and word wire), and stores instruction code for defining a process and target data to be processed. The content of the register 2001 is input to the arithmetic logic unit 2004, and the result of arithmetic process is stored in the accumulator 2005. To take a result to the outside of a PE, the result is temporarily saved in the temporary register 2006. The content of the temporary register 2006 is taken out to obtain the result of process related to the target data.

The instruction code is given to the PEs by the same content, and target data to be processed is given to the PEs each in a different state. By referring to the content of the register 2001 of an adjacent PE in the multiplexer 2002, arithmetic results are parallelized, and the results are output to the accumulators 2005.

For example, by arranging the content for one line of image data in the PEs for each pixel and causing the PEs to perform the arithmetic process with the same instruction code, the result of process for one line can be obtained in a shorter time than the sequential process for each pixel; Particularly, for a spatial filtering process, an instruction code for each PE serves as an arithmetic expression itself, and the process can thereby be commonly executed over the whole PEs.

Figure 12A:
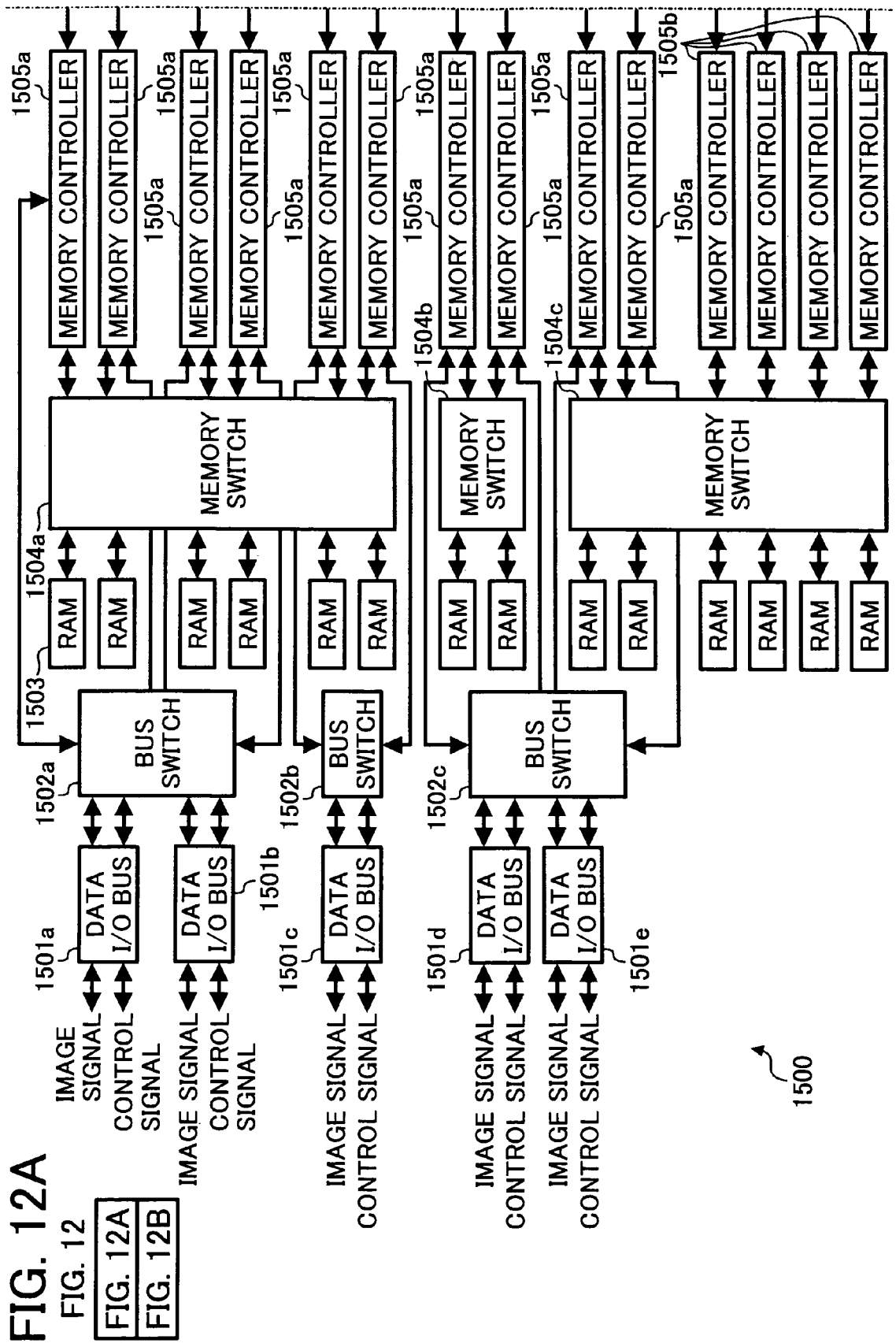
FIG. 12 is a block diagram of a configuration of an SIMD image data processor and a sequential image data processor.
Figure 12B:
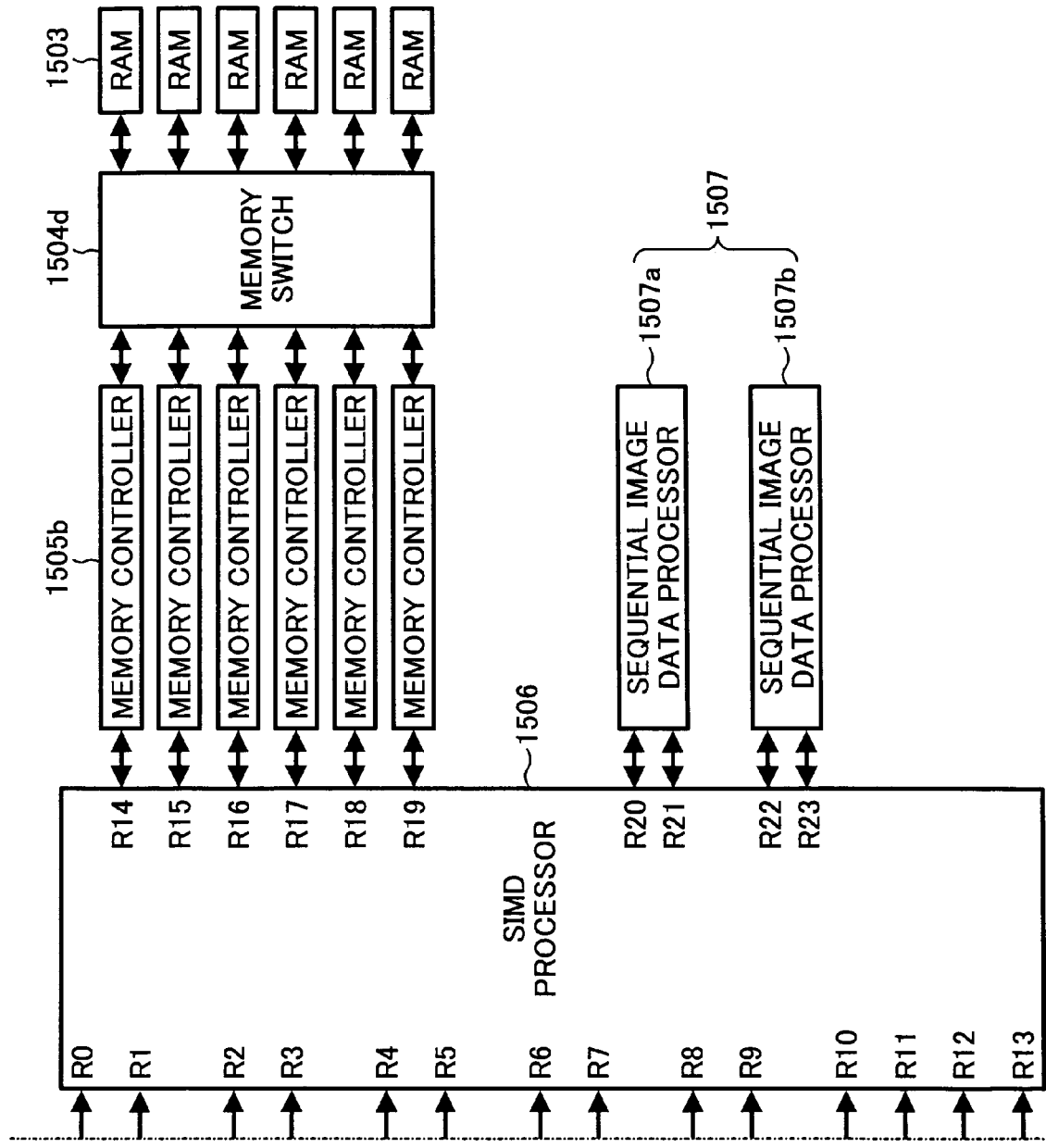

A hardware configuration of a case where an SIMD-type image data process and a sequential-type image data process are used in the image processing apparatus of FIG. 3 is explained below. FIG. 12 is a block diagram of hardware for an SIMD image data processor 1500 and a sequential image data processor 1507. The SIMD image data processor 1500 executes the SIMD-type image data process, and the sequential image data processor 1507 executes the sequential-type image data process. In the embodiment, the SIMD image data processor 1500 is first explained, and the sequential image data processor 1507 is explained next.

Figure 13:
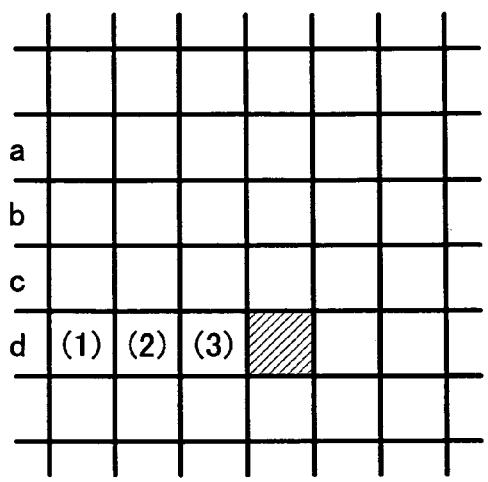
FIG. 13 is a diagram for explaining a positional relation between pixels.

It is noted that the SIMD image data processor 1500 and the sequential image data processor 1507 perform a process on an image as a plurality of pixel lines each of which consists of a plurality of pixels arranged in one direction. FIG. 13 is a diagram for explaining pixel lines, in which four pixel lines a to d are shown. The pixel shaded in the figure is a target pixel to be processed this time.

In the embodiment, for performance of error diffusion process of a target pixel, how the target pixel is affected by its peripheral pixels is studied from pixels included in the same pixel line and pixels included in different pixel lines. The SIMD image data processor 1500 performs an error diffusion process between the target pixel and pixels included in a pixel line different from the pixel line including the target pixel. The sequential image data processor 1507 performs an error diffusion process between the target pixel and pixels (pixels indicated by numbers 1, 2, 3 in a circle in FIG. 13) included in the same pixel line.

The SIMD image data processor 1500 includes the SIMD processor 1506, five data input-output (I/O) buses 1501*a* to 1501*e* for inputting image data and control signals to the SIMD image data processor 1500, bus switches 1502*a* to 1502*c* for switching the data I/O buses 1501*a* to 1501*e* to switch the image data and the control signals to be input to the SIMD processor 1506 and selecting a bus width of a bus connected. The SIMD image data processor 1500 also includes 20 units of RAMs 1503 that store data used for processes of the image data input, memory controllers 1505*a* and memory controllers 1505*b* that control the respective RAMs 1503, and four memory switches 1504*a* to 1504*d* for switching the RAMs 1503 according to the control of the memory controller 1505*a* or the memory controller 1505*b*.

In the configuration explained above, the memory controllers are discriminated by being separated into two as follows. That is, one group of the memory controllers is controlled by the bus switches 1502*a* to 1502*c* and is determined as the memory controllers 1505*b*, while the other group of the memory controllers is not controlled thereby and is determined as the memory controllers 1505*a*.

The SIMD processor 1506 includes a register 0 (R0) to a register 23 (R23). Each of the registers R0 to R23 functions as a data interface between a PE in the SIMD processor 1506 and the memory controller 1505*a* or 1505*b*. The bus switch 1502*a* selects the memory controllers 1505*b* connected to R0 to R3 to input control signals to the SIMD processor 1506.

The bus switch 1502*b* selects the memory controllers 1505*b* connected to R4 and R5 to input a control signal to the SIMD processor 1506. The bus switch 1502*c* selects the memory controllers 1505*b* connected to R6 to R9 to input control signals to the SIMD processor 1506.

The memory switch 1504*a* exchanges image data between PEs of the SIMD processor 1506 and the RAMs 1503 using the memory controllers 1505*b* connected to R0 to R5. The memory switch 1504*b* exchanges image data between PEs of the SIMD processor 1506 and the RAMs 1503 using the memory controllers 1505*b* connected to R6 to R7. The memory switch 1504*c* exchanges image data between PEs of the SIMD processor 1506 and the RAMs 1503 using the memory controllers 1505*a* or the memory controllers 1505*b* connected to R8 to R13.

The memory switch 1504*d* exchanges image data between PEs of the SIMD processor 1506 and the RAMs 1503 using the memory controllers 1505*b* connected to R14 to R19.

An image data controller 1203 (see FIG. 14) inputs image data and control signals for processing the image data into the bus switches 1502*a* to 1502*c* through the data I/O buses 1501*a* to 1501*e*. The bus switches 1502*a* to 1502*c* switches the bus width of the bus connected based on the control signal. The bus switches 1502*a* to 1502*c* indirectly control the memory controllers 1505*b* or directly connected thereto, respectively, to cause the memory switches 1504*a* to 1504*c* to switch them so as to fetch data required for the process of image data from the RAMs 1503.

The SIMD image data processor 1500 receives image data through the image data controller 1203 when error diffusion process is performed. The SIMD image data processor 1500 adds error data and pixel data for a target pixel. The error data is a difference between pixel data for a pixel included in a pixel line processed (previous pixel line) prior to a pixel line (current pixel line) that includes the target pixel, and a predetermined threshold value.

The SIMD image data processor 1500 simultaneously executes addition of the error data to a plurality of target pixels using the SIMD processor 1506. Therefore, any one of the RAMs 1503 connected to the SIMD processor 1506 stores a plurality of error data corresponding to the number of pixels that are collectively processed in the SIMD processor 1506. In the embodiment, it is configured that the SIMD processor 1506 collectively performs the process of addition for one pixel line and the RAM 1503 stores the error data for one pixel line.

Additional values of the image data for one pixel line processed collectively in the SIMD processor 1506 and the error data are output one by one to the sequential image data processor 1507 from at least two of R20, R21, R22, and R23. The error data used for the process is calculated in the sequential image data processor 1507 (explained later) and is input to the SIMD processor 1506.

On the other hand, sequential image data processors 1507*a* and 1507*b* are hardware that operates without control of the computer program. In FIG. 12, two units of the sequential image data processor 1507 are connected to the SIMD processor 1506. In the image processing unit according to the embodiment, the sequential image data processor 1507*b* is specifically used for the error diffusion process performed sequentially, and the sequential image data processor 1507*a* is used for table conversion such as γ-conversion.

Figure 14:
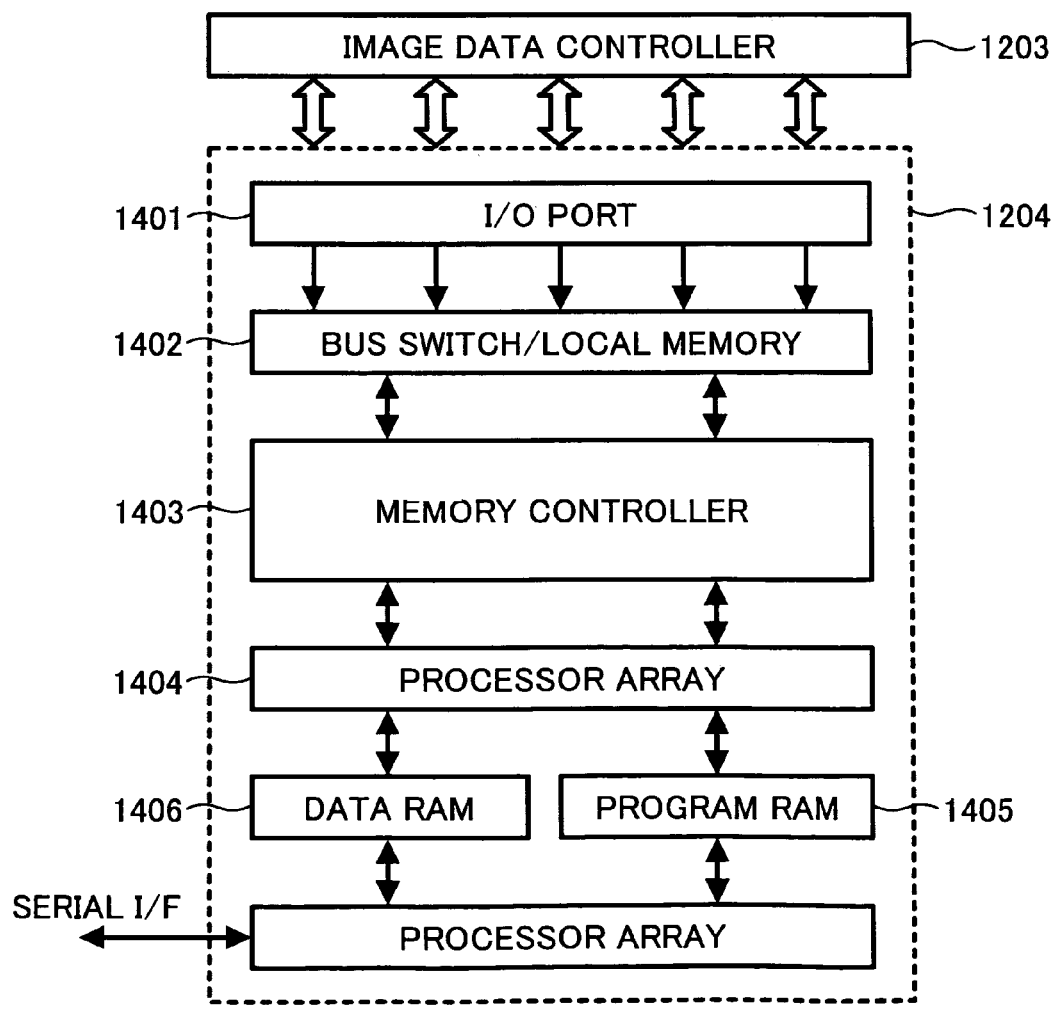
FIG. 14 is a diagram for explaining an internal configuration of an image processor.

The hardware configuration of the image processor 1204 forming the image processing unit of FIG. 3 is explained below. FIG. 14 is a block diagram of an internal configuration of the image processor 1204. The image processor 1204 includes a plurality of input-output (I/O) ports 1401, and performs data input and output from and to the outside. The image processor 1204 can arbitrarily set an input and an output of respective data.

The image processor 1204 also includes a bus switch/local memory group 1402 so as to be connected to the I/O ports 1401, and a memory controller 1403 controls a memory area to be used and a path for the data bus. The bus switch/local memory group 1402 is allocated to the data input and the data to be output, as a buffer memory, and each of the bus switch/local memory group 1402 allocated stores each data, so that interface (I/F) with the outside is controlled.

A processor array 1404 performs various processes on the image data stored in the bus switch/local memory group 1402, and the output results (image data processed) are again stored in the bus switch/local memory group 1402. The process procedures for the processor array 1404 and the parameters for the processes are exchanged between program RAM 1405 and data RAM 1406.

Recorded data in the program RAM 1405 and the data RAM 1406 is downloaded from a process controller 1407 to a host buffer through a serial I/F 1408. The process controller 1407 reads the contents of the data RAM 1406 and monitors how the process is performed.

If the contents is changed or a process mode required by the system is changed, the processor array 1404 handles these cases by updating the contents of the program RAM 1405 and the data RAM 1406 to be referred to. Of the configuration as mentioned above, the processor array 1404 corresponds to the SIMD image data processor 1500 and the sequential image data processor 1507.

Figure 15B:
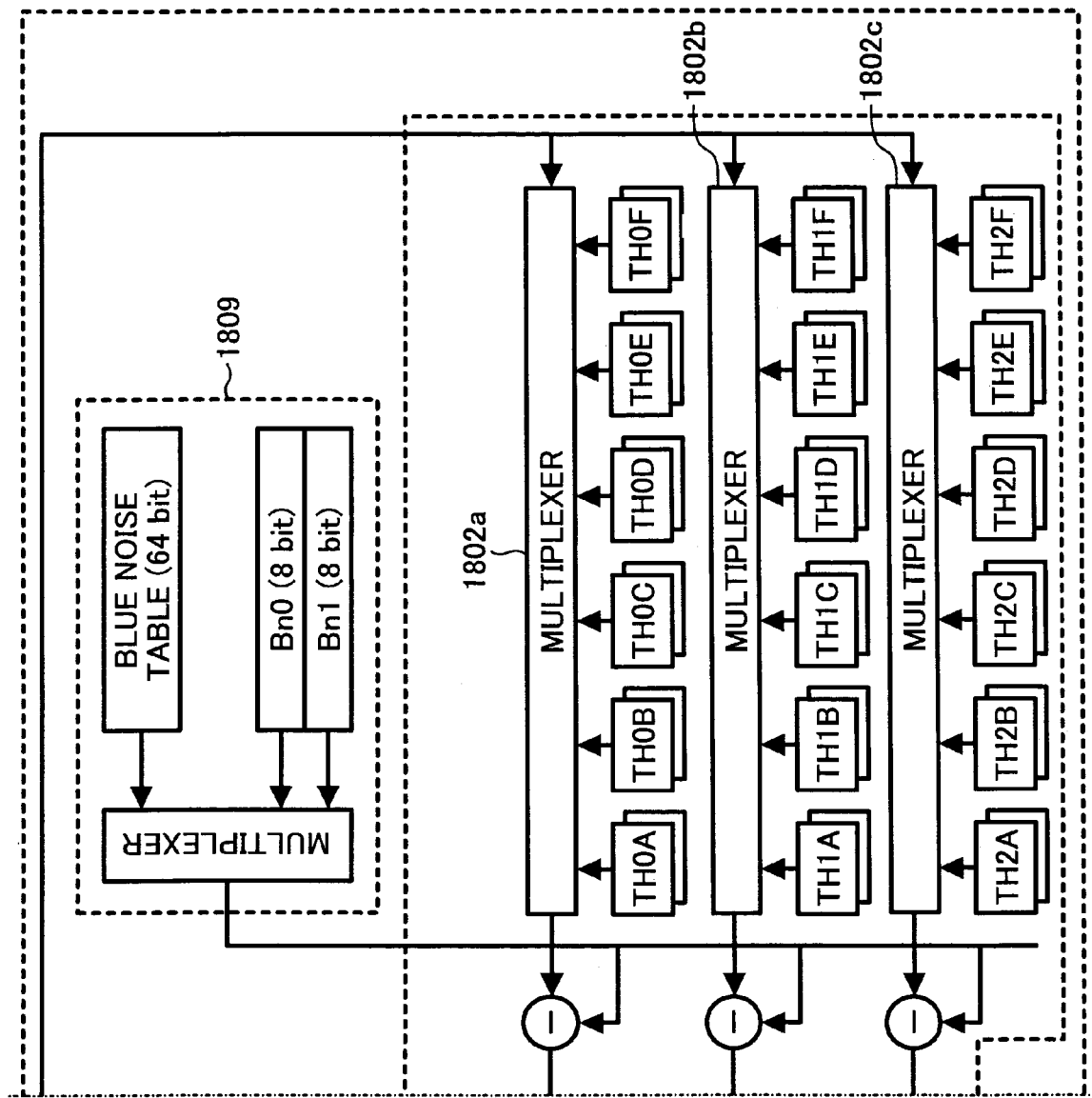
FIG. 15 is a block diagram of the sequential image data processor.

FIG. 15 is a block diagram for explaining the sequential image data processor 1507. The sequential image data processor 1507b shown in FIG. 15 includes an error data calculator 1801, a multiplexer 1807 that selects one from the error data calculated in the error data calculator 1801, and an error data adder 1808 that processes the error data selected by the multiplexer 1807 and adds the error data processed to the data input from the SIMD image data processor 1500.

The sequential image data processor 1507b also includes a decoder 1806 that inputs a signal required for selection of error data to the multiplexer 1807, and an error-diffusion hardware register group 1805 that executes error diffusion using any one of error diffusion modes (binary error diffusion, three-value error diffusion, and four-value error diffusion) that are preset, or that can set a computation factor used for the error diffusion process. The sequential image data processor 1507b further includes a blue noise signal generator (blue noise table) 1809, so that whether to use blue noise for the error diffusion process is selectable by being set in the error-diffusion hardware register group 1805.

The error data calculator 1801 calculates error data that is a difference between pixel data for a pixel included in the current pixel line and the predetermined threshold value. The error data calculator 1801 includes three quantization reference value storages 1803a to 1803c, three comparators 1804a to 1804c, three multiplexers 1802a to 1802c, and threshold table groups 1810a to 1810c connected to the multiplexers 1802a to 1802c, respectively.

Connected to each of the threshold table groups 1810a to 1810c is six threshold tables THxA to THxF (x=0, 1, 2) as an example. These tables are selectable by being set in the error-diffusion hardware register group 1805. Two image processors are used for the gradation process according to the embodiment. More specifically, one of the image processors is used for the gradation process of image data for Magenta and Cyan and the other one is used for the gradation process of image data for Yellow and Black.

The image processor used for an image data process of Magenta and Cyan is explained below as an example. The threshold tables THxA to THxC (x=0, 1, 2) are used for Magenta, and the threshold tables THxD to THxF (x=0, 1, 2) are used for Cyan. The threshold tables THxA to THxC (x=0, 1, 2) are configured so that any one of the threshold tables can be selected according to the result of extraction using the feature amount of any image of text, photograph, and text-photograph. Therefore, error diffusions can be selected depending on cases as follows to allow formation of a more preferable image. Used for the text portion is simple error diffusion based on fixed threshold that is set independently from a position of main scanning or sub-scanning. Used for the photograph portion is error diffusion based on set dither threshold that has the small number of lines. Used for the text and photograph portion is error diffusion based on set threshold that has the number of lines larger than the photograph portion. TH0A through TH2A are threshold values with respect to pixels determined that the pixels have the same feature amount. The same manner as above is applied to Cyan. The image processor for processing image data for Yellow and Black has the same as the above-mentioned configuration only by replacement of Magenta with Yellow and Cyan with Black.

In the embodiment, the quantization reference value storage 1803a, the comparator 1804a, and the multiplexer 1802a to which the threshold table group 1810a is connected, and all of these operates as one set. The quantization reference value storage 1803b, the comparator 1804b, and the multiplexer 1802b to which the threshold table group 1810b is connected, and all of these also operates as one set. The quantization reference value storage 1803c, the comparator 1804c, and the multiplexer 1802c to which the threshold table group 1810c is connected, and all of these also operates as one set.

The sequential image data processor 1507 receives an additional value (additional value data) of the image data and the error data from the SIMD processor 1506. The image data is image data for the target pixel currently processed, and the error data is error data for a pixel processed prior to the target pixel.

The additional value data received is added with a value obtained by being calculated by the error data adder 1808 based on the error data for the pixel previously processed, and is divided by 16 or 32 to reduce a computation error. Furthermore, the additional value data as a result of division is input to all the three comparators 1804a to 1804c in the error data calculator 1801. The value calculated based on the error data for the pixel previously processed by the error data adder 1808 is explained later.

The comparators 1804a to 1804c receives threshold values from the multiplexers 1802a to 1802c that are connected to the threshold table groups, respectively. Each of the comparators 1804a to 1804c subtracts the threshold value from the additional value data received, and creates image data. Each of the comparators 1804a to 1804c also obtains a value by subtracting the quantization reference value stored in each of the quantization reference value storages 1803a to 1803c from the additional value data, and outputs the value as error data to the multiplexer 1807. Consequently, three error data in total are simultaneously input to the multiplexer 1807. If the blue noise is used for the error diffusion process, the blue noise signal generator (blue noise table) 1809 turns on and off blue noise data at comparatively high frequency to generate blue noise. The threshold values are subtracted from the blue noise before they are input to the comparators 1804a to 1804c. The process using the blue noise allows the threshold values to have appropriate variations to prevent occurrence of texture peculiar to images.

Each of the threshold table groups 1810a to 1810c stores threshold values different from others. In the embodiment, of the threshold table groups 1810a to 1810c, the threshold table group 1810a stores the highest threshold values, the threshold table group 1810b stores the next highest threshold values, and the threshold table group 1810c stores the lowest threshold values. The quantization reference value storages 1803a to 1803c set quantization reference values to be stored based on the corresponding threshold table groups 1810a to 1810c connected thereto. For example, if the image data is expressed by 256 values of 0 to 255, 255 is stored in the quantization reference value storage 1803a, 170 is stored in the quantization reference value storage 1803b, and 85 is stored in the quantization reference value storage 1803c.

The comparators 1804a to 1804c output the image data created to the decoder 1806. The decoder 1806 selects image data for the target pixel from the image data and inputs the image data selected to the multiplexer 1807. The multiplexer 1807 selects any one out of the three error data as error data for the target pixel according to the image data input. The error data selected is input to one of the RAMs 1503 through PE of the SIMD processor 1506.

The image data output from the decoder 1806 is split before it is input to the multiplexer 1807, and one of the image data split is input to one of the PEs in the SIMD processor 1506. In the embodiment, the image data is expressed by two bits as a higher-order bit and a lower-order bit. Therefore, the comparator 1804a is not used for this process. In the embodiment, the image data for the target pixel is referred to as "pixel data" hereinafter.

The error data selected is input to the error data adder 1808. The error data adder 1808 stores the error data for the pixels indicated by numbers 1, 2, 3 in a circle in FIG. 13, namely, the error data for the third pixel (represented by error data 3 in FIG. 15) processed prior to the target pixel, the error data for the second pixel (represented by error data 2 in FIG. 15) processed prior to the target pixel, and the error data for the immediately preceding pixel (represented by error data 1 in FIG. 15).

The error data adder 1808 multiplies the error data 3 by 0 or 1 as a computation factor, multiplies the error data 2 by 1 or 2 as a computation factor, and multiplies the error data 1 by 2 or 4 as a computation factor. The error data adder 1808 adds the three multiplication values to obtain a value, and adds this value (weighted error data) to additional value data to be received next from the SIMD processor 1506. As a result, the pixel closer to the target pixel more largely affects the error diffusion process of the target pixel. Therefore, it is possible to adequately diffuse errors of pixels and form an image close to its original image.

Figure 16:
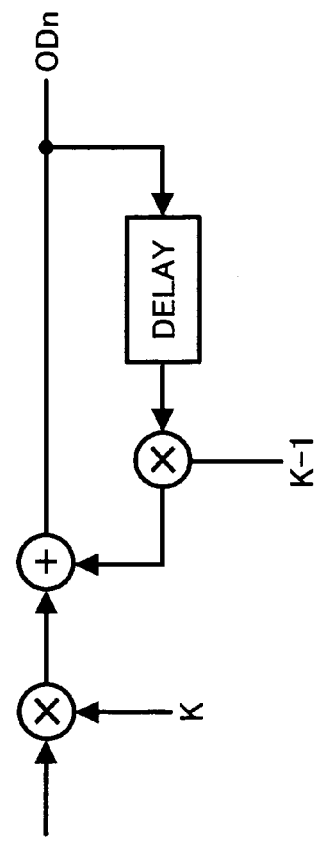
FIG. 16 is a diagram of an IIR filter system.

The image data is created in the sequential image data processor 1507 by using the configuration generally called "Infinite Impulse Response (IIR) filter system". The arithmetic expression used in the IIR filter system can be expressed in the following equation (1) as shown in FIG. 16:

$$ODn = (1-K) \times ODn-1 + K \cdot IDn \quad (1)$$

where, ODn is pixel density after computation, ODn−1 is result of computation using data for an immediately preceding pixel, IDn is current pixel data, and K is weighting factor.

Figure 17:
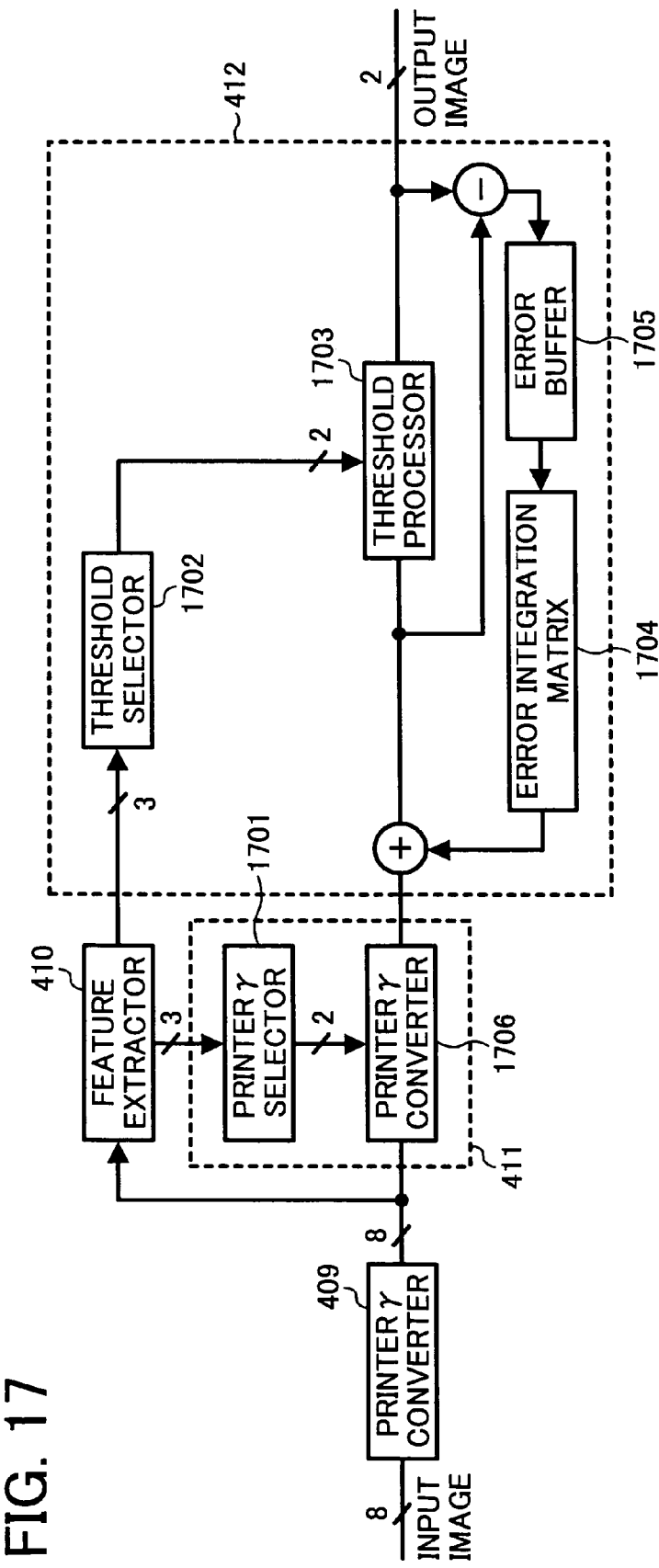
FIG. 17 is a diagram for explaining a gradation processor.

As is clear from the equation (1) and FIG. 6, the density ODn after computation is obtained from a value of the result of computation ODn−1 using the immediately preceding pixel data and a value of the current pixel data IDn. The IIR filter system is generally a circuit dedicated to performance of sequential conversion, specifically, a circuit in which computation is performed on the current pixel based on the result of computation using pixels processed prior to the current pixel. The sequential image data processor 1507 for the image processing apparatus according to the embodiment can be used for the whole sequential conversion as shown in FIG. 16 independently from the process (explained later) as shown in FIG. 17.

By using the image processor 1204 that includes units for executing sequential processes and performs an SIMD process, it is possible to create the image processing apparatus that extracts an feature amount of an image, selects quantization threshold values based on the extraction result, and performs an error diffusion process, which allows reduction in manufacturing costs thereof.

The printer γ converter 409, the feature extractor 410, the printer γ converter 411, and the gradation processor 412 of FIG. 3 are explained below with reference to FIG. 17. The printer γ converter 411 includes a printer γ selector 1701 and a printer γ converter 1706. The gradation processor 412 includes a threshold selector 1702, a threshold processor 1703, an error integration matrix 1704, and an error buffer 1705.

The printer γ selector 1701 selects a printer γ table used in the printer γ converter 411 based on the result of extracting the feature amount in the feature extractor 410, and switches printer γ tables for each pixel.

Figure 18:
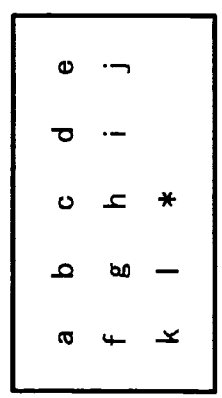
FIG. 18 is a diagram for explaining an error diffusion matrix.

The feature extractor 410 determines whether the image data input is an image signal indicating more likely text, indicating text, or indicating more likely photograph. The threshold selector 1702 selects a threshold value based on the result of extraction in the feature extractor 410. The threshold processor 1703 calculates the threshold value selected in the threshold selector 1702, a quantization value corresponding to the threshold value, a difference between the image data and the quantization value, and an error with the image data selected, and obtains an output value from the result of output of the error integration matrix 1704. The error integration matrix 1704 reads a target pixel (pixel indicated by * in the error diffusion matrix of FIG. 18) and an error between the target pixel and its peripheral pixels from the error buffer 1705, and integrates them based on a predetermined factor (pixels indicated by a to l of FIG. 18).

Figure 19:
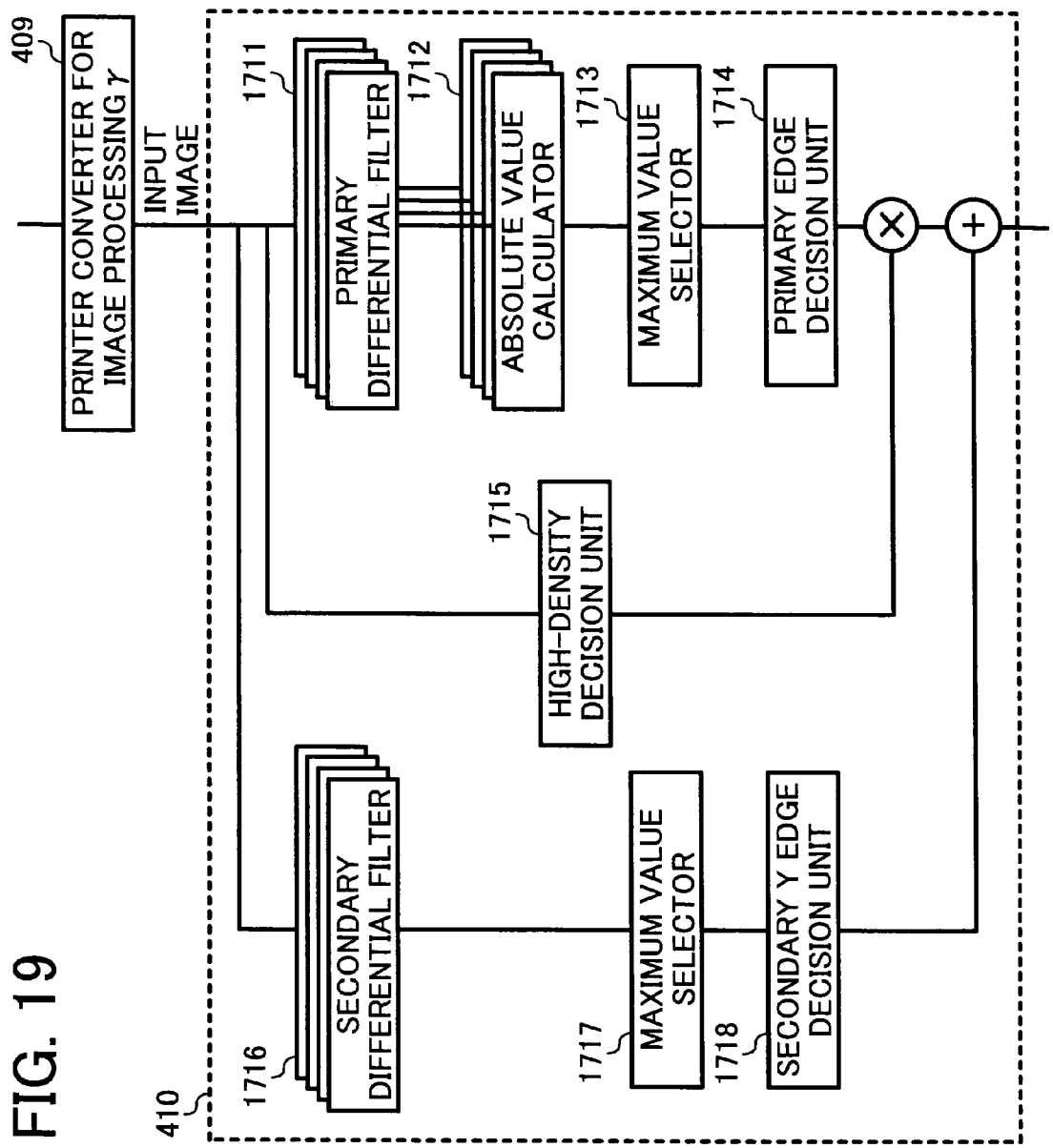
FIG. 19 is a diagram for explaining a feature extractor.

The configuration of the feature extractor 410 is explained below with reference to FIG. 19. The feature extractor 410 includes a primary differential filter 1711, an absolute value calculator 1712, a maximum value selector 1713 of the result of primary differentiation, a primary edge decision unit 1714, a high-density decision unit 1715, a secondary differential filter 1716, a maximum value selector 1717 of the secondary differential filter, and a secondary edge decision unit 1718. The primary differential filter 1711 performs a filtering process using primary differential filter coefficients (four types of FIG. 5A to FIG. 5D).

The absolute value calculator 1712 obtains an absolute value of the result of process in the primary differential filter 1711. The maximum value selector 1713 obtains the maximum value of results of four primary differential filtering processes of which absolute values are calculated in the absolute value calculator 1712. The primary edge decision unit 1714 quantizes values obtained by multiplying the results of the absolute value calculator 1712 by ⅛, using three quantization thresholds, into four-stage (2 bits) edge degrees. The high-density decision unit 1715 decides the image data input based on the high-density decision threshold (or high-density threshold). The secondary differential filter 1716 performs a filtering process using four types of secondary differential filter coefficients. The maximum value selector 1717 selects the maximum value of the results of filtering processes in the secondary differential filter 1716. The secondary edge decision unit 1718 decides values obtained by multiplying the results of absolute value calculator 1717 by ⅛, based on secondary edge decision threshold.

Figure 20B:
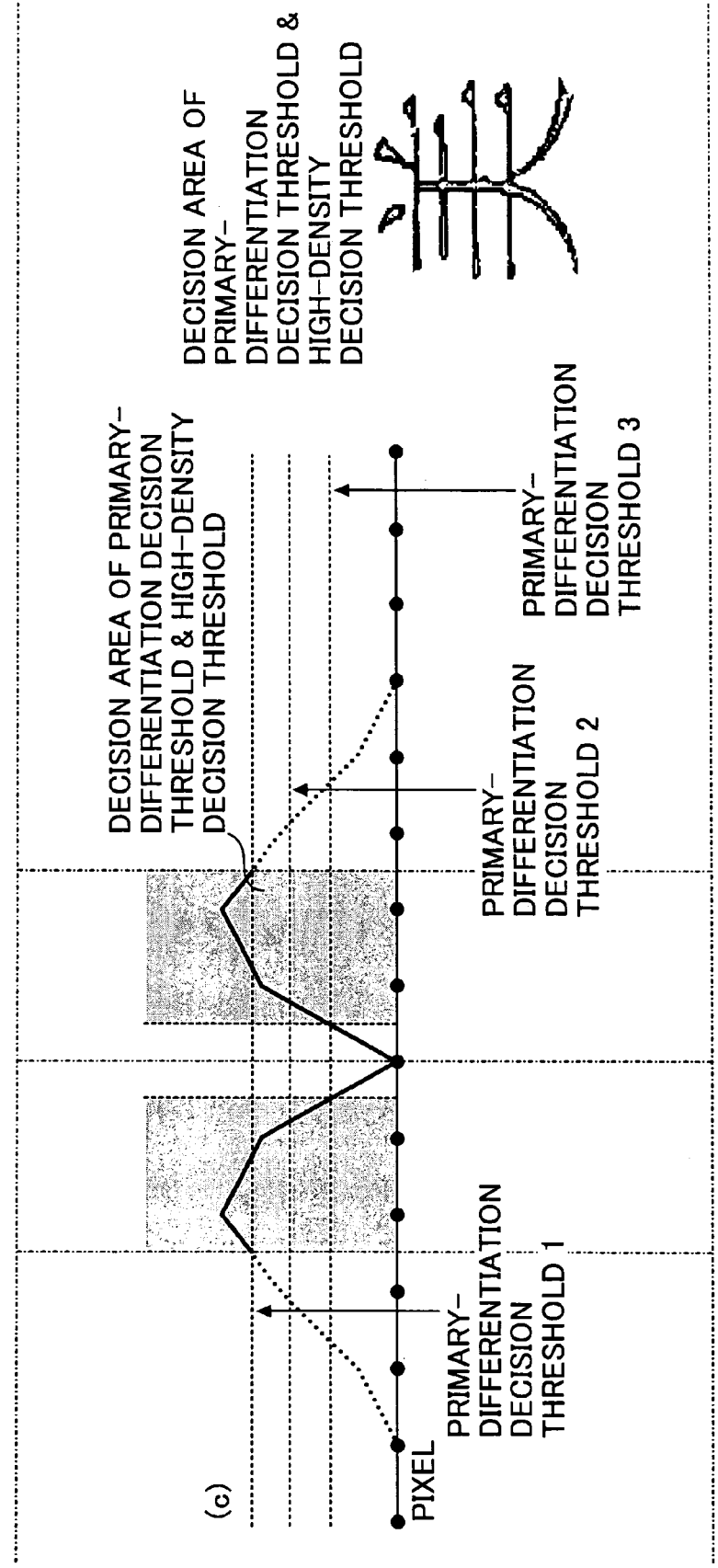
FIG. 20 is a diagram for explaining a feature extractor.
Figure 20C:
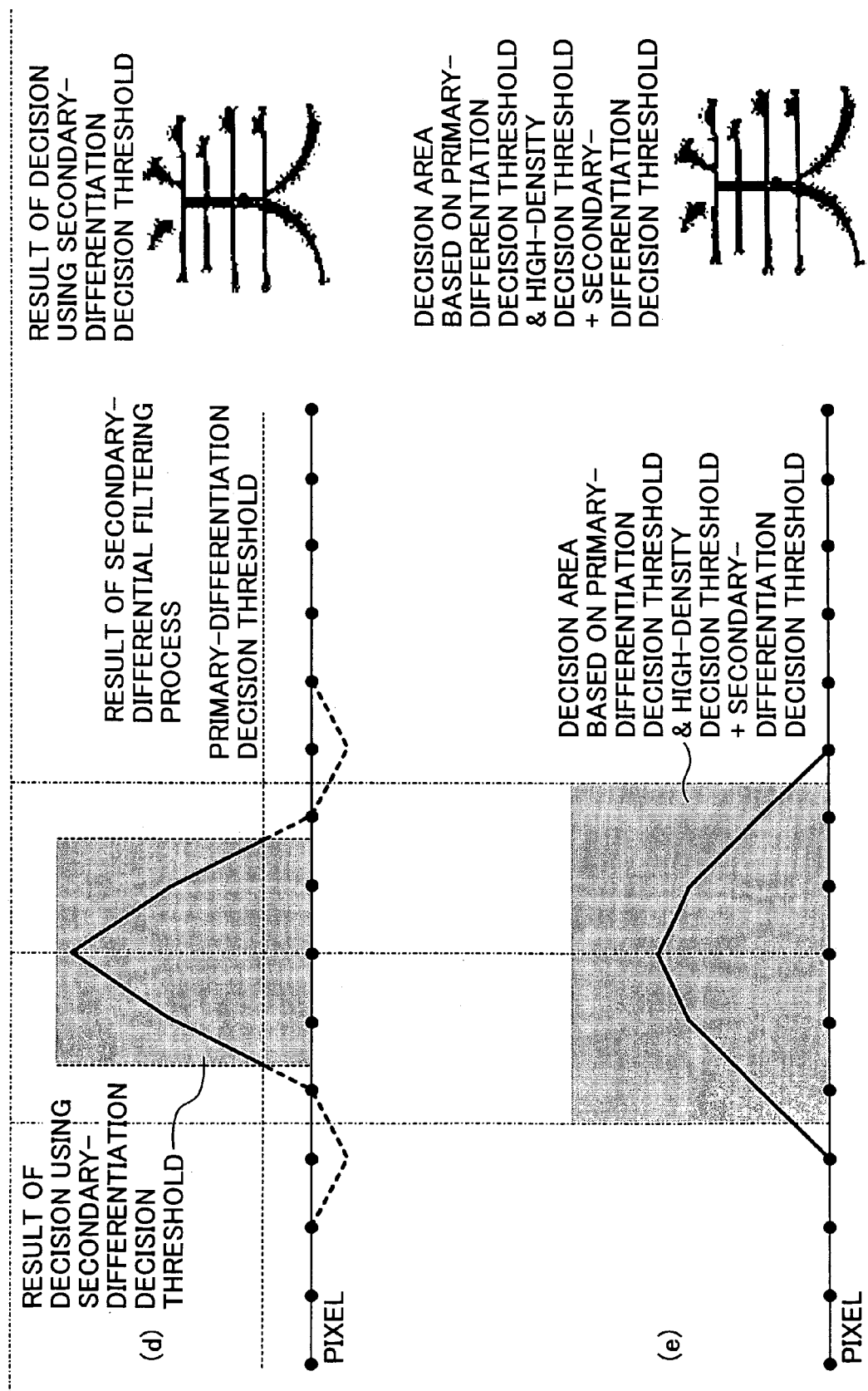
Figure 24:
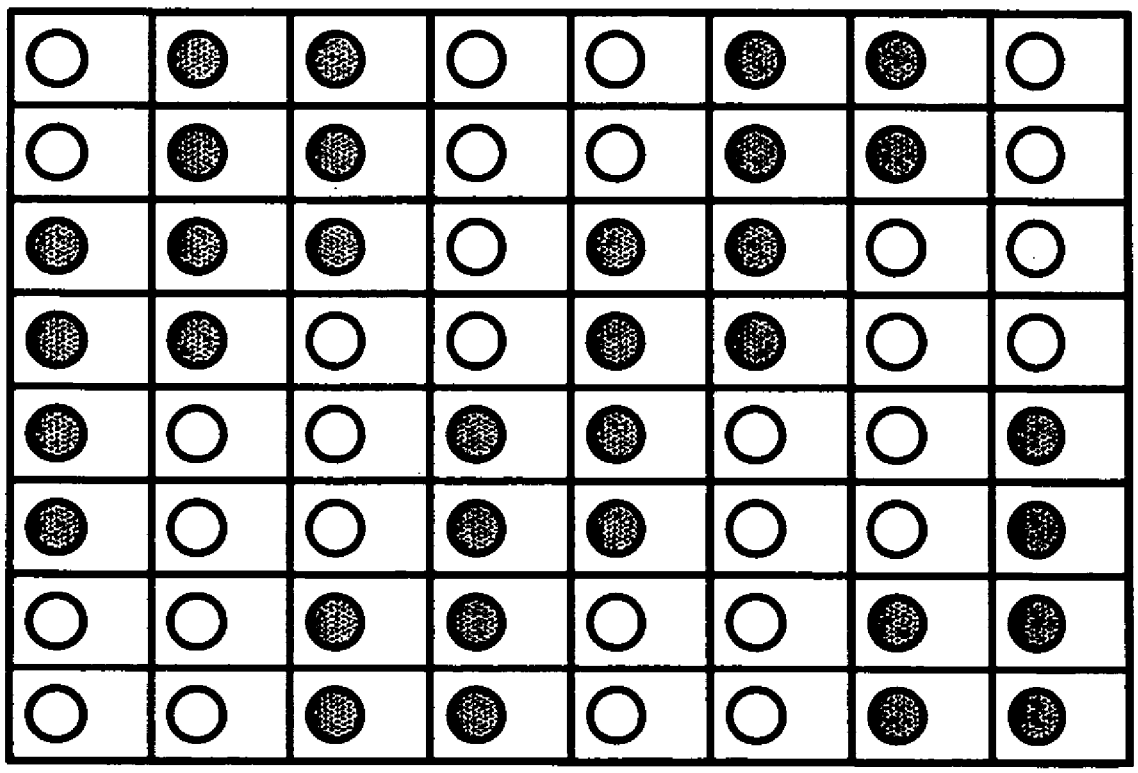
FIG. 24 is a diagram for explaining an example of high image density.

The function of the feature extractor 410 is explained below with reference to FIG. 20. FIG. 20 includes graphs (a) to (e), in which the horizontal axis represents positions of one-dimensional pixels and the vertical axis represents relative values of output values of each component.

The graph (a) of FIG. 20 represents image data input to the feature extractor 410, in which a hatched area represents a decision area that is decided as true by the high-density decision unit 1715, based on the high-density decision threshold.

In the graph (b) of FIG. 20, the solid line represents the result of outputs of the primary differential filter 1711, and the broken line represents the result indicating absolute values that are obtained from negative values, of the results of outputs of the primary differential filter 1711, by the absolute value calculator 1712.

The graph (c) of FIG. 20 represents the results of primary differentiation that are selected by the maximum value selector 1713, and represents a relation between the results and quantization thresholds by the primary edge decision unit 1714. The hatched areas of the graph (c) represent areas where primary-differentiation decision threshold 1 is true and the high-density decision threshold is true. It is noted that the result in (c) of FIG. 20 is already decided as the result of the filtering process that obtains the maximum value, and therefore, the result above has the same shape as the graph (b) that includes the absolute values.

The graph (d) of FIG. 20 represents the result of calculating secondary differentiation, by the secondary differential filter 1716, that is selected by the maximum value selector 1713. The hatched area of the graph (d) represents an area where decision by the secondary edge decision unit 1718 is true based on secondary-differentiation decision threshold.

The graph (e) of FIG. 20 represents image data input thereto, in which a hatched area represents a decision area that is decided based on the primary-differentiation decision threshold and the high-density decision area+secondary-differentiation decision threshold.

The relation between the results of feature extraction and the quantization thresholds for error diffusion is shown in table 5.

TABLE 5

Relation between result of feature extraction and quantization threshold for error diffusion

| Type of images | Result of feature extraction | | | Amplitude of quantization threshold for error diffusion | Amplitude of quantization threshold for error diffusion |
|---|---|---|---|---|---|
| | Secondary differentiation | Primary differentiation | threshold for error diffusion | quantization threshold for error diffusion | |
| | 2 | 1 | 0 | (Example 1) | (Example 2) |
| Photograph/Background | 0 | 0 | 0 | Amplitude (large) | Amplitude (large) |
| Text on halftone dots | 0 | 0 | 1 | Amplitude (small) | Amplitude (intermediate) |
| Text | 0 | 1 | 0 | Amplitude (none) | Amplitude (none) |
| | 0 | 1 | 1 | | |
| | 1 | 0 | 0 | | |
| | 1 | 0 | 1 | | |
| | 1 | 1 | 0 | | |
| | 1 | 1 | 1 | | |

The vertical items of table 5 are types of image, and the horizontal items are results of feature extraction and amplitudes of quantization threshold values to be selected. Large-amplitude quantization threshold values for error diffusion are selected for a photograph image and a background portion of a document or so. Quantization threshold values of small amplitude or intermediate amplitude is selected for halftone-dot characters of which occurrence rate is very high in a map image or so. For text image, error diffusion is performed using fixed threshold values that are quantization threshold values of no-amplitude, or using small-amplitude quantization threshold values.

The quantization threshold values of large amplitude are indicated by those described in FIG. 21 through FIG. 26. The examples of the quantization threshold values correspond to 168 lines or 144 lines (FIGS. 25 and 26) with 600 dpi.

Figure 27:
FIG. 27 is a diagram for explaining quantization threshold values.
Figure 28:
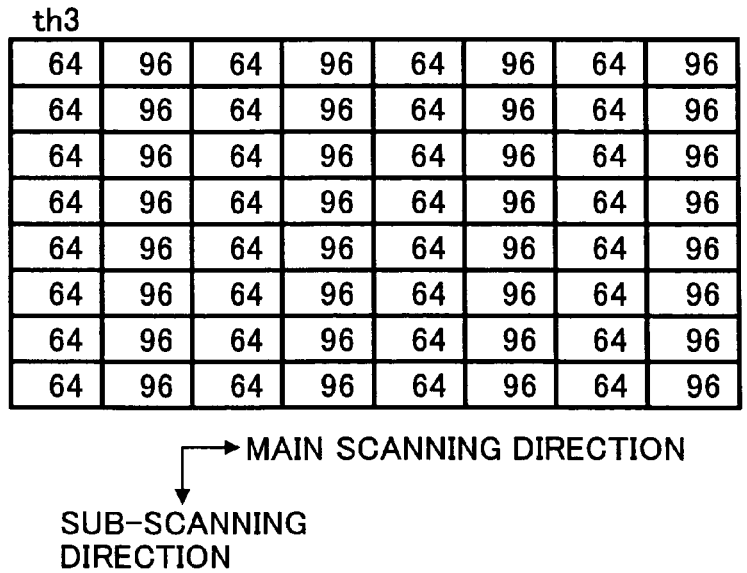
FIG. 28 is a diagram for explaining quantization threshold values.

On the other hand, the quantization threshold values of no amplitude are fixed threshold values independent from positions of pixels, as indicated by "th2" and "th3" (threshold 2 and threshold 3) of FIG. 27. The amplitude (small) corresponds to 300 lines with 600 dpi as shown in "th1" of FIG. 27, and includes a case where the number of lines is increased from about 168 lines of FIG. 21 to FIG. 25 and a case where the amplitude of the threshold values is made smaller as shown in th1 of FIG. 28.

The parameters of feature-extraction thresholds used for feature extraction are the high-density decision threshold, the primary-differentiation decision thresholds 1 to 3, and the secondary-differentiation decision threshold. Each of these thresholds is subjected to gradation conversion using the printer γ tables set in the printer γ converter 409 for image processing, and values after conversion are set in the high-density decision unit 1715, the primary edge decision unit 1714, and the secondary edge decision unit 1718, respectively.

More specifically, the gradation conversion is subjected to the parameters of the feature-extraction thresholds using the printer γ tables, which causes the process of extracting feature amounts to be not much affected by the change of the printer γ tables.

As for parameters for feature extraction, the process using parameters of the printer γ tables is performed on any one of the extraction threshold of the primary differential filter, the extraction threshold of the secondary differential filter, and the high-density decision threshold. By doing so, it is possible to reduce the influence over the parameters for gradation conversion from the result of extracting the feature amounts.

Table 6 shows an example of feature-extraction thresholds for Black, and appropriate values are set for each color of Black, Cyan, Magenta, and Yellow, in which set values with respect to reference values are given.

TABLE 6

Example (Black) of reference value and set value of feature-extraction threshold

| Threshold | Reference value | Set value |
|---|---|---|
| Primary-differentiation decision threshold 1 | E0h | D0h (γ-conversion) |
| Primary-differentiation decision threshold 2 | A0h | 80h (γ-conversion) |
| Primary-differentiation decision threshold 3 | 50h | 50h (no conversion) |
| High-density threshold | 40h | 50h (γ-conversion) |
| Secondary-differentiation decision threshold 1 | 10h | 10h (no conversion) |
| Secondary-differentiation decision threshold 2 | 20h | 20h (no conversion) |

Referring to the high-density threshold of table 6, an output value is 50h, which is related to an input value 40h that is input to the printer γ table of table 7, and therefore, a set value 50h after conversion using the printer γ table for the high-density threshold of table 6 is set.

TABLE 7

Example of printer γ table (Black)

| Input value | Output value |
|---|---|
| 00h | 00h |
| 01H | 00H |
| 02H | 01H |
| . | . |
| . | . |
| . | . |
| 10h | 18h |
| 11h | 19h |
| . | . |
| . | . |
| . | . |

TABLE 7-continued

Example of printer γ table (Black)

| Input value | Output value |
|---|---|
| 40h | 50h |
| . | . |
| . | . |
| . | . |
| 50h | 58h |
| . | . |
| . | . |
| . | . |
| A0h | 80h |
| . | . |
| . | . |
| . | . |
| E0h | D0h |
| . | . |
| . | . |
| . | . |
| FEh | FEh |
| FFh | FFh |

Figure 29:
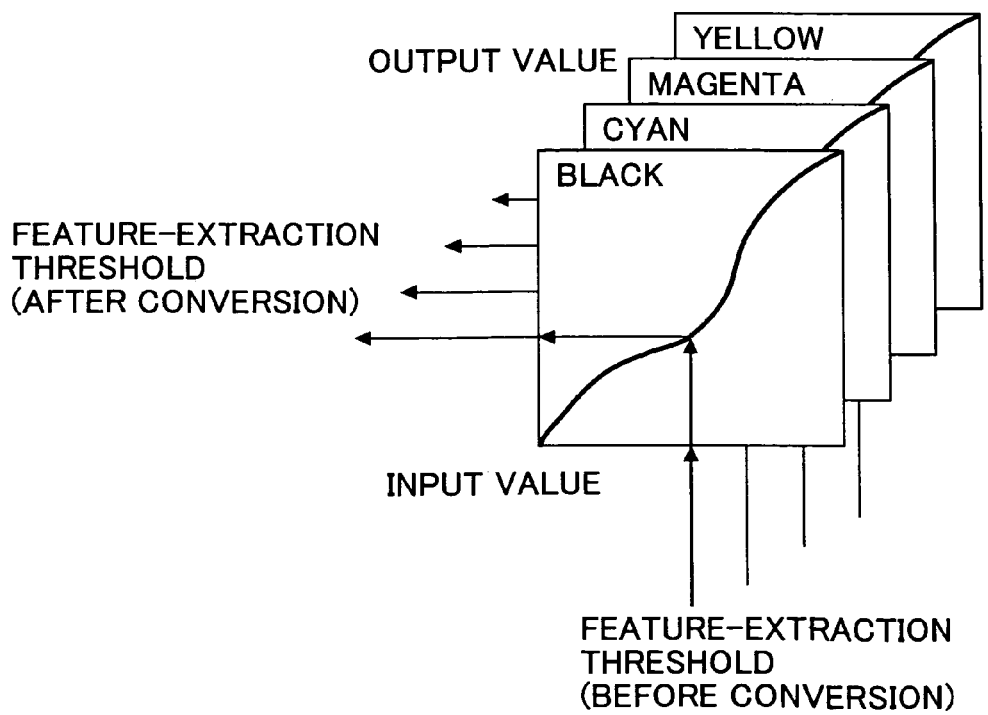
FIG. 29 is a conceptual diagram of a process for converting feature-extraction threshold values using a printer γ table.

The primary-differentiation decision thresholds 1 to 3 are values due to primary differentiation. Therefore, it is not always adequate to obtain an output value using threshold before conversion for an input value in the printer γ table. However, in the case of the primary-differentiation decision thresholds 1 and 2, the result of primary differentiation is proportional to (k–0) like text on the white background such that the background of a document is white (YMCK=(0, 0, 0, 0)) and text is black (YMCK=(0, 0, 0, k)). Therefore, an output value D0h related to an input value E0h that is input to the printer γ table is decided as a set value after conversion. On the other hand, the primary-differentiation decision threshold 3 includes a case like a character in halftone dots where pixels around the character are not white. Therefore, a reference value is set so that it is not converted by the printer γ table. A conceptual diagram of conversion between numerical values using the printer γ tables is shown in FIG. 29. The horizontal axis of the graph represents an input value, and the vertical axis represents an output value, and a value input to the horizontal axis is converted using the graph to decide an output value.

The secondary-differentiation decision threshold is related to a secondary change amount of the printer γ table, and is not uniquely affected by magnitudes of values of the printer γ table. Therefore, a set value is decided without conversion by the printer γ table.

Figure 30:
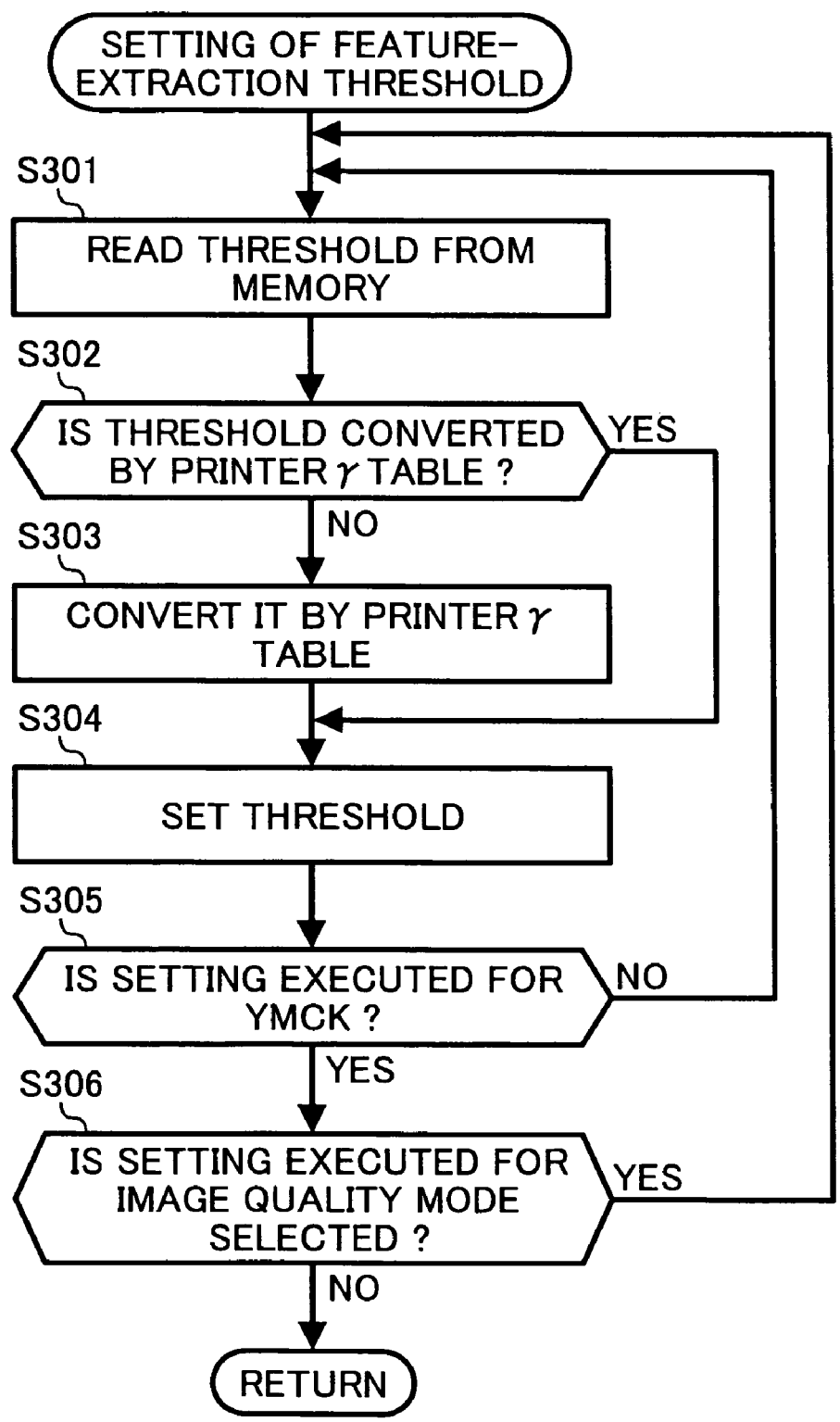
FIG. 30 is a flowchart of the process for converting the feature-extraction threshold values.

The processes are explained below with reference to the flowchart of FIG. 30. At first, a threshold is read from memory according to a color (table 8) and an image quality mode (table 9) to be set (step S301). Then, it is determined whether the threshold is to be converted using the printer γ table (step S302). If the threshold is the primary-differentiation decision thresholds 1, 2, and the high-density threshold, it is the threshold to be converted by the printer γ table (step S302, Yes (Y)). Therefore, the threshold is converted by the printer γ table (step S303), and values of the primary-differentiation decision thresholds 1, 2, and the high-density threshold after their conversion are set in a threshold decision unit (step S304). The primary-differentiation decision threshold 3 and the secondary-differentiation decision threshold do not need to be converted by the printer γ table (step S302, No (N)), and therefore, both of them are set without conversion by the printer γ table (step S304). These settings are executed for each of the colors Y, M, C, and K (step S305, N). If the settings are finished (step S305, Y), then the process returns to step S301 if a plurality of image quality modes are set for each area of an image in a case of area process (step S306, Y), and settings are repeated according to each image quality mode to be used.

The reason that the setting at step S304 is executed for each of the colors Y, M, C, and K (step S305, N) is as follows. That is, the printer γ table in the previous stage of the gradation process and the color correction process cause a relation between document density and an input value to the gradation process to be different, and color of toner causes a relation between output density and an input value to the gradation process to be different. Therefore, when the parameters common to YMCK are used, the image quality is not always appropriate. Therefore, if the parameters of the feature extraction can be set for each color, it is possible to obtain an image adequate for users.

It is desired to enable obtaining an output image according to each type of documents such as a print document, a silver salt photograph document, a map document, and an ink-jet document, or obtaining an output image created in the text mode or in the photograph mode which is favorable to the user. Therefore, if a plurality of image quality modes as the parameters of the feature extraction are set in each area of an image such as the area process (step S306, Y), the process returns to step S301, and the settings are repeated according to each image quality mode to be used, in order to obtain the output image according to each type of the documents or to obtain the output image created in the text mode or the photograph mode which is favorable to the user.

TABLE 8

Example (YMCK) of reference value and set value of feature-extraction threshold

| Threshold | Reference value (Black) | Reference value (Cyan) | Reference value (Magenta) | Reference value (Yellow) |
|---|---|---|---|---|
| Primary-differentiation decision threshold 1 | D0h | E0h | E0h | E0h |
| Primary-differentiation decision threshold 2 | A0h | A0h | A0h | A0h |
| Primary-differentiation decision threshold 3 | 40h | 40h | 60h | 60h |
| High-density threshold | 30h | 40h | 50h | 50h |
| Secondary-differentiation decision threshold | 10h | 10h | 10h | 10h |

TABLE 9

Example (Black, Image quality mode) of reference value and set value of feature-extraction threshold

| Threshold | Text-photograph | Photograph | Text | Map |
|---|---|---|---|---|
| Primary-differentiation decision threshold 1 | E0h | E0h | E0h | E0h |
| Primary-differentiation decision threshold 2 | A0h | B0h | A0h | A0h |
| Primary-differentiation decision threshold 3 | 40h | 40h | 30h | 20h |
| High-density threshold | 30h | 40h | 30h | 50h |
| Secondary-differentiation decision threshold | 10h | FFh | 10h | 10h |

Figure 31:
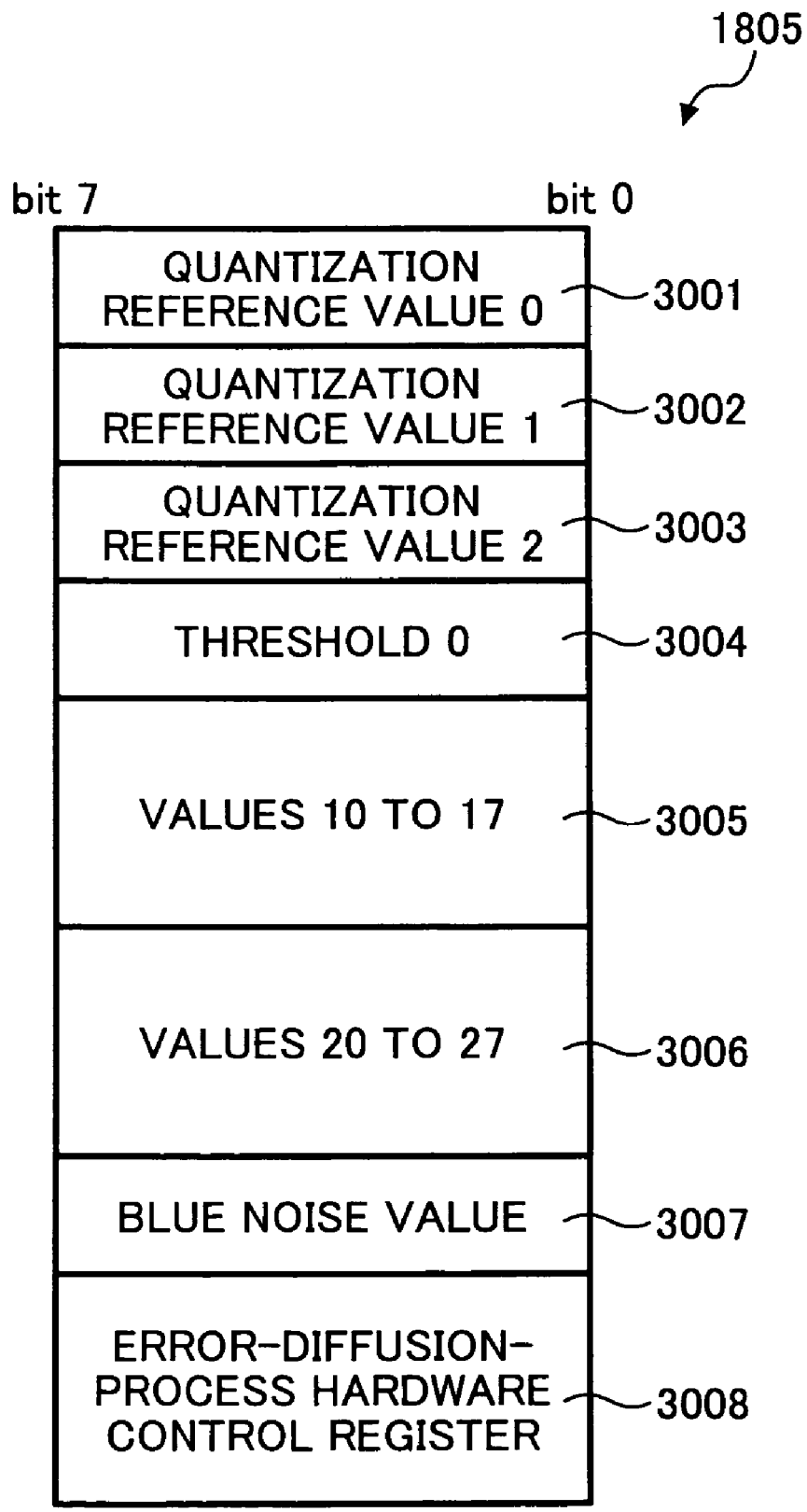
FIG. 31 is a diagram for explaining an error-diffusion hardware register.

FIG. 31 is a diagram for explaining a register to be set in the error-diffusion hardware register group 1805. The image processing apparatus according to the embodiment can select any one of modes as follows, in which the error diffusion process is performed by setting a register as shown in FIG. 31, such as a mode in which the error diffusion process is performed using binary error diffusion (binary error diffusion mode), a mode in which the error diffusion process is performed using three-value error diffusion (three-value error diffusion mode), and a mode in which the error diffusion process is performed using four-value error diffusion (four-value error diffusion mode). It is also possible to set a computation factor to be used in the error data adder 1808. Furthermore, it is possible to select whether blue noise is used for the error diffusion process.

The error-diffusion hardware register group 1805 of FIG. 31 includes a register 3001 in which a quantization reference value 0 of the quantization reference value storage 1803a is set, a register 3002 in which a quantization reference value 1 of the quantization reference value storage 1803b is set, and a register 3003 in which a quantization reference value 2 of the quantization reference value storage 1803c is set.

The error-diffusion hardware register group 1805 of FIG. 31 also includes a register 3004 in which a threshold 0 to be set in the threshold table group 1810c is set, a register 3005 in which thresholds 10 to 17 to be set in the threshold table group 1810b are set, a register 3006 in which thresholds 20 to 27 to be set in the threshold table group 1810a is set, a register 3007 in which a blue noise value is set, and an error-diffusion-process hardware control register 3008. Allocated to each of the registers are 8 bits, and the whole registers have a data amount of 64 bits.

The binary error diffusion mode is implemented by setting the same value in all the register 3001, the register 3002, and the register 3003, and setting FFh in the register 3004 and the register 3005. The three-value error diffusion mode is implemented by setting the same value in the register 3001 and the register 3002, and setting FFh in the register 3004. Furthermore, in the binary error diffusion mode and the three-value error diffusion mode, an error diffusion process using fixed threshold and an error diffusion process using variable threshold can be switched by setting the same value in the register 3005 and the register 3006 or setting different values therein.

When the blue noise is used for the error diffusion process, a value indicating use of blue noise is set in the register 3007. Then, switching data indicating on/off of blue noise data is set in the register 3005. If the switching data is 1, a blue noise value is added to each threshold, and if the switching data is 0, the threshold is used as it is. A computation factor used in the error data adder 1808 can be selected by changing the set value in the error-diffusion-process hardware control register 3008.

Figure 32B:
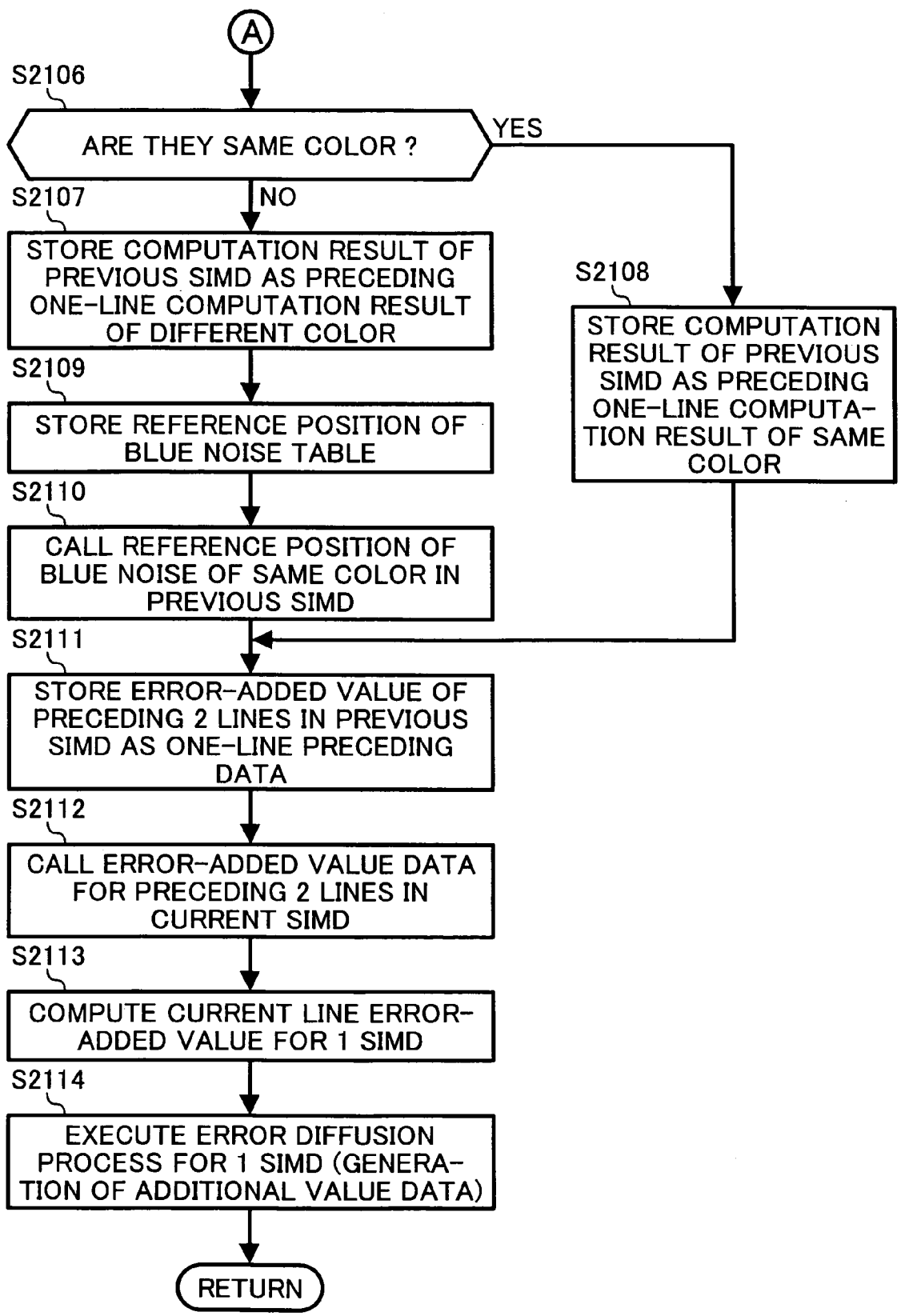
FIG. 32 is a flowchart for explaining an error diffusion process executed by the SIMD processor.

The error diffusion process executed in the SIMD processor 1506 is explained below with reference to the flowchart of FIG. 32. The SIMD processor 1506 first determines whether current image data is a first line (step S2101). If it is the first line (step S2101, Y), then an error-added value for previous 2 lines is initialized (step S2102). It is determined whether the current image data whose error diffusion is computed is a first SIMD (step S2103). If it is the first SIMD (which indicates a header image data of the current line) (step S2103, Y), then the error-added value (step S2105). If it is not the first SIMD (step S2103, N), then error data in computation after the error diffusion process for the previous one SIMD is called (step S2104). It is then determined whether the error data after error diffusion is computed in the previous SIMD has the same color as that of the image data that is currently computed (step S2106). If it is a different color (step S2106, N), then the result of computing the previous SIMD is stored as a different color from that of the previous line (step S2107, process A2 of FIG. 33), and a reference position of a blue noise table is also stored (step S2109). A reference position of a blue noise of the same color upon previous computation of the error diffusion is called (step S2110). If it is the same color (step S2106, Y), the result of computing the previous SIMD is stored as the result of computing the previous line of the same color (step S2108, process A1 of FIG. 33). Whether it is the same color is determined in such a manner that if image data to be used for computation of error diffusion is image data for a Magenta plate, image data for a Cyan plate is determined as a different color, but image data for the Magenta plate is determined as the same color.

Figure 33:
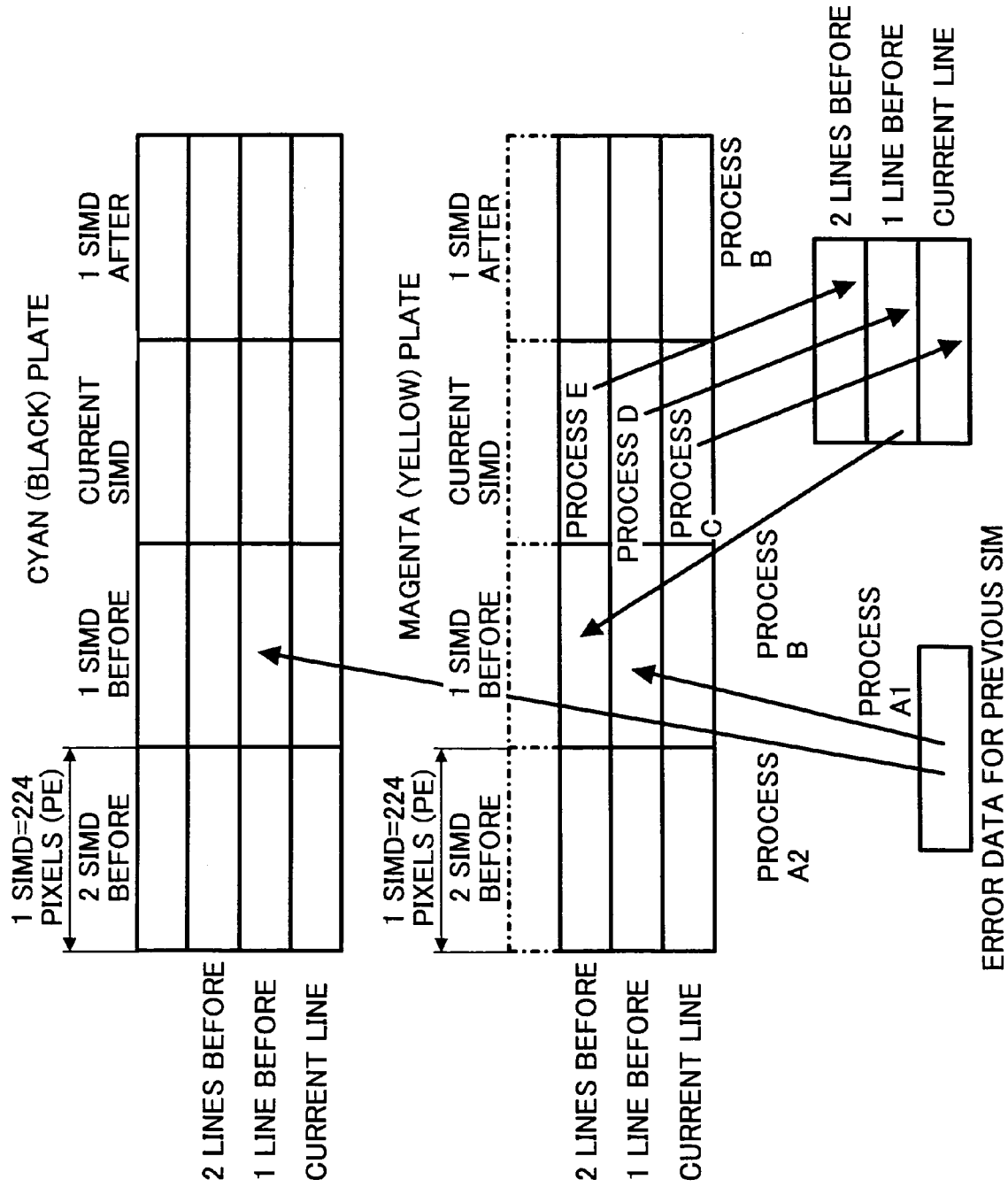
FIG. 33 is a diagram for explaining line shift.

The error-added value data for preceding two lines in the previous SIMD is stored as data for immediately preceding one line (step S2111, process B of FIG. 33), and data for preceding two lines in the current SIMD is called from the memory (step S2112, processes D, E of FIG. 33). After the data for the current SIMD is called from the current line (process C of FIG. 33), the error-added value is computed (step S2113). Thereafter, computation of the error diffusion process is executed in the sequential image data processor 1507b (step S2114).

Figure 34:
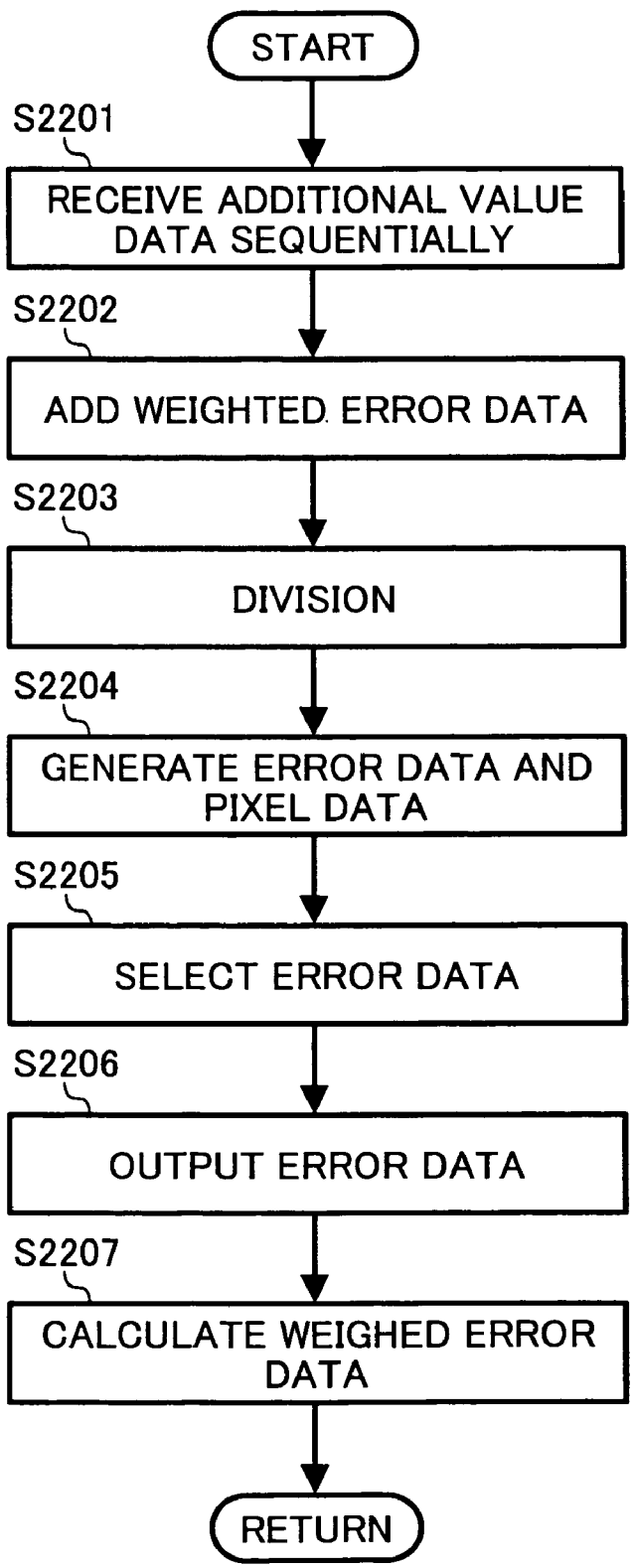
FIG. 34 is a flowchart of procedures for the error diffusion process executed by the sequential image data processor.

On the other hand, as shown in the flowchart of FIG. 34, the sequential image data processor 1507 receives the additional value data output from the SIMD processor 1506 at step S2102 (step S2201), and adds weighted error data generated in the error data adder 1808 to the additional value data received (step S2202). The additional value data to which the weighted error data is added is divided by 16 or 32 (step S2203), and data obtained through division is input to the error data calculator 1801. The error data calculator 1801 generates error data and pixel data based on the data received (step S2204), and inputs the error data to the multiplexer 1807. The error data calculator 1801 also inputs the image data to the decoder 1806 and the SIMD processor 1506.

The multiplexer 1807 selects one error data according to the image data received from the decoder 1806 (step S2205), and outputs the error data selected to the SIMD processor 1506 and the error data adder 1808 (step S2206). The error data adder 1808 that receives the error data calculates weighted error data based on the error data (step S2207). The sequential image data processor 1507 executes the processes sequentially and repeatedly to the additional value data received.

In this example, two units of the SIMD processor 1506 shown in FIG. 15 are used. One of the SIMD processors 1506 is used for image data for Y (Yellow) and image data for K (Black) of YMCK image data, and the other one of the SIMD processors 1506 is used for performing the gradation process for two sets of image data for C (Cyan) and M (Magenta). Therefore, image data based on two inputs and two outputs are processed in such a manner that two image data (YK or CM), before the gradation process, are input to the SIMD processor 1506 and two image data (YK or CM) are output from the SIMD processor 1506.

When the error diffusion process is performed, the process is performed on the two image data received by switching the SIMD processor 1506 having one sequential image data processor for each number of image data that can be processed in the SIMD.

Figure 35:
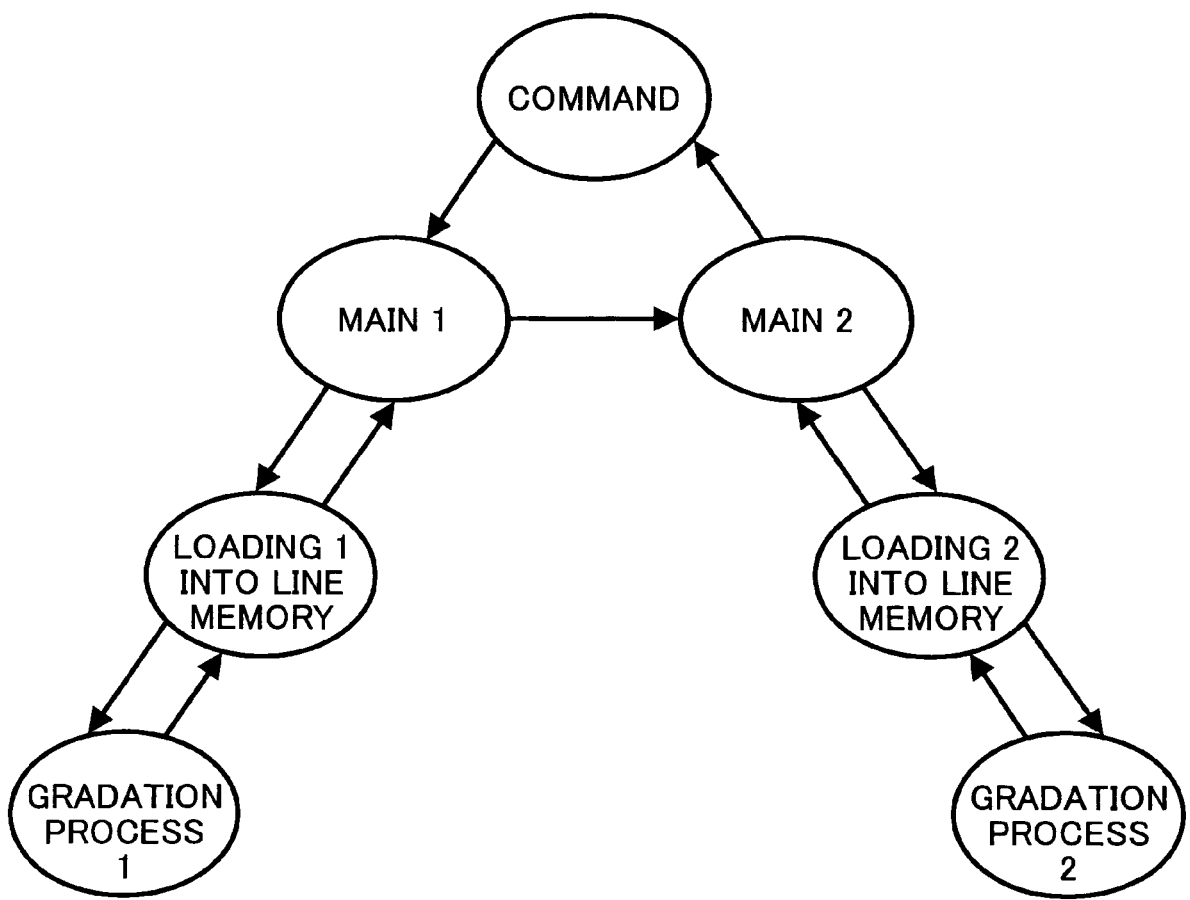
FIG. 35 is a state transition diagram of the image processor.

The state transition diagram of the image processor as shown in FIG. 35 is explained below. In the image processor, the process states are looped such as command→main 1 (process of image data for Magenta/Yellow)→main 2 (process of image data for Cyan/Black)→command→main 1 . . . .

Figure 36A:
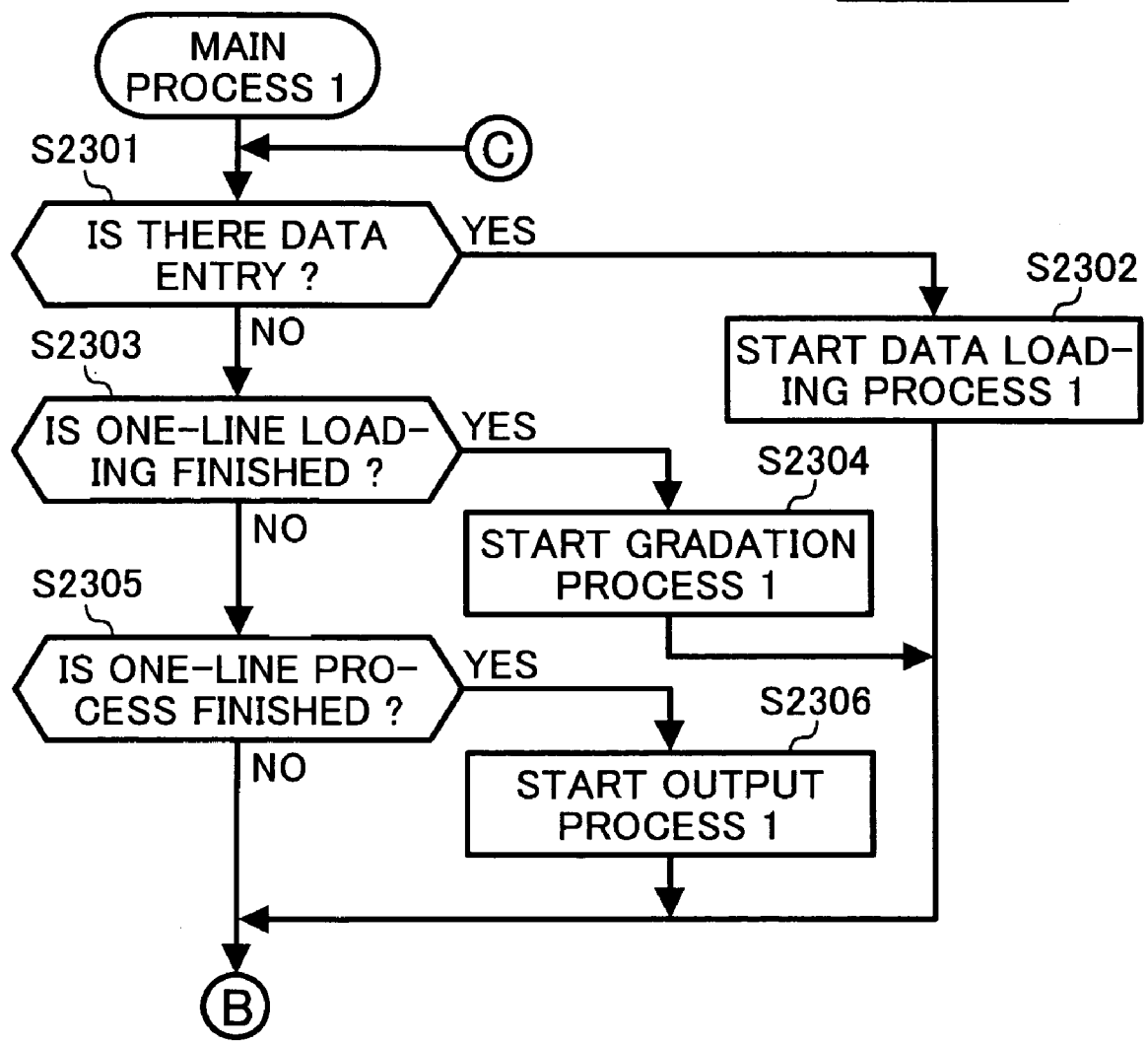
FIG. 36 is a flowchart of the image processor.
Figure 36B:
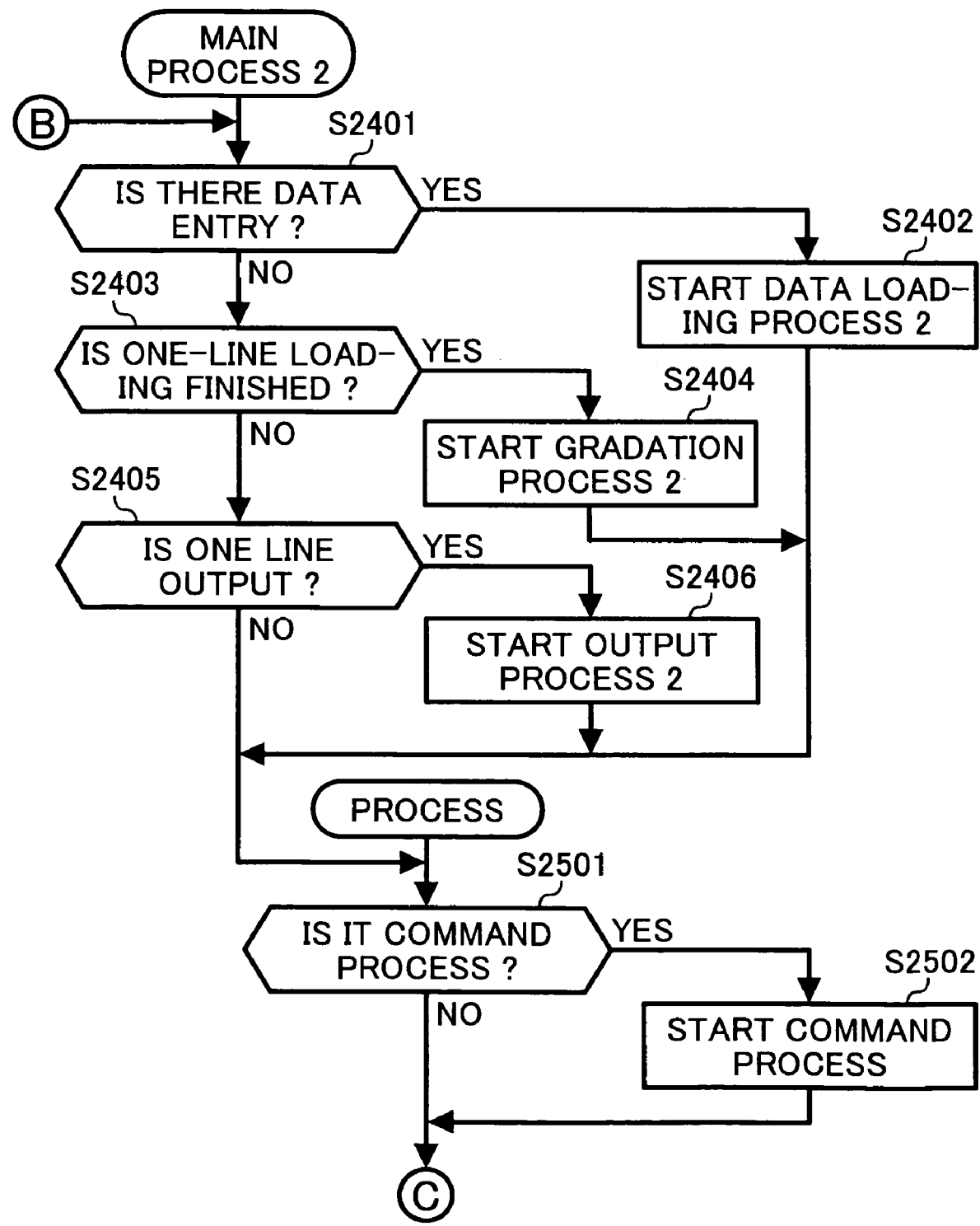

Operation of the image processor during the two-input two-output is explained below based on the flowchart of FIG. 36. In the main process 1, the image data for Magenta or Yellow is processed, while in the main process 2, the image data for Cyan or Black is processed.

Image data for Magenta (Yellow) is input to the SIMD processor 1506 through the data I/O bus 1501a and is output through the data I/O bus 1501c. Image data for Cyan (Black) is input to the SIMD processor 1506 through the data I/O bus 1501b and is output through the data I/O bus 1501d. The data I/O bus 1501c is also used for output for debugging.

In the main process 1, if there is any data entry to the SIMD processor 1506 (step S2301, Y), the SIMD processor 1506 starts loading image data into the memory (RAM) 1503 (data loading process 1) (step S2302). If loading of one line is finished (step S2303, Y), the SIMD processor 1506 starts gradation process 1 (error diffusion process in this case) in units of image data that SIMD processor 1506 can process (step S2304). When one-line process is finished (step S2305, Y), output process 1 for one line is started (step S2306). The loading of the image data into the memory at step S2302 and an output start process at step S2306 are executed by setting a process start command to each of the memory controllers 1505a to 1505b in a register, and the SIMD processor 1506 shifts to the next control (state transition). The start of the gradation processor (error diffusion process) (step S2304) is executed by writing a process start command to the sequential image data processor 1507b as a predetermined set value corresponding to a start command of the error-diffusion-process hardware control register 3008.

The main process 2 is performed in the same manner as above, and therefore, detailed explanation thereof is omitted.

In the command process, command to the SIMD processor 1506 is accepted from the CPU for control.

The image data after being processed in the gradation processor 412 is subjected to correction process by the printer γ converter 413 according to changes of the printer 414 with time and is output to the printer 414.

An operation screen for selecting a function of Auto Color Calibration (ACC) of the image density (gradation) is explained below.

Figure 37:
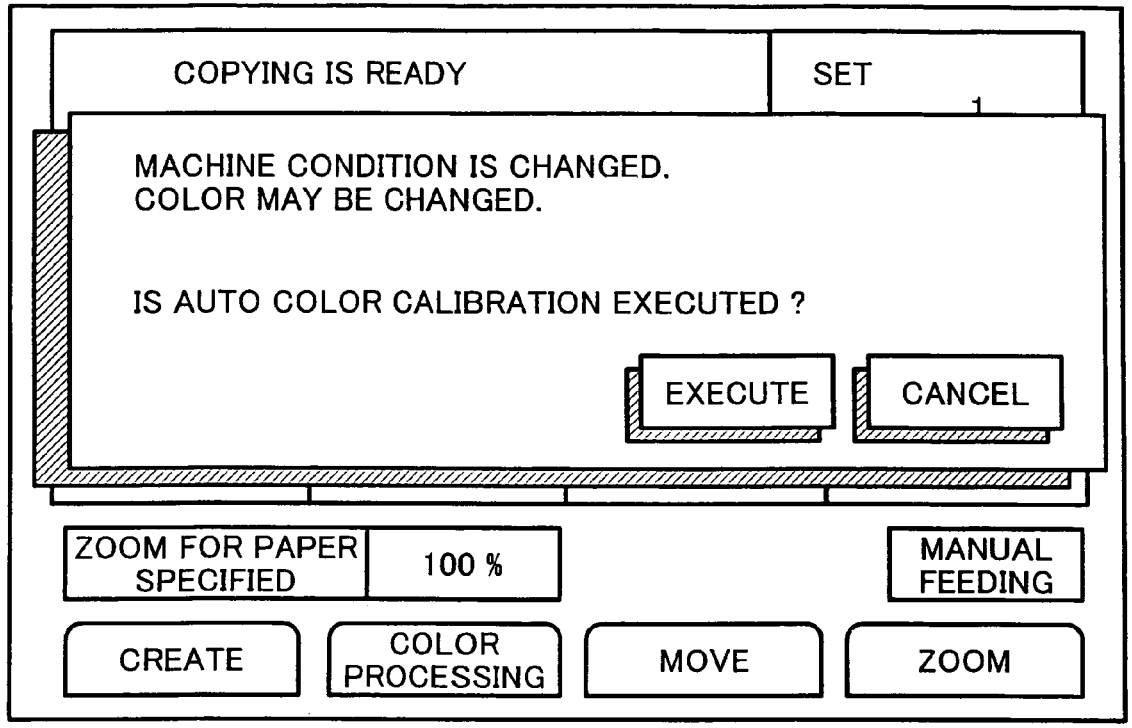
FIG. 37 is a diagram for explaining a screen where execution of ACC can be chosen.
Figure 38:
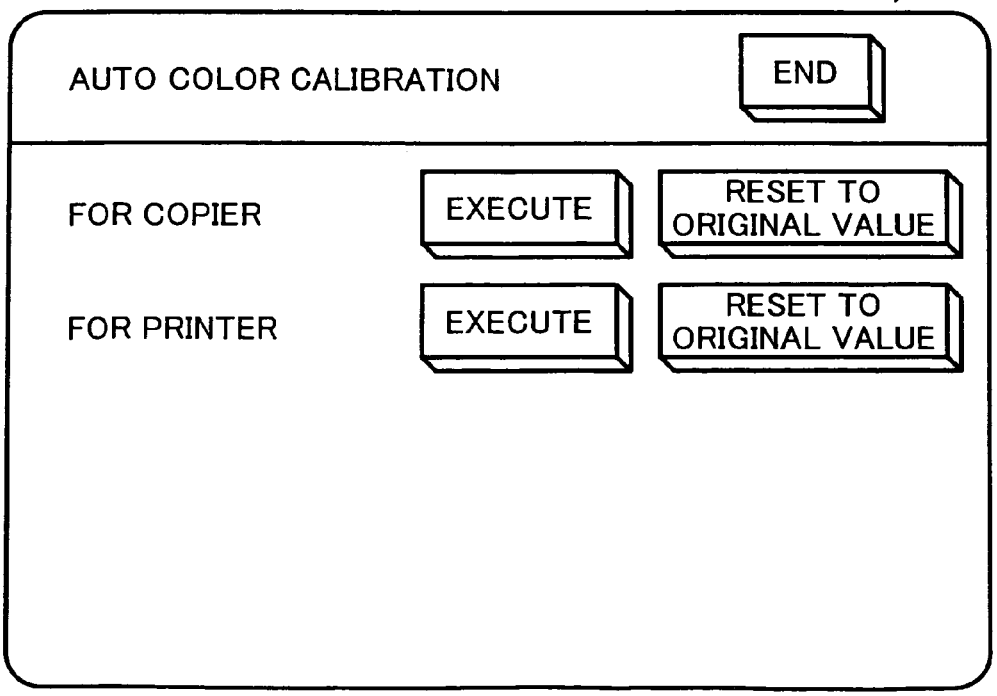
FIG. 38 is a diagram for explaining a screen for choosing the execution of ACC.
Figure 39:
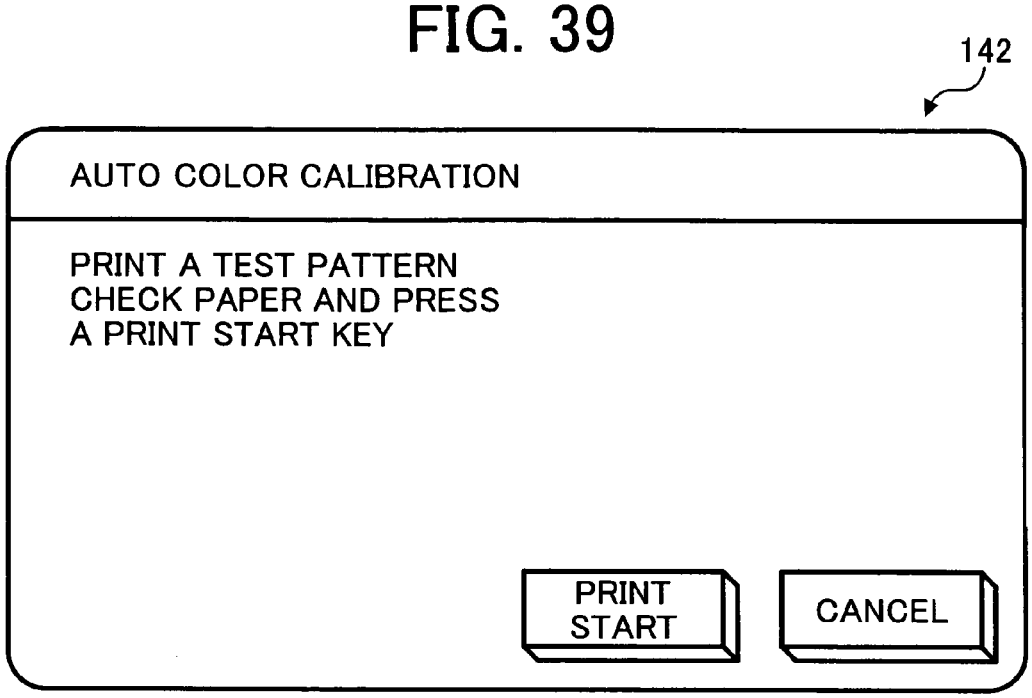
FIG. 39 is a diagram for explaining a screen displayed during the execution of ACC.

As shown in FIG. 37, an ACC menu is called by an operation of a touch panel of the operation unit 142, and a screen of FIG. 38 is displayed. A key [Execute] of ACC for a copier or for a printer displayed on the screen is selected, and a screen of FIG. 39 is displayed. If "For copier" is selected on the screen of FIG. 38, the gradation correction table used for copier is changed based on the reference data, and if "For printer" is selected, the gradation correction table used for printer is changed based on the reference data. A key "Reset to original value" is displayed on the screen of FIG. 38 so as to enable selection of the gradation correction table before the process, if the result of image formation of a test pattern on the screen of FIG. 39 using the gradation correction table after the change is undesirable.

Figure 41:
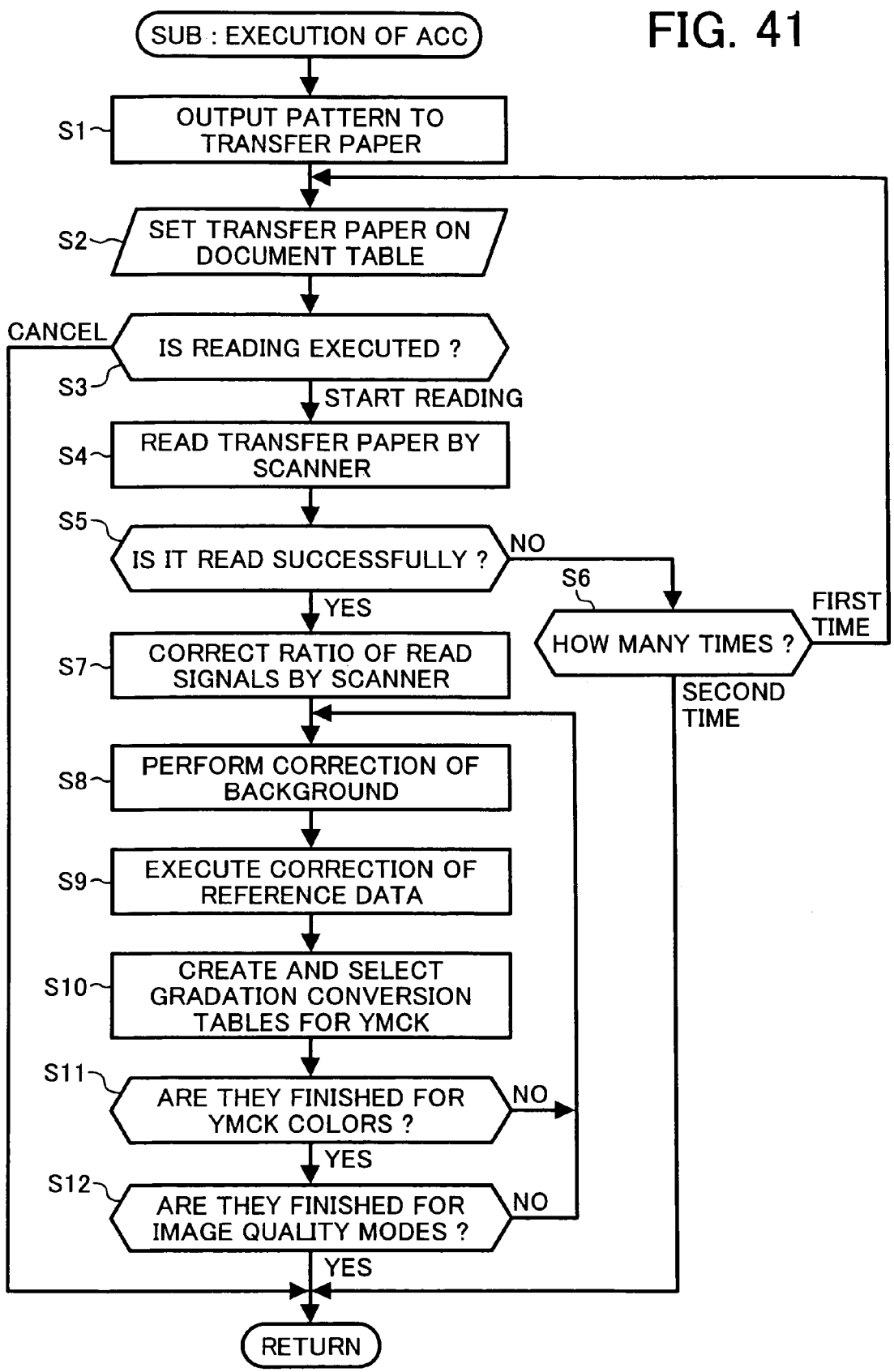
FIG. 41 is a flowchart for explaining the execution of ACC.

The operation of the auto color calibration (ACC) of the image density (gradation) is explained below with reference to the flowchart of FIG. 41.

When the key [Execute] of the auto color calibration for the copier or the printer is selected on the screen of FIG. 38, the screen of FIG. 39 is displayed.

Figure 40:
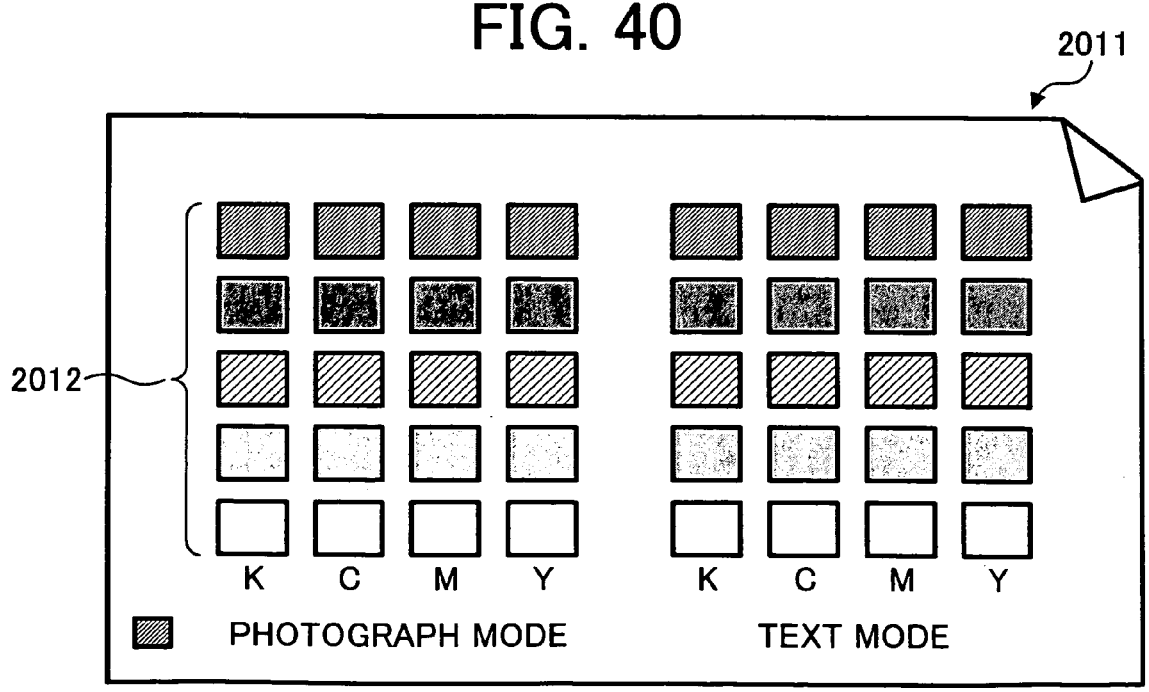
FIG. 40 is a plan view of transfer paper on which toner patterns are formed and which is output for printing upon the execution of ACC.

"Print start" key is pressed down in the screen of FIG. 39 to form a plurality of density gradation patterns (toner pattern 2012), corresponding to the colors of YMCK and the image quality modes of text and photograph, on a transfer material 2011 as shown in FIG. 40 (step S1).

The toner pattern 2012 is previously set and stored in the ROM 417 or the like. A write value of the toner pattern 2012 has 16 patterns such as 00h, 11h, 22h, . . . , EEh, and FFh in a hexadecimal notation. FIG. 40 depicts patches for five gradations excluding the background portion of a document, and arbitrary value can be selected out of 8-bit signals from 00h to FFh. The toner pattern 2012 for the photograph mode (first gradation pattern) is formed through an error diffusion process using 2-bit (one example) quantization threshold that changes periodically in amplitude. The toner pattern 2012 for the text mode (second gradation pattern) is formed through an error diffusion process using fixed quantization threshold for two bits (one example). Alternatively, toner pattern 2012 for the text mode is formed through an error diffusion process using quantization threshold of smaller amplitude than the quantization threshold used for forming the toner pattern 2012 for the photograph mode, or using quantization threshold of smaller frequency (pattern creating unit).

Figure 42:
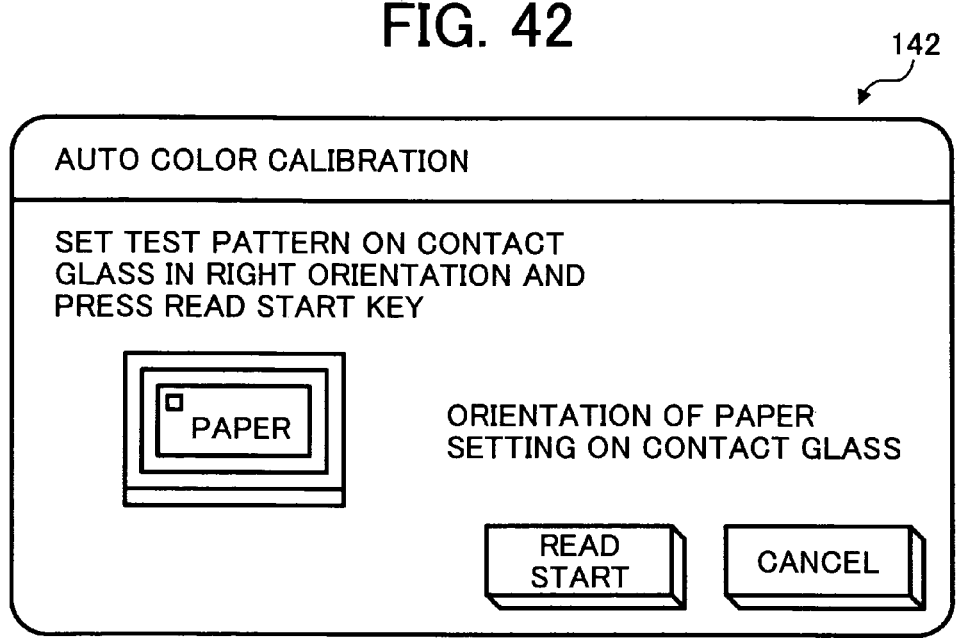
FIG. 42 is a diagram for explaining a screen displayed during the execution of ACC.

After an image of the toner pattern 2012 is formed on the transfer material 2011, a screen of FIG. 42 is displayed on the touch panel of the operation unit 142 so as to set the transfer material 2011 on the contact glass 118. The operator sets the transfer material 2011 with the toner pattern 2012 formed thereon on the contact glass 118 following the instruction on the screen (step S2), and selects "Read start" key or "Cancel" key on the screen of FIG. 42 (step S3).

When "Cancel" is selected, the process is finished. When "Read start" is selected, the scanner 420 moves and scans RGB data of a YMCK density pattern (image reader) (step S4). At this time, the scanner 420 reads image data of the toner pattern 2012 and image data of the background portion of the transfer material 2011.

It is determined whether the image of the toner pattern 2012 is successfully read (step S5). If it is not successfully read (step S5, N), the screen of FIG. 42 is displayed again. If it is not successfully read twice, the process is finished (step S6).

If it is successfully read (step S5, Y), a ratio of read signals of the scanner 420 is corrected (step S7), and a background data process is performed on the data read (step S8). After a high image density portion of reference data is processed (step S9), a gradation conversion table is created and selected (corrector) (step S10). With these processes, it is possible to easily set most appropriate parameters in the printer γ converters 409 and 411.

The processes are performed for each of the colors YMCK (step S11, N), and when they are finished (step S11, Y), the processes are further performed for each of the image quality modes such as the photograph mode and the text mode (step S12, N).

The key "Reset to original value" is displayed on the screen of FIG. 38 so as to enable selection of the gradation correction table before the process, if the result of image formation using the gradation correction table after the process is undesirable.

A correction process of the background portion of a document is explained below.

There are two reasons to perform the correction process on the background of the document.

One of the reasons is as follows. It is to correct a white level of the transfer material 2011 to be used when ACC is executed. This is because even if an image is formed by the same copier at the same time, values are differently read by the scanner 420 depending on the white level of the transfer material 2011 to be used. If the correction is not performed, some defects come up. For example, if a recycled paper or so whose white level is low is used for the ACC to create a gradation conversion table for Yellow, correction is performed so that a yellow component is made less because the recycled paper generally contains a lot of yellow component. The image is copied next time, keeping the same condition, on an art paper or so whose white level is high. Then, the image does not contain a sufficient amount of yellow component, which may cause undesirable color reproduction to be obtained.

The other reason is as follows. If the thickness (paper thickness) of the transfer material 2011 (transfer paper) used for execution of ACC is thin, color of any parts such as a pressure plate that presses the transfer material 2011 may be undesirably scanned by the scanner 420 because it is visible through the thin paper. For example, when an auto document feeder called ADF is mounted instead of the pressure plate, a belt is used to convey the document. A rubber-base material of the belt causes the transfer material 2011 to have a lower white level and to be slightly grayish white. Therefore, the image signals read are apparently high on the whole. Therefore, a gradation conversion table is created so as to be slightly lighter accordingly. The image is copied this time, keeping this condition, on a transfer paper of which paper thickness is thick and transparency is low. This time, the image is reproduced in such a manner that the whole density of the image is low. Therefore, a desirable image is not always obtained.

In order to prevent such defects, the image signals obtained by reading the toner pattern 2012 are corrected based on the image signals obtained by reading the background portion of the document.

However, there are some advantages even if the correction is not performed on the image signals. If the transfer material 2011 having a high degree of yellow component such as the recycled paper is always used, the case of no correction may allow better color reproduction to be performed on a color containing the yellow component. Furthermore, if only a thin transfer paper is always used, a gradation conversion table is created based on the condition matching the thin paper, which is advantageous.

It is possible to execute or not to execute correction of the background portion according to the situation and the taste of the user in the above manner.

The operation and the process of the auto color calibration (ACC) are explained below.

A write value of the toner pattern 2012 formed on the transfer material 2011 is "LD[i] (i=0, 1, ..., 9)", and values of the toner pattern 2012 formed that are read by the scanner 420 are "v[t][i]=(r[t][i], g[t][i], b[t][i])(t=Y, M, C, K, i=0, 1, ..., 9)" expressed in a vector form.

The values may be expressed by luminance, chroma, and hue angle (L*, c*, h*) instead of (r, g, b), or may be expressed by luminance, red, and blue (L*, a*, b*).

Readout values of white as a reference previously stored in the ROM 417 or the RAM 416 are (r[W], g[W], b[W]).

Assuming a pattern number of density of an image is set to k-th [e.g., a pattern of the highest image density is selected], the magnitudes (Δr[t][k], Δg[t][k], Δb[t][k]) of readout values of the pattern are obtained as follows from readout values (r[t][i], g[t][i], b[t][i]) of RGB signals.

$\Delta r[t][k] = r[W] - r[t][k]$ $\Delta g[t][k] = g[W] - g[t][k]$ $\Delta b[t][k] = b[W] - b[t][k]$ On the other hand, rates of the magnitudes of RGB components in the readout values of the pattern with respect to respective YMCK toners are expressed by "k[s][t] {s=R, G, or B; t=Y, M, C, K|k[s][t]≅1}", and they are stored in the RAM 416. In the equation, k[s][t] indicates taking neighboring decimals, but they are stored as integer data as follows in the copier.

$k[s][t] = k1[s][t]/2n$ ($k1[s][t]$ is an integer of $k1[s][t] \cong 2n$)

This case includes, for example, n=10, 2n=1024, and so.

The method of generating a gradation conversion table (Look Up Table(LUT)) performed in the printer 7 converter 409 and the printer γ converter 411 upon execution of ACC is explained below.

In readout values of the toner pattern 2012 "v[t][i]=(r[t][i], g[t][i], b[t][i])", the image signals for complementary colors of YMC toners are b[t][i], g[t][i], and r[t][i], respectively, and therefore, only each of the image signals for the complementary colors is used. In this case, "a[t][i] (i=0, 1, 2, ..., 9; t=C, M, Y, K)" is used to simplify the following explanation. Creation of the gradation conversion table makes the process easier. As for black toner, sufficient precision is obtained by using any one of the image signals for RGB, but a G (green) component is used herein.

Reference data is given by a set of readout values by the scanner 420 "v0[t][i]=(r0[t][i], g0[t][i], b0[t][i])" and corresponding write values by laser "LD [i] (i=1, 2, ..., m)". Likewise, the following is expressed by using only the complementary-color image signals for YMC to simplify the explanation "A[t][n[i]] (0≤n[i]≤255; i=1, 2, ..., m; t=Y, M, C, K)"

where m is the number of reference data.

Table 10 shows an example of correction values for a machine difference (hereinafter, "machine-difference correction values") used for the process (correction of machine difference) at step S7. The values of table 10 are the machine-difference correction values corresponding to the hues of White, Black, Yellow, Red, Magenta, Blue, Cyan, and Green, and represent an example of machine-difference correction values for signals of Red (R), Green (G), and Blue (B) that are color components of charge-coupled device (CCD) in the scanner 420. When t represents any one of the YMCK toners and k(c, ccd) is a machine-difference correction value, values of the reference data for ACC after correction are set to "A1[t][n[i]] (t=C, M, Y, K,; i=1, 2, ..., 1023)", and the reference data A[t][n[i]] is corrected in the following manner using the values obtained $$A1[t][n[i]] = A[t][n[i]] + (k(t, r) - k(t, \text{White})) \times n[i] / 1023 + k(t, \text{White}) \quad (2)$$

where if t=Cyan, Magenta, Yellow, r represents Red, Green, Yellow that are their complementary colors, respectively, and r represents Green if t=Black.

TABLE 10

| Correction value for machine difference: k(hue, RGB) | | | |
|---|---|---|---|
| | Correction value for machine difference: RGB signals | | |
| Hue(hue) | Red | Green | Blue |
| White | −16 | −28 | −27 |
| Black | 7 | 7 | 46 |
| Yellow | 0 | 0 | 0 |
| Red | −5 | 0 | 0 |
| Magenta | 0 | −26 | 0 |
| Blue | 0 | 0 | −46 |
| Cyan | 5 | 0 | 0 |
| Green | 0 | 26 | 0 |

Figure 43:
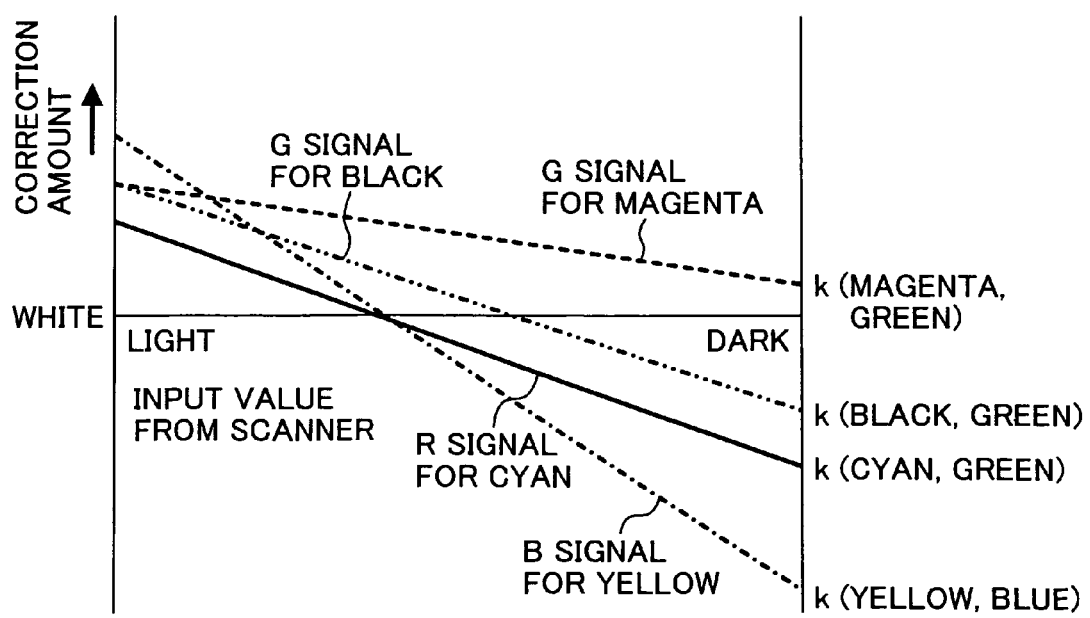
FIG. 43 is a diagram for explaining correction of difference between machines.

An example of expression of the function is shown in FIG. 43. The correction values in the table 10 are set upon manufacture of the copier and maintained in the copier. These values can be set by operating the touch panel of the operation unit 142.

In the following, A[t][n[i]] is newly used instead of A1[t][n[i]] in the equation (2). By using this value, the readout values by the scanner 420 "v[t][i]=(r[t][i], g[t][i], b[t][i]) (t=Y, M, C, K, i=0, 1, ..., 9)" are corrected in the following manner.

A case of t=C (cyan) is explained below as an example. RGB components in readout values of Cyan toner are corrected as follows, $$r1[C][i]=r[C][0]-\Delta r[t][k] \times k[r[[t]]$$

$$g1[C][i]=g[C][0]-\Delta g[t][k] \times k[g[[t]]$$

$$b1[C][i]=b[C][0]-\Delta b[t][k] \times k[b[[t]]$$

and these values are used in the following as new values (r[t][i], g[t][i], b[t][i]).

The gradation conversion table is obtained by comparing the a[LD] with the reference data A[n] stored in the ROM 417, where n is an input value to the gradation conversion table, and reference data A[n] is a target value of an image signal obtained by reading out the toner pattern 2012 for YMC that is output with the write value by laser LD[i] after the input value n is subjected to gradation conversion. The reference data consists of two types of values such as a reference value A[n] that is corrected according to the image density that the printer 414 can be output and a reference value A[n] that is not corrected. Whether the reference value is corrected is determined based on data used for determination (explained later) previously stored in the ROM 417 or the RAM 416. The correction is explained later.

By obtaining LD corresponding to A[n] from the value a[LD], a laser output value LD[n] corresponding to the input value n to the gradation conversion table is obtained.

The laser output value LD[n] is obtained for the input value i=0, 1, . . . , 255 (e.g., 8-bit signal), and the gradation conversion table can be obtained.

Instead of performance of the processes on all the values for the input values "n=00h, 01h, . . . , FFh (hexadecimal) to the gradation conversion table, the processes are preformed on discrete values such as "ni=0, 11h, 22h, . . . , FFh". As for points other that this, interpolation is performed using spline function or the like, or a table closest to the set of values (0, LD[0]), (11h, LD[11h]), (22h, LD[22h]), . . . , (FFh, LD[FFh]), which are obtained through the processes, in a γ-correction table previously stored in the ROM 417.

Figure 44:
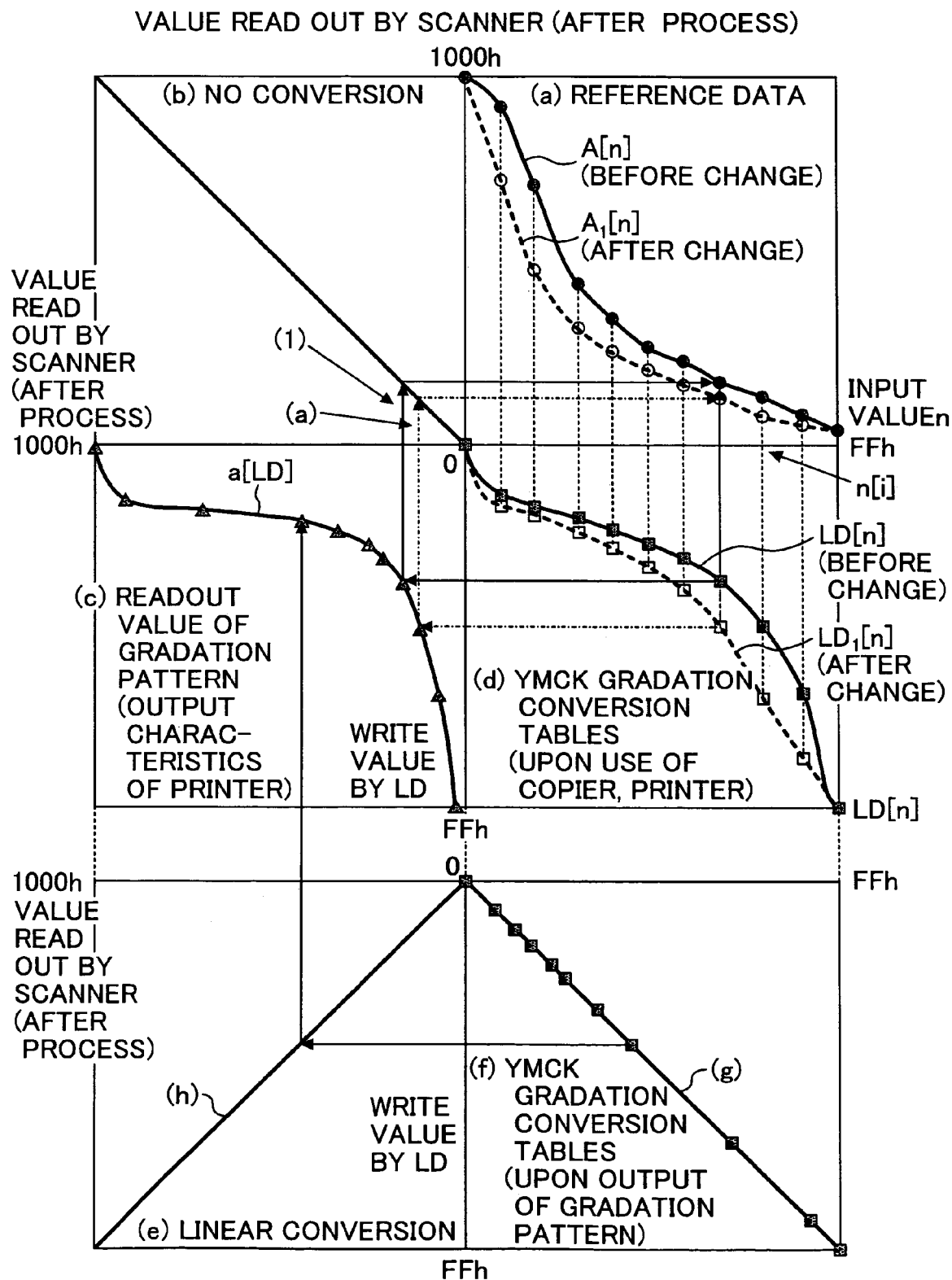
FIG. 44 is a four-quadrant chart for explaining a computing method of ACC.

The processes are explained below with reference to FIG. 44. The horizontal axis of the first quadrant (a) of FIG. 44 represents an input value n to the gradation conversion table, the vertical axis represents a value (after the process) read-out by the scanner 420 and the reference data A[i]. The value (after the process) read-out by the scanner 420 is a value obtained after processes as follows are performed on the values of the toner pattern 2012 read by the scanner 420. The processes include RGB γ-conversion (conversion is not performed in this case) and averaging and addition of readout data at several points in the toner pattern 2012. In order to improve computation precision, the data is processed as 12-bit data signal.

The horizontal axis of the second quadrant (b) of FIG. 44 represents a value read-out by the scanner 420 (after the process) in the same manner as the vertical axis.

The vertical axis of the third quadrant (c) represents write values by a laser beam (LD). The data a[LD] represents characteristics of the printer 414. Write values by LD of the toner pattern 2012 to be actually formed are 16 points of 00h (background), 11h, 22h, . . . , EEh, FFh, which represent discrete values. In this case, however, each interval between points detected is interpolated, so that the data can be handled as a continuous graph.

Graph (d) of the fourth quadrant represents the gradation conversion table LD[i], and a purpose of this graph is to obtain the table.

The vertical axis and the horizontal axis of graph (f) represent the same as those of the graph (d). When a gradation pattern for detection is to be formed, a gradation conversion table (g) of the graph (f) is used.

The horizontal axis of graph (e) is the same as that of the third quadrant (c), and represents a linear conversion for convenience to represent a relation between the write value by LD upon creation of the gradation pattern and the values (after the process) of the toner pattern 2012 read by the scanner 420.

The reference data A[n] for an input value n is obtained, and an output value LD[n] by LD to obtain A[n] is obtained by using the readout value a[LD] of the gradation pattern according to an arrow (1) of FIG. 44.

Figure 45:
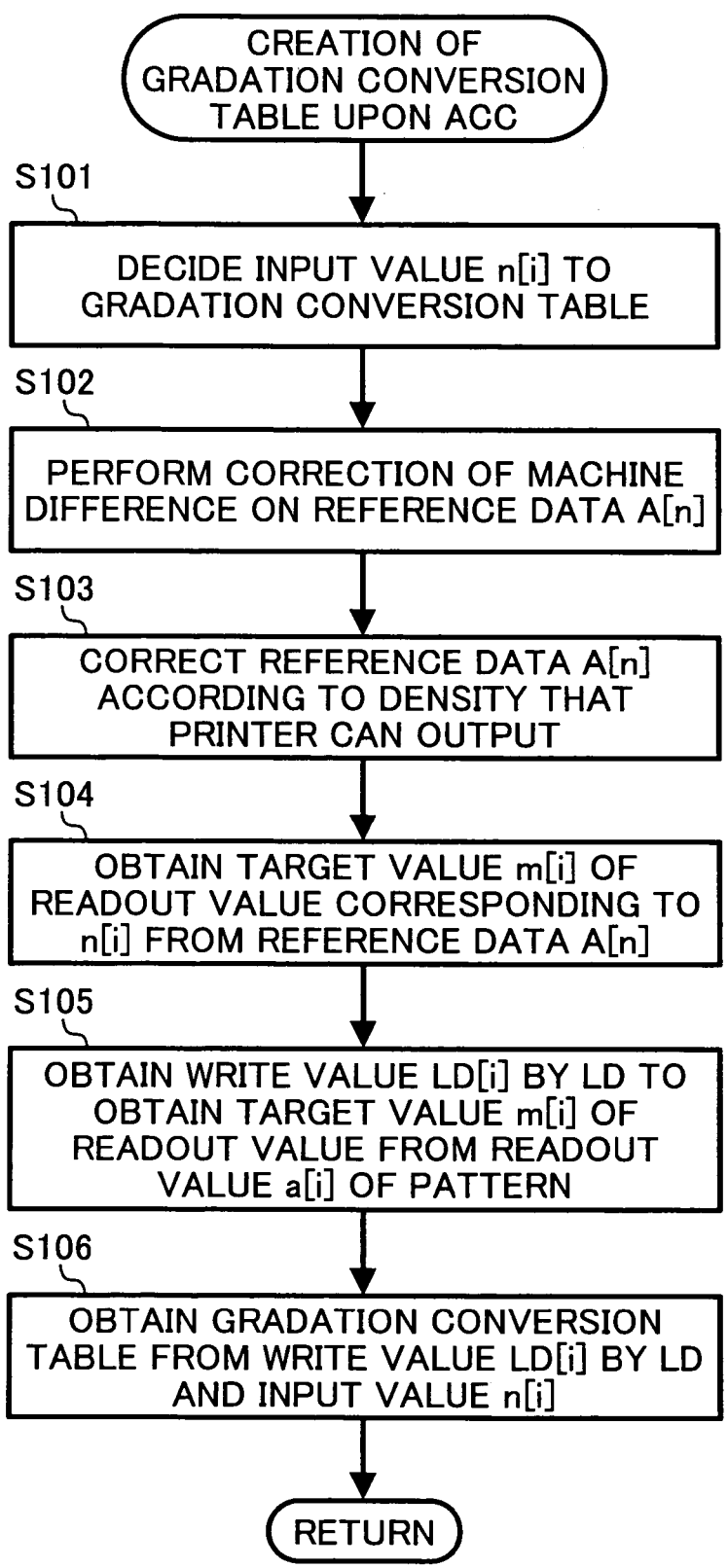
FIG. 45 is a flowchart for explaining the computing method of ACC.

The computation procedures for ACC are explained below with reference to FIG. 45.

At first, an input value required to obtain a γ-correction table is decided (step S101). Here, the input value is decided as "n[i]=11(h)×i(i=0, 1, . . . , imax=15).

Then, correction of a machine difference is performed (step S102). This process is as explained above.

The reference data A[n] is corrected according to the image density that the printer can output (step S103). More specifically, the write value, by a laser with which the maximum image density that the printer 414 can create is obtained, is decided as FFh (expressed in hexadecimal), and a readout value m [FFh] of the pattern at this time is decided as mmax. Reference data that is not corrected from its low image density side over its intermediate image density side is decided as "A[i](i=0, 1, . . . , i1)". Reference data that is not corrected in its high image density side is decided as "A[i](i=i2+1, . . . , imax−1)(i1≦i2, i2≦imax−1)". Reference data that is corrected is decided as "A[i] (i=i1+1, . . . , i2)".

A specific calculation method is explained below assuming that an image signal is set as an image signal which is not subjected to RGB γ-conversion and which is proportional to document reflectivity. Of the reference data not to be corrected, a difference ΔRef is obtained between the reference data A[i2+1] in which the image density is the lowest in its high image density portion and the reference data A[i1] in which the image density is the lowest in its low image density portion. That is, the following is obtained:

$$\Delta \text{Ref}=A[i1]-A[i2+1]$$

In a case of reflectivity linear or luminance linear in which RGB γ-conversion that is as an inverse process is not performed, then "ΔRef>0".

On the other hand, a difference Δdet is obtained in the same manner as above from the readout value mmax of the pattern from which the maximum image density that the printer 414 can create is obtained. That is, $$\Delta \text{det}=A[i1]-m\text{max}$$

Based on this, the reference data A[i](i=i1+1, . . . , i2) obtained by correcting its high density portion is changed as follows:

$$A[i]=A[i1]+(A[i]-A[i1]) \times (\Delta \text{det}/\Delta \text{Ref})$$
$$(i=i1+1, i1+2, \ldots, i2-1, i2)$$

The reference data of the first quadrant consists of four target densities of two target values for a pattern for the photograph mode and a pattern for the text mode in which error diffusion is performed using quantization thresholds that periodically oscillate, and of two target densities for the text portion and for the photograph portion in each of the image quality modes for the photograph mode and the text mode. Gradation conversion tables of 16 types in total for the four colors of YMCK in the fourth quadrant corresponding to these target densities are created. These 16 types of gradation conversion tables are used by being allocated to the first printer γ table and the second printer γ table according to the text mode and the photograph mode.

The reason that the target values of the parameters used for gradation conversion are provided for each image quality mode is as follows.

When the target density of the text portion (line-drawing portion) and the target density of the photograph portion (solid portion) of an image are integrated, an amount of toner deposition to the text portion becomes higher than an amount of toner deposition to the solid portion due to the edge effect, and the image density increases. Therefore, if an image of the text portion is created using the gradation conversion table that is used to achieve the image density for the solid portion (photograph portion), the amount of toner deposition to the text portion increases, which may cause toner scattering to occur. Conversely, if an image of the photograph portion (solid portion) is created by using the gradation conversion table used to achieve the target image density of the text portion, there comes up some defects such that the density in the solid portion decreases.

Therefore, target densities are set for the text portion and the photograph portion in each image quality mode, and gradation conversion tables for achieving these target densities are creased. With these gradation conversion tables, it is possible to suppress occurrence of toner scattering and ensure the target density of the photograph portion (solid portion) while ensuring the toner density of the text portion (line-drawing portion)

Subsequently, an image signal m[i] read by the scanner corresponding to n[i] is obtained from the reference data A[n] (step S104).

In actual cases, the reference data "A[n[j]] (0≦n[j]≦255, j=0, 1, ..., jmax, n[j]≦n[k] for j≦k)" is changed as follows.

At first, "j(0≦j≦jmax)" that becomes "n[j]≦n[i]<n[j+1]" is obtained.

If an 8-bit image signal, calculation becomes easier by previously obtaining reference data as "n[0]=0, n[jmax]=255, n[jmax+1]=n[jmax]+1, A[jmax+1]=A[jmax]".

As for intervals in the reference data, n[j] has intervals as small as possible, which allows an increase in precision of a γ-correction table to be finally obtained.

Subsequently, m[i] is obtained from the following equation based on j that is obtained in the above manner (step S105).

$$m[i]=A[j]+(A[j+1]-A[j])\cdot(n[i]-n[j])/(n[j+1]-n[j])$$

Here, an interpolation is performed using a primary expression, but the interpolation may be performed using high-order function and spline function. In that case, "m[i]=f(n[i]) is used. In the case of a k-order function, it becomes $$f(X) = \sum_{i=0}^{k} b_i x^i$$

Then, a write value LD[i] by LD to obtain m[i] is obtained in the same procedure as above (step S106).

At first, when image signal data not subjected to RGB γ-conversion is processed, a[LD] becomes smaller as the value of LD becomes greater. In other words, a[LD[k]]≧a[LD[k+1]] is obtained with respect to LD[k]<LD[k+1]

Values upon pattern formation are set as 10 values of "LD[k]=00h, 11h, 22h, ..., 66h, 88h, AAh, FFh, (k=0, 1, ..., 9)".

This is because in the image density portion with a small amount of toner deposition, the intervals of the write values LD[k] for a pattern are made densely because a value of the amount of toner deposition read by the scanner largely changes, and in the image density portion with a large amount of toner deposition, the intervals are made widened because values of the amount of toner deposition read by the scanner change not so much.

As merits according to this, toner consumption can be suppressed as compared with the case where the number of patterns is increased such as "LD[k]=00h, 11h, 22h, ..., EEh, FFh" (16 points in total). Furthermore, in an area of high image density, readout values are easily reversed due to influences such as small changes in write values by LD, nonuniform potential on the photoconductor, nonuniform toner deposition, nonuniform fixing density, and nonuniform potential. Therefore, even if the intervals of write values by LD are made densely, this is not always effective to improve precision. This is why the patterns are formed using the write values by LD as explained above.

LD[i]=LD[k]+(LD[k+1]−LD[k])·(m(i)−a[LD[k]])/(a[LD[k+1]]−a[LD[k]]) is decided for LD[k] that becomes "a[LD[k]]≧m[i]>a[LD[k+1]]".

If "a[LD[kmax]]>m[i]" (when the image density of a target value obtained from the reference data is high) assuming 0≦k≦kmax (kmax>0), prediction is performed through extrapolation using the primary expression based on $$LD[i]=LD[k]+(LD[kmax]-LD[kmax-1])\cdot(m(i)-a[LD[kmax-1]])/(a[LD[kmax]]-a[LD[kmax-1]]).$$

The extrapolation may be performed using another method, other than the primary expression, of taking a logarithm of each side.

A set "(n[i], LD[i]) (i=0, 1, ..., 15)" of an input value n[i] to the γ-correction table and an output value LD[i] is obtained through the calculation.

Based on "(n[i], LD[i]) (i=0, 1, ..., 15)" obtained, interpolation is performed using the spline function, or the γ-correction table stored in the ROM 417 is selected.

According to the present embodiment, a feature-extraction threshold is subjected to gradation conversion using gradation conversion parameters used in the first gradation converter, and a feature amount is extracted from image data after the gradation conversion is performed by the first gradation converter based on the feature-extraction threshold that is gradation-converted. Thus, it is possible to reduce influence for the parameters gradation-converted from the result of extracting the feature amount and to minimize occurrence of defects on the image.

In the copier according to the embodiment, the example in which image processing is executed by the scanner-IPU controller 418 that is a hardware resource of the digital circuit configuration is shown, but it is not limited to the example. Therefore, the image processing may be executed by operating the main controller (CPU) 130 using the computer program installed in the hardware resource (e.g., flash memory 184) of the copier.

It should be noted that further effects and modifications can be easily made by persons skilled in the art. Therefore, a wide scope of modes of the present invention is not limited by the particular details or the typical embodiments expressed and described in the above manner. Accordingly, various modifications are possible without departing from the basic teaching or the scope of the present invention defined by the appended claims and equivalents thereto.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image-quality-mode receiving unit that receives a selection of an image quality mode for forming an image based on image data;
a first gradation converting unit that performs a gradation conversion of the image data by setting a gradation conversion parameter based on the image quality mode;
a feature extracting unit that performs a gradation conversion of a feature-extraction threshold based on the gradation conversion parameter, and extracts, based on the feature-extraction threshold on which the gradation conversion is performed, a feature amount from the image data on which the gradation conversion is performed; and
a second gradation converting unit that performs a gradation conversion of the image data by setting a gradation conversion parameter based on a result of extracting the feature amount and the image quality mode.

2. The image processing apparatus according to claim 1, wherein the feature-extraction threshold includes any one of extraction threshold of a primary differential filter, extraction threshold of a secondary differential filter, and high-density threshold.

3. The image processing apparatus according to claim 1, wherein each of the gradation conversion parameters set in the first gradation converting unit and the second gradation converting unit has a target gradation-characteristic-value for each image quality mode.

4. The image processing apparatus according to claim 1, wherein the second gradation converting unit uses gradation conversion characteristics created by piecewise linear approximation.

5. The image processing apparatus according to claim 1, wherein
the gradation conversion parameter for a text portion set by the second gradation converting unit is changed to adjust density for a text portion of the image, and
the gradation conversion parameter set by the first gradation converting unit and the gradation conversion parameter for a halftone-dot portion of the image set by the second gradation converting unit are changed to adjust density for a photographic portion of the image.

6. The image processing apparatus according to claim 1, further comprising:
a pattern creating unit that creates a plurality of first gradation patterns and second gradation patterns by changing density of the image;
an image reading unit that reads the first gradation pattern and the second gradation pattern; and
a correcting unit that corrects the gradation conversion parameters set by the first gradation converting unit and the second gradation converting unit based on a result of reading the first gradation pattern and the second gradation pattern, wherein
the first gradation pattern is obtained by performing an error diffusion using quantization threshold that oscillates periodically, and
the second gradation pattern is obtained by performing an error diffusion using either one of quantization threshold that oscillates periodically, having an amplitude or a period different from the first gradation pattern, and fixed quantization threshold.

7. The image processing apparatus according to claim 1, further comprising a programmable image processor that includes an executing unit that executes a sequential process, wherein
processes performed by the feature extracting unit and the second gradation converting unit are implemented by a process executed by the image processor.

8. An image processing method comprising:
receiving a selection of an image quality mode for forming an image based on image data;
performing a gradation conversion of the image data by setting a gradation conversion parameter based on the image quality mode;
feature extracting including
performing a gradation conversion of a feature-extraction threshold based on the gradation conversion parameter; and
extracting, based on the feature-extraction threshold on which the gradation conversion is performed, a feature amount from the image data on which the gradation conversion is performed; and
performing a gradation conversion of the image data by setting a gradation conversion parameter based on a result of extracting the feature amount and the image quality mode.

9. A computer-readable recording medium that stores an image processing program, wherein the image processing program causes a computer to execute:
receiving a selection of an image quality mode for forming an image based on image data;
performing a gradation conversion of the image data by setting a gradation conversion parameter based on the image quality mode;
feature extracting including
performing a gradation conversion of a feature-extraction threshold based on the gradation conversion parameter; and
extracting, based on the feature-extraction threshold on which the gradation conversion is performed, a feature amount from the image data on which the gradation conversion is performed; and
performing a gradation conversion of the image data by setting a gradation conversion parameter based on a result of extracting the feature amount and the image quality mode.

* * * * *